US009794336B2

(12) United States Patent
Meran et al.

(10) Patent No.: US 9,794,336 B2
(45) **Date of Patent: *Oct. 17, 2017**

(54) SYSTEMS AND METHODS FOR SYNCHRONIZING DATA

(71) Applicant: ATLASSIAN PTY LTD, Sydney (AU)

(72) Inventors: Haymo Meran, Sydney (AU); Tobias Steiner, Sydney (AU)

(73) Assignee: ATLASSIAN PTY LTD, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,597

(22) Filed: Mar. 31, 2016

(65) Prior Publication Data

US 2016/0344809 A1 Nov. 24, 2016

Related U.S. Application Data

(63) Continuation of application No. 14/717,468, filed on May 20, 2015, now Pat. No. 9,317,575.

(51) Int. Cl.

| | |
|---|---|
| ***G06F 17/00*** | (2006.01) |
| ***G06F 7/00*** | (2006.01) |
| ***H04L 29/08*** | (2006.01) |
| ***G06F 17/30*** | (2006.01) |

(52) U.S. Cl.

CPC .... *H04L 67/1095* (2013.01); *G06F 17/30117* (2013.01); *G06F 17/30345* (2013.01); *G06F 17/30581* (2013.01); *G06F 17/30923* (2013.01)

(58) Field of Classification Search

CPC ................................................ G06F 17/30575
USPC ......................................................... 707/634
See application file for complete search history.

(56) References Cited

U.S. PATENT DOCUMENTS

| | | | | |
|---|---|---|---|---|
| 7,359,991 | B2 * | 4/2008 | Balducci | G06Q 30/06 707/999.201 |
| 9,098,470 | B2 * | 8/2015 | Calder | G06F 11/2094 |
| 2005/0033777 | A1 * | 2/2005 | Moraes | G06F 17/30575 707/999.202 |
| 2005/0192989 | A1 * | 9/2005 | Adiba | G06F 17/30371 707/999.101 |
| 2008/0005199 | A1 * | 1/2008 | Chen | G06F 17/30581 707/999.204 |
| 2012/0303578 | A1 * | 11/2012 | Calder | G06F 11/2094 707/615 |

* cited by examiner

*Primary Examiner* — Pavan Mamillapalli
(74) *Attorney, Agent, or Firm* — Hickman Palermo Becker Bingham LLP

(57) ABSTRACT

Described herein is a computer implemented method for updating a hierarchical dataset using a hierarchical edit script. The dataset comprises a plurality of dataset nodes and the edit script comprises a plurality of edit script nodes. The edit script nodes comprise at least one source node and at least one target node defining a move operation in which one or more nodes from the hierarchical dataset are moved from an original location to a target location.

20 Claims, 27 Drawing Sheets

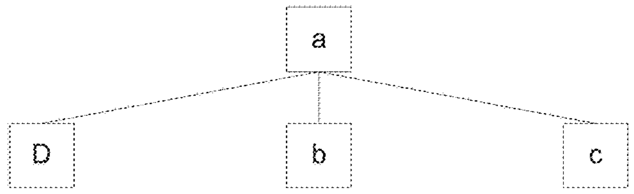

Figure 8A

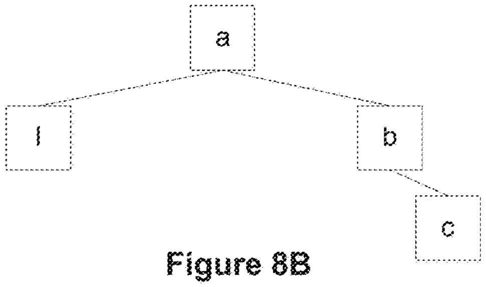

Figure 8B

| Row | Current tree-A node | Current tree B node | Current edit operation | Delta-A | Delta-B |
|---|---|---|---|---|---|
| 902 | (a (D) (b) (c)) | (a (I) (b (c))) | ((retain a) (delete D) (insert I) (retain b) (retain c)) | (retain () | (retain () |
| 904 | (a (D) (b) (c)) | (a (I) (b (c))) | ((retain a) (delete D) (insert I) (retain b) (retain c)) | (retain (delete D) () | (retain () |
| 906 | (a (D) (b) (c)) | (a (I) (b (c))) | ((retain a) (delete D) (insert I) (retain b) (retain c)) | (retain (delete D) () | (retain (insert I) () |
| 908 | (a (D) (b) (c)) | (a (I) (b (c))) | ((retain a) (delete D) (insert I) (retain b) (retain c)) | (retain (delete D) (retain) () | (retain (insert I) (retain()) |
| 910 | (a (D) (b) (c)) | (a (I) (b (c))) | ((retain a) (delete D) (insert I) (retain b) (retain c)) | (retain (delete D) (retain) (retain)) | (retain (insert I) (retain (retain))) |

Figure 9

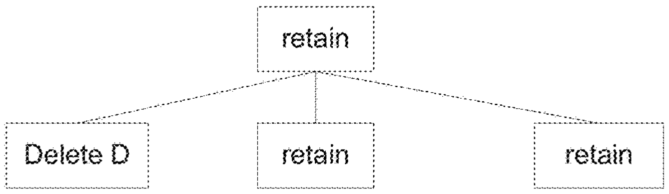

Figure 10A

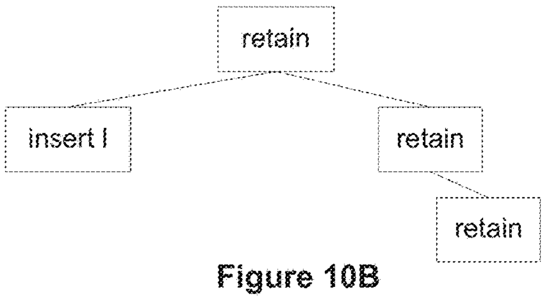

| Row | Delta-A | Delta-B |
|---|---|---|
| 1102 | (*retain (delete D) (retain) (retain)) | (*retain (insert I) (retain (retain))) |
| 1104 | (retain (*delete D) (retain) (retain)) | (retain (*insert I) (retain (retain))) |
| 1106 | (retain (delete D) (retain) (retain)) | (retain **(delete D)** (insert I) (retain (retain))) |
| 1108 | (retain (delete D*) (retain) (retain)) | (retain (delete D*) (insert I) (retain (retain))) |
| 1110 | (retain (delete D) (*retain) (retain)) | (retain (delete D) (*insert I) (retain (retain))) |
| 1112 | (retain (delete D) **(insert I)** (retain) (retain)) | (retain (delete D) (insert I) (retain (retain))) |
| 1114 | (retain (delete D) (insert *) (retain) (retain)) | (retain (delete D) (insert *) (retain (retain))) |
| 1116 | (retain (delete D) (insert I) (*retain) (retain)) | (retain (delete D) (insert I) (*retain (retain))) |
| 1118 | (retain (delete D) (insert I) (retain*) (retain)) | (retain (delete D) (insert I) (retain (*retain))) |
| 1120 | (retain (delete D) (insert I) (retain **(marker-1-target)**) (retain)) | (retain (delete D) (insert I) (retain **(marker-1-target)** (retain))) |
| 1122 | (retain (delete D) (insert I) (retain (marker-1-target)) (retain)) | (retain (delete D) (insert I) (retain (marker-1-target) **(wrapper-1-source** (retain)**)**)) |
| 1124 | (retain (delete D) (insert I) (retain (marker-1-target)) (retain)) | (retain (delete D) (insert I) (retain (marker-1-target)) **(wrapper-1-source (retain))**) |
| 1126 | (retain (delete D) (insert I) (retain (marker-1-target)) (*retain)) | (retain (delete D) (insert I) (retain (marker-1-target)) (*wrapper-1-source (retain))) |
| 1128 | (retain (delete D) (insert I) (retain (marker-1-target)) **(wrapper-1-source-greedy** (retain)**)**) | (retain (delete D) (insert I) (retain (marker-1-target)) (wrapper-1-source (retain))) |
| 1130 | (retain (delete D) (insert I) (retain (marker-1-target)) (wrapper-1-source-greedy (*retain))) | (retain (delete D) (insert I) (retain (marker-1-target)) (wrapper-1-source (*retain))) |
| 1132 | (retain (delete D) (insert I) (retain (marker-1-target)) (wrapper-1-source-greedy (retain*))) | (retain (delete D) (insert I) (retain (marker-1-target)) (wrapper-1-source (retain*))) |
| 1134 | (retain (delete D) (insert I) (retain (marker-1-target)) (wrapper-1-source-greedy (retain))*) | (retain (delete D) (insert I) (retain (marker-1-target)) (wrapper-1-source (retain))*) |

| Row | Merged delta |
|---|---|
| 1202 | (retain (delete D) (insert I) (retain (marker-1-target)) (wrapper-1-source (retain))) |
| 1204 | (retain (delete D) (insert I) (retain (target-1)) (wrapper-1-source (retain))) |
| 1206 | (retain (delete D) (insert I) (retain (target-1)) (source-1 (retain))) |

1500

| ARow | Edit script | Child sequence |
|---|---|---|
| 1502 | (retain (delete (*delete)) (retain) (retain) (insert "a") (insert "b") (retain (retain (target 1)) (source 1 (retain)))) | |
| 1504 | (retain (*delete (delete)) (retain) (retain) (insert "a") (insert "b") (retain (retain (target 1)) (source 1 (retain)))) | (delete) |
| 1506 | (retain (*delete (delete)) (retain) (retain) (insert "a") (insert "b") (retain (retain (target 1)) (source 1 (retain)))) | (*delete) |
| 1508 | (retain (*delete (delete)) (retain) (retain) (insert "a") (insert "b") (retain (retain (target 1)) (source 1 (retain)))) | (*[delete) |
| 1510 | (retain (*delete (delete)) (retain) (retain) (insert "a") (insert "b") (retain (retain (target 1)) (source 1 (retain)))) | (*[delete]) |
| 1512 | (retain (*delete (delete)) (retain) (retain) (insert "a") (insert "b") (retain (retain (target 1)) (source 1 (retain)))) | (*(delete)) |
| 1514 | (retain (*delete ~~(delete)~~) (retain) (retain) (insert "a") (insert "b") (retain (retain (target 1)) (source 1 (retain)))) | |
| 1516 | (retain (delete) (*retain) (retain) (insert "a") (insert "b") (retain (retain (target 1)) (source 1 (retain)))) | |
| 1518 | (retain (delete) (retain) (*retain) (insert "a") (insert "b") (retain (retain (target 1)) (source 1 (retain)))) | |
| 1520 | (retain (delete) (retain) (retain) (*insert "a") (insert "b") (retain (retain (target 1)) (source 1 (retain)))) | |
| 1522 | (retain (delete) (retain) (retain) (insert "a") (*insert "b") (retain (retain (target 1)) (source 1 (retain)))) | |
| 1524 | (retain (delete) (retain) (retain) (insert "a") (insert "b") (retain (retain (*target 1)) (source 1 (retain)))) | |
| 1526 | (retain (delete3) (retain) (retain) (insert "a") (insert "b") (retain (*retain (target 1)) (source 1 (retain)))) | (*target-1) |
| 1528 | (retain (delete) (retain) (retain) (insert "a") (insert "b") (retain (retain (target 1)) (source 1 (*retain)))) | |
| 1530 | (retain (delete) (retain) (retain) (insert "a") (insert "b") (retain (retain (target 1)) (*source 1 (retain)))) | (*retain) |
| 1532 | (retain (delete) (retain) (retain) (insert "a") (insert "b") (*retain (retain (target 1)) (source 1 (retain)))) | (*retain (target 1)) (source 1 (retain)) |
| 1534 | (retain (delete) (retain) (retain) (insert "a") (insert "b") (*retain (retain (target 1)) (source 1 (retain)))) | (retain (target 1)) (*source 1 (retain)) |

Figure 15A

| Row | Edit script | Child sequence |
|---|---|---|
| 1536 | (*retain (delete) (retain) (retain) (insert "a") (insert "b") (retain (retain (target 1)) (source 1 (retain)))) | (*delete) (retain) (retain) (insert "a") (insert "b") (retain (retain (target 1)) (source 1 (retain))) |
| 1538 | (*retain (delete) (retain) (retain) (insert "a") (insert "b") (retain (retain (target 1)) (source 1 (retain)))) | (delete) (*retain) (retain) (insert "a") (insert "b") (retain (retain (target 1)) (source 1 (retain))) |
| 1540 | (*retain (delete) (retain) (retain) (insert "a") (insert "b") (retain (retain (target 1)) (source 1 (retain)))) | (delete) [(retain) (*retain) (insert "a") (insert "b") (retain (retain (target 1)) (source 1 (retain))) |
| 1542 | (*retain (delete) ~~(retain) (retain)~~ **(retain 2)** (insert "a") (insert "b") (retain (retain (target 1)) (source 1 (retain)))) | (delete) [~~(retain) (retain)~~]**(*retain 2)** (insert "a") (insert "b") (retain (retain (target 1)) (source 1 (retain))) |
| 1544 | (*retain (delete) (retain 2) (insert "a") (insert "b") (retain (retain (target 1)) (source 1 (retain)))) | (delete) (retain 2) (*insert "a") (insert "b") (retain (retain (target 1)) (source 1 (retain))) |
| 1544 | (*retain (delete) (retain 2) ~~(insert "a") (insert "b")~~ **(insert "ab")** (retain (retain (target 1)) (source 1 (retain)))) | (delete) (retain 2) ~~(insert "a") (insert "b")~~ **(*insert "ab")** (retain (retain (target 1)) (source 1 (retain))) |
| 1546 | (*retain (delete) (retain 2) (insert "ab") (retain (retain (target 1)) (source 1 (retain)))) | (delete) (retain 2) (*insert "ab") (retain (retain (target 1)) (source 1 (retain))) |
| 1548 | (*retain (delete) (retain 2) (insert "ab") (retain (retain (target 1)) (source 1 (retain)))) | (delete) (retain 2) (insert "ab") (*retain (retain (target 1)) (source 1 (retain))) |

Figure 15B

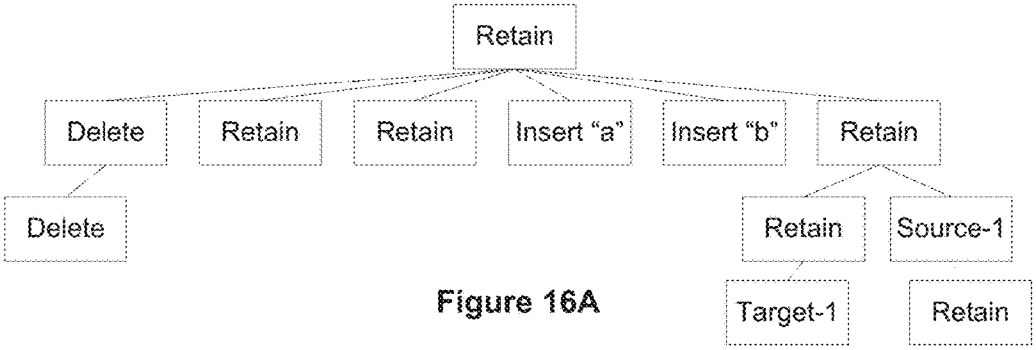

Figure 16A

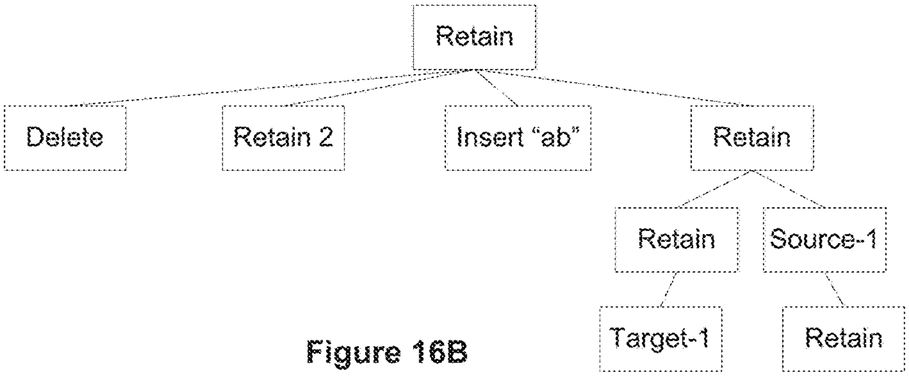

Figure 16B

SYSTEMS AND METHODS FOR SYNCHRONIZING DATA

BENEFIT CLAIM

This application claims the benefit under 35 U.S.C. §120 as a Continuation of application Ser. No. 14/717,468, filed May 20, 2015, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2014-2015 Atlassian Pty Ltd.

FIELD OF THE DISCLOSURE

The present disclosure generally relates to systems and methods for generating and/or using an edit script that describes operations which can be applied to a first dataset to generate a second dataset.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Many situations arise where the synchronization of data is desirable.

As one example, there is an increasing demand for computer implemented collaboration systems that permit multiple users in different locations to concurrently work on and edit the "same" dataset—for example a document. Such systems typically allow each user involved to, in real time, change the dataset themselves and see changes made to the dataset by other users.

In order to facilitate data synchronization changes made to a dataset need to be expressed—for example in an edit script.

A number of considerations are relevant to implementing systems that provide for data synchronization. One consideration is the need to implement a system or methodology that maintains consistency of the data despite different users performing different operations in respect at the same time. Performance considerations are also relevant, particularly in the case that the data synchronization is to be performed in real time such that the system or methodology needs to be able to operate so that changes made by users are made to all versions of the data with limited delay.

SUMMARY

The appended claims may serve as a summary of the invention.

BRIEF DESCRIPTION OF THE DRAWINGS

In the drawings:

FIG. 8A and FIG. 8B are tree diagrams of example hierarchical datasets;

FIG. 9 is a table illustrating a worked example of the matching algorithm of FIG. 4;

FIG. 10A and FIG. 10B are tree diagrams illustrating tree-form (hierarchical) deltas;

FIG. 11 is a table illustrating a worked example of the merge algorithm of FIG. 5A to FIG. 5F;

FIGS. 15A and 15B are tables illustrating a worked example of the edit script simplification algorithm of FIG. 13 and child sequence simplification algorithm of FIG. 14A and FIG. 14B;

FIG. 16A and FIG. 16B are tree diagrams illustrating hierarchical edit scripts;

DETAILED DESCRIPTION

Figure 1:
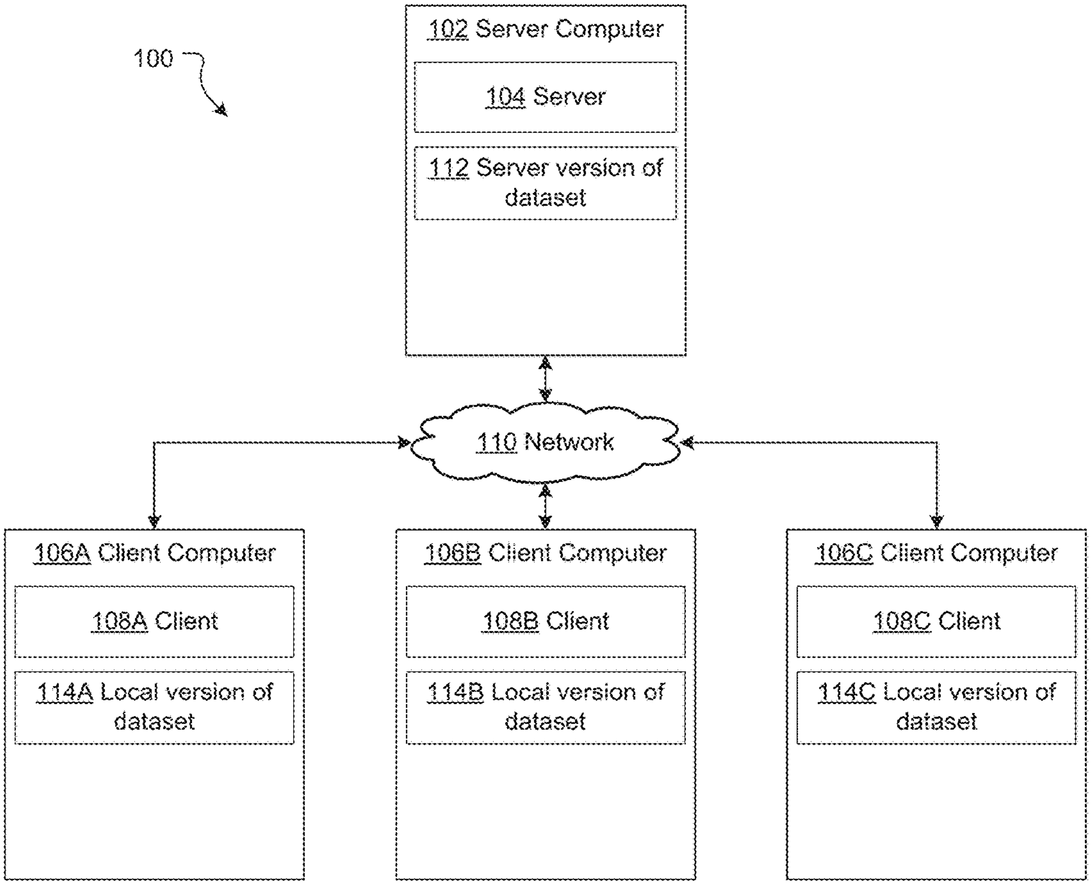
FIG. 1 illustrates a data synchronization system having a client-server architecture.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

This description follows the following outline:

1. Overview
  1.1 Datasets
  1.2 Example System Architecture
  1.3 General Data Synchronization System Operation
2. Hierarchical Edit Script Generation
  2.1 Overview
  2.2 Matching Algorithm
  2.3 Merge Algorithm
  2.4 Move Insertion Algorithm
  2.5 Worked Example
  2.6 Hierarchical Edit Script Generation Clauses
3. Hierarchical Edit Script Simplification
  3.1 Edit Script Simplification Algorithm
  3.2 Child Sequence Simplification Algorithm
  3.3 Worked Example
  3.4 Hierarchical Edit Script Simplification Clauses
4. Hierarchical Edit Script Materialization
  4.1 Materialize—Pass 1
  4.2 Materialize—Pass 2
  4.3 Worked Example
  4.4 Alternative Materialization
  4.5 Edit Script Materialization Clauses
5. Hardware Overview

1. OVERVIEW

The present disclosure generally relates to systems and methods for generating and using edit scripts. An edit script can be applied to a first dataset (e.g. a dataset in a first state, which may be referred to as dataset A) to generate a second dataset (e.g. a dataset in a second state, which may be referred to as dataset B).

Where used, the terms "dataset A" and "dataset B" are used solely for convenience and the labels "A" and "B" or "dataset A" and "dataset B" are not required to be used in embodiments; any first set of data and second set of data, respectively, having any name or label, may be used in an embodiment.

1.1 Datasets

The features and techniques described herein can be generally applied to hierarchically structured datasets—i.e. datasets which are expressed in a tree structure with nodes (elements) of a dataset capable of having child/parent/sibling relationships with other nodes of the dataset.

By way of specific example, HTML/XHTML (and XML more generally) describes a hierarchical data model. HTML/XHTML is described in detail by the World Wide Web Consortium (W3C) in "Document Object Model (DOM) Level 3 Core Specification" Version 1.0, W3C Recommendation 7 Apr. 2004 (available at http://www.w3.org/TR/DOM-Level-3-Core/Overview.html as at 19 Jan. 2015) and in "HTML5—A Vocabulary and Associate APIs for HTML and XHTML", W3C Recommendation 28 Oct. 2014 (available at http://www.w3.org/TR/html5/ as at 19 Jan. 2015).

Hierarchical data models are used in a variety of contexts. For example, a hierarchical data model may be used to express "document" type datasets, such as rich text documents (e.g. HTML), spreadsheets, presentations, drawings, whiteboards and the like. Hierarchical data models may also be used to express other datasets such as program data structures, game state information (e.g. in a multiplayer game environment), version information (e.g. in a source code repository).

In order to describe hierarchical datasets the present disclosure will use symbolic expression (s-expression) notation. Alternative notations or syntaxes for expressing hierarchies could be used.

1.2 Example System Architecture

The systems and methods described herein generally relate to generating an edit script defining operations that may be performed on dataset A to generate dataset B. The generation and use of such an edit script is useful in a variety of applications—for example data synchronization applications such as concurrent editing systems, source code repository systems (e.g. GIT), multiplayer gaming systems.

By way of one specific example, FIG. 1 depicts a data synchronization system 100 in which edit scripts are generated and used to synchronize data. System 100 utilizes a client-server architecture, and could be used, for example, as a collaboration system providing multiple users with the ability to concurrently edit datasets at the same time.

System 100 comprises a server computer 102 which hosts a server 104 for providing server-side functionality. The server 104 comprises one or more application programs, libraries, APIs or other software elements that implement the features and functions that are further described herein.

System 100 also comprises client computers 106. Each client computer 106 hosts a client 108 for providing client-side functionality. In the context of a concurrent document editing system, client 108 may be a web browser application (such as, for example, Chrome, Safari, Internet Explorer, Opera) which accesses the server 104 via an appropriate uniform resource locator (URL) and communicates with the server 104 via general world-wide-web protocols (e.g. http, https, ftp). The web browser application is configured to request, render and display electronic documents that conform to a markup language such as HTML, XML or extensions, and may be capable of internally executing browser-executable code such as Java (applets/plugin), VBScript, or other forms of code. Additional functionality as described herein may be achieved by add-ons (e.g. plugins) to the browser, or by additional stand-alone applications operating in conjunction with the web browser application. In other data synchronization systems the client may be, for example, a game, a dedicated synchronization application, or an alternative application.

Where the client 108 is a web browser, the server 104 will be a web server (such as, for example, Apache, IIS, nginx, GWS). Alternatively, the client 108 may be a specific application programmed to communicate with server 104 using defined application programming interface (API) calls. In this case the server 104 will be a specific application server configured to interact with the client 108. A client computer 106 may host more than one client 108 (for example a general web browser client and a specific application client). Similarly, server computer 102 may host more than one server 104.

The server computer 102 may serve multiple client computers 106 (or, more specifically, multiple clients 108). In FIG. 1 three client computers have been depicted (106A, 1106B, and 106C), though more or fewer are possible.

The server computer 102 and client computer 112 communicate data between each other either directly or indirectly through one or more communications networks 110. Communications network 110 may comprise a local area network (LAN) of an enterprise. In this case system 100 may be implemented as an on-premises solution in which the server computer 102 and client computers 106 are associated with the same business enterprise and at least the server computer 102 is within an enterprise-controlled facility that is protected from open internetworks using firewalls or other security systems. In another embodiment, network 110 may represent a public internetwork and the server computer 102 may be located off-premises with respect to an organization, such as in a shared data center or cloud computing facility.

Although a client-server architecture (with a single server) has been described the features described herein may be implemented using different system architectures. Generally speaking the system requires at least two computers capable of communicating with one another (directly or via a network) and which are configured to perform various of the data synchronization functions described herein. By way of one alternative system architectures, multiple server instances may be provided in a clustered architecture. In this case server instances (or nodes) may be instantiated on or hosted in a shared data center or cloud computing infrastructure such as AMAZON WEB SERVICES, RACKSPACE, or a private cloud data center. As a further example, a peer-to-peer architecture could be implemented where "client" computers 106 are configured to communicate directly with one another.

1.3 General Data Synchronization System Operation

In order to provide a general overview of one example of the generation and use of edit scripts, a data synchronization system allowing multiple users to concurrently work on a dataset will be described.

During collaboration the server 104 maintains a server version 112 of the dataset being worked on. This may be on local memory of the server computer 102 or remote memory accessible by the server 104. Each client 108 maintains its own local version 114 of the dataset, typically on local memory of the client computer 106 but potentially on a remotely accessible memory.

During collaboration, a user operates his or her client 108 (via client computer 106). The user operations cause modifications to be made to the dataset. When the dataset is modified/edited it is transformed from an initial state A to an amended state B. In response to an edit, the client 108 generates an edit script. The edit script provides information in respect of the modifications and in particular can be processed with the state-A dataset to generate the state B dataset. Edit scripts and their generation are described in detail below. Changes made by a user at a particular client 108 are applied to the local version 114 of the dataset by that client 108. The client 108 also communicates the edit script to the server 104, together with metadata in respect of the edit script (e.g. an identifier of the client application 108 that has generated the edit script, a timestamp).

In addition to implementing locally originating modifications, the client 108 also receives communications from the server 104 in respect of remote modifications—i.e. modifications that have been made to the dataset by other users working on other clients 106. Such server communications include edit scripts in respect of the remote modifications made to the dataset by other users. The client 108 implements a control algorithm to control the processing and application of the received edit scripts. In order to apply an edit script generated by another user or system the client 108 will typically need to transform the edit script so it can be relevantly applied to the local version 114 of the dataset.

The need to transform edit scripts generally arises from the fact that an edit script represents a modification made to a particular state of the dataset—i.e. the local state 114 of the dataset at the client 108 at the time the modification represented by the edit script was made. In order to apply the edit script to a dataset in a different state the edit script must be transformed to take into account that different state.

During collaboration the server 104 receives communications from clients 108 which include edit scripts representing changes that the users of those clients 108 have made to their own local versions 114 of the dataset. The server 104 also implements a control algorithm to control the processing of edit scripts received from the various clients 108, including transformation of edit scripts as necessary before applying them to the server version 112 of the dataset. In addition, the server 104 communicates the edit script (or information derived therefrom) to the other clients 108 so that the edit script can be applied by those clients 108 to their local versions 114 of the dataset. In this way all clients 108 can see all changes made by all other clients 108.

Figure 2:
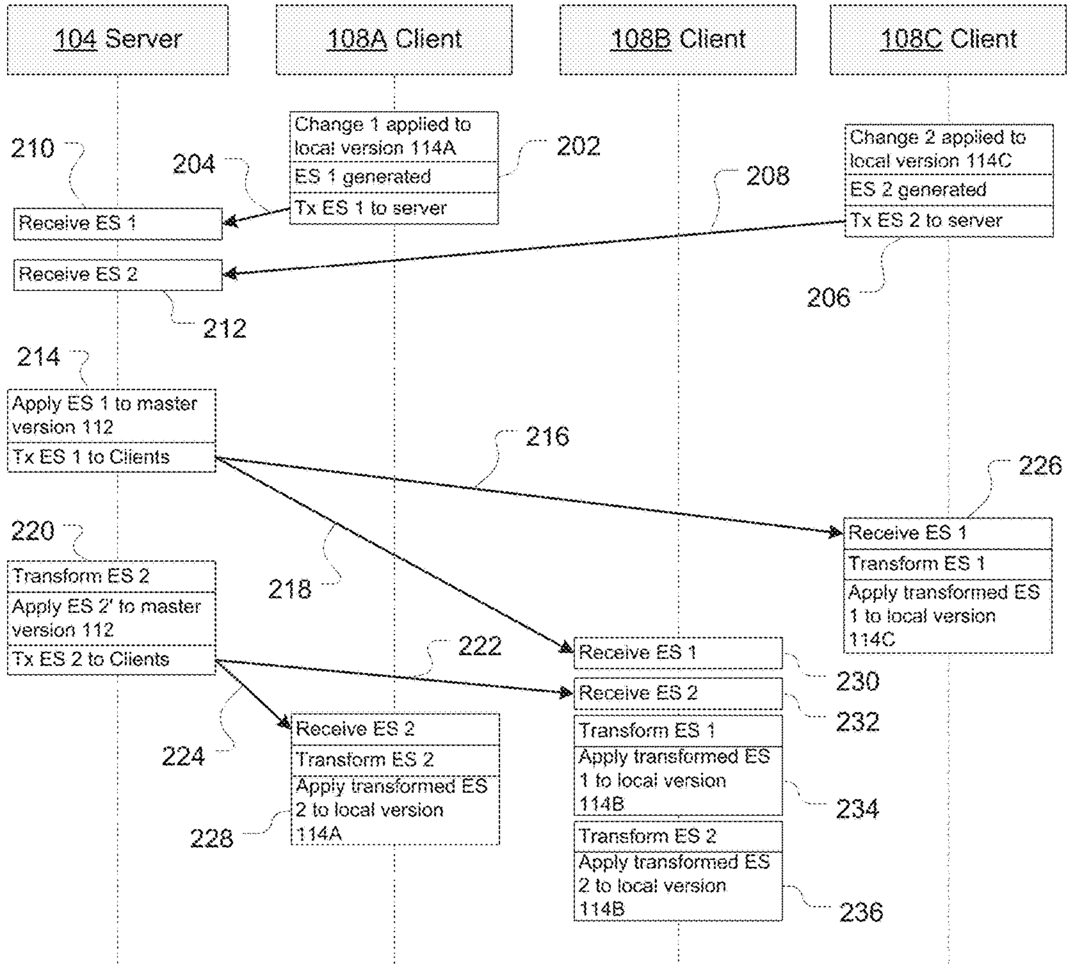
FIG. 2 illustrates general operation of a data synchronization system.

FIG. 2 is a diagram illustrating a general data synchronization process as outlined above.

At 202 a user makes a change (change 1) to local dataset 114A maintained by client 108A. Client 108A: applies change 1 to the local dataset 114A so the user of client 108A can see the change immediately; generates edit script 1 representing change 1; and transmits edit script 1 to the server 104 (communication 204).

At 206, at or about the same time that change 1 is made by client 108A, a client 108C makes a change to its local version 114C of the dataset (change 2). Client 108C applies change 2 to the local version 114C, generates edit script 2 representing the change; and transmits edit script 2 to the server 104 (communication 208).

At 210 server 104 receives edit script 1 from client 108A and at 212 receives edit script 2 from client 108C and acknowledges receipt of the edit scripts. Sever 104 processes the edit scripts in the order they are received—in this case edit script 1 followed by edit script 2. The control algorithm is used to determine any transformations that may be necessary and how those transformations should be applied—for example based on timestamp information or by resolving a race condition in the event that timing of the changes or other differentiating criteria are the same (e.g. based on a rule that gives precedence to client 108A over client 108C).

Server 104 processes edit script 1 at 214. Presuming the server version 112 of the dataset is in the same state that the client version 114A of the dataset was in when edit script 1 was generated by client 108A, there is no need for server 104 to transform edit script 1: it can be applied directly to the server version 112 of the dataset. Server 104 then transmits the edit script to clients 108B and 108C in communications 216 and 218 respectively. These communications serve both to inform clients 108B and 108C of change 1 and to the fact that the server 104 has applied change 1 to the server version 112 of the dataset Server 104 processes edit script 2 at 220. Before applying edit script 2 the server 104 transforms edit script 2 against edit script 1 in order to generate transformed edit script 2'. This transformation is performed in order to account for the application of edit script 1 to the server version 112. This is necessary as client 108C had no knowledge of edit script 1 at the time edit script 2 was generated and, accordingly, the state of local version 114C immediately prior to change 2 diverges from the state of the server version 112 which has now had change 1 applied. Server 104 then applies edit script 2' to the server version 112 of the dataset. The server then transmits edit script 2 (either in the original or transformed form depending on implementation) to clients 108A and 108B in communications 222 and 224 respectively.

At 226 client 108C receives edit script 1 from server 104. Client 108C transforms edit script 1 (to take into account at least change 2 which has already been made to local version 114C) and applies transformed edit script 1 to its local version 114C of the dataset.

Similarly, at 228 client 108A receives edit script 2 from server 104. Client 108A transforms edit script 2 (to take into account at least change 1 which has already been made to local version 114A) and applies transformed edit script 2 to its local version 114A of the dataset.

At 230 and 232 client 108B receives edit script 1 and edit script 2 from the server. Client 108B determines the order (that edit script 1 is to be processed before edit script 2). At 234 client 108B transforms edit script 1 and applies transformed edit script 1 to local version 114B of the dataset, and at 236 client 108B transforms edit script 2 and applies transformed edit script 2 to local version 114B of the dataset.

Presuming that all versions of the dataset (server version 112 and local versions 114A, 114B, and 114C) were in the same state before change 1, and no other changes are made by any user/client 108, the process generally illustrated in FIG. 2 will result in all versions of the dataset being synchronized.

It will be appreciated that FIG. 2 is a simple example provided for purposes of illustration only. Actual operation of system 100 will typically be considerably more complex due to multiple changes being made concurrently by the different clients 108.

General operation of a system such as 100 in a collaborative editing application is described, for example, in: "Operational Transformation Frequently Asked Questions and Answers" by Chengzheng Sun (accessible online at http://www3.ntu.edu.sg/home/czsun/projects/otfaq/ as at 19 Jan. 2015); and "Understanding and Applying Operational Transformation" by Daniel Spiewak (accessible online at http://www.codecommit.com/blog/java/understanding-and-applying-operational-transformation as at 19 Jan. 2015). The embodiments (and features thereof) described herein may also be applied to models other than operational transformation models. For example, the embodiments could be applied to the git distributed revision control system.

2. EDIT SCRIPT GENERATION

As described generally above, edit scripts are generated in order to describe or represent the differences between two datasets.

In one embodiment, two versions of a dataset (or two datasets) are processed using a difference algorithm. The difference algorithm compares the two hierarchical datasets and generates a hierarchical edit script. As the difference algorithm generates an edit script that has a hierarchical structure and can be used with a hierarchical dataset it will be referred to as a hierarchical difference algorithm. Furthermore, the hierarchical difference algorithm in certain embodiments operates to identify changes to a dataset that can be expressed as move operations and to record those changes as move operations.

Generating an edit script with a hierarchical or tree structure can have advantages in certain applications.

For example, during transformation of edit scripts against one another, if one edit script has a subtree of operations that is retained (with a single retain of the root of the subtree) in the other edit script, there is no need to transform the subtree. The result of this is that if two people are working concurrently in two different sections of a dataset (e.g. a document) there will be minimal transformation overhead.

Similarly, during materialization, if a subtree is retained that subtree can be kept as-is and shared between multiple trees. In contrast, if a linear edit script is used the entire linear sequence would need to be reconstructed in the event an insert or delete operation is performed in that sequence.

In addition, expressing a change in a dataset as a move operation (instead of expressing the same change as a delete operation and an insert operation) is desirable. Generally, expressing and performing a single move operation will provide greater efficiency than expressing/performing a pair of insert/delete operations. For example, two disassociated delete and insert operations will be larger than a move operation. The size of an insert operation is relative to the size of the inserted content, while a move operation describes locations and therefore is not relative to the size of the content that is moved. Reducing the size of an edit script is desirable, particularly in the context of concurrent editing applications where edit scripts are constantly being generated and communicated between various systems.

Furthermore, a move operation retains semantic information in respect of a change whereas a pair of insert/delete operations typically will not.

Expressing move operations (and as such having an association between an insert and a delete) also provides benefits for transformations. If content is moved to two different locations by two different users at the same time, processing this by two concurrent delete+insert pairs of operations may result in duplicated content: i.e. the content is inserted at both locations. In contrast, a move operation can be transformed such that the content is moved either to one location or the other but is not inserted at both locations.

Expressing move operations can also be of benefit when viewing/investigating the history of an edit. For example, where only delete+insert pairs of operations are used it is not possible to distinguish between a scenario where data A is moved from position X to position Y (which will be expressed as delete data A from position X and insert data A at position Y) and a scenario where data A is deleted from position X and new data identical to data A is written to position Y (which will also be expressed as delete data A from position X and insert data A at position Y). Where moves are expressed, however, these two scenarios can be distinguished.

In order to illustrate the principles of the hierarchical difference algorithm a general description will be provided followed by a specific example implementation of the algorithm.

2.1 Edit Script Generation: Overview

Figure 3:
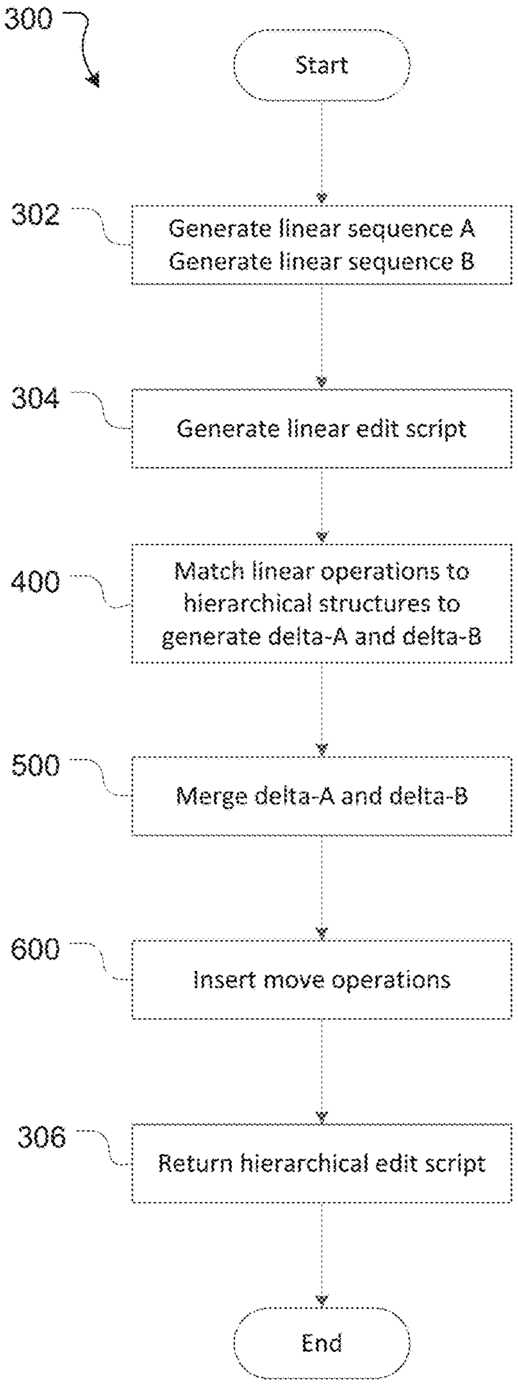
FIG. 3 is a flow chart illustrating an algorithm for generating a hierarchical edit script including move operations.

FIG. 3 is a flowchart providing an overview of the steps involved in a difference algorithm 300 for generating a hierarchical edit script including move operations.

The difference algorithm 300 takes as inputs two datasets: dataset A and dataset B. In the concurrent editing application, dataset A will typically be an initial version or state of a document (e.g. an html document) and dataset B an amended version or state of that document (e.g. document A following amendments or modifications).

As noted above, a hierarchical dataset model is used. Accordingly, datasets A and B are represented by tree-A and tree-B respectively. Once again the labels "A" and "B" (or "tree-A" and "tree-B" are used solely for convenience and are not required to be used in embodiments. Alternative labels may be used, the relevant factor being that tree-A corresponds to dataset A (or, put alternatively, the first tree corresponds to the first dataset) and that tree-B corresponds to dataset B (or, put alternatively, the second tree corresponds to the second dataset).

The output of the hierarchical difference algorithm is a hierarchical edit script. The hierarchical edit script is a set of instructions or data which can be applied to tree-A to generate tree-B. In the embodiments described below a hierarchical edit script is a hierarchy of nodes, each node defining an operation to be performed on dataset A.

At 302, tree-A is processed to generate a linear sequence of the nodes of tree-A (linear sequence A). Similarly, tree-B is processed to generate a linear sequence of the nodes of tree-B (linear sequence B). The labels "A" and "B" (or "linear sequence A" and "linear sequence B" are again used solely for convenience and are not required to be used in embodiments. Alternative labels may be used, the relevant factor being that linear sequence A corresponds to tree/dataset A (or, put alternatively, the first linear sequence corresponds to the first tree/dataset) and that linear sequence B corresponds to tree/dataset B (or, put alternatively, the second linear sequence corresponds to the second tree/dataset).

Processing a tree representation of a dataset to generate/convert it into a linear sequence can be performed in a variety of ways. For example, a traversal algorithm may be used to traverse the tree and generate a linear sequence of the nodes of the tree. In one embodiment a depth-first pre-order traversal algorithm is used.

In this context, the term linear is used to indicate a sequence of objects (the objects in this case being nodes) that does not provide any relationship information between those objects other than their position in the sequence. For example, the linearization process retains the nodes of a tree and puts them in sequence according to the traversal algorithm used, but does not retain relationship information in respect of those nodes (e.g. whether one node is a parent, child, sibling of another node). As a result of the linearization process this relationship information is lost insofar as it is not recoverable from the linear sequence alone. For example, one tree may be a single parent node A with two direct children B and C—expressed in an s-expression as (a (b) (c)). The corresponding linear sequence is: (a, b, c). As can be seen, the nodes have been retained in the linear sequence, but from the linear sequence alone it is not possible to determine the hierarchical relationship between nodes a, b, and c. For example, node b could be the parent of node c or node b could be the sibling of node c.

At 304 linear sequence A and linear sequence B are processed using a sequential difference algorithm in order to generate a linear edit script. The linear edit script generated provides an ordered sequence of operations that, when applied to linear sequence A, generates linear sequence B. In the present embodiment the linear edit script is defined in terms of the operations: "retain", "update" "insert", and "delete". These operations may have varying syntaxes, but generally speaking: a retain operation will define one or more characters from linear sequence A that are retained; an update operation defines a node that is to be retained but which is to be updated (e.g. in the case of a node defining attributes); a delete operation will define one or more characters from linear sequence A that are deleted; and an insert operation will define one or more characters that are inserted into linear sequence B. For the purposes of generating the hierarchical edit script retain and update operations are treated identically (given they both retain the given node).

Various difference algorithms may be used in order to generate the linear edit script. In one embodiment a difference algorithm based on the algorithms described in "An O(ND) Difference Algorithm and Its Variations" (Eugene Myers, *Algorithmica,* 1986, 1:251-266) is used.

Linear is again used here to refer to the fact that the edit script does not provide any hierarchical information. From the linear edit script and linear sequences A and B it is not possible to return to/derive the original hierarchies of tree-A and tree-B. In the algorithm describes below it is assumed that the root node of tree-A is either retained or updated (i.e. is also the root node in tree-B), and as such the first operation in the linear edit script is a retain or update operation. Cases where the root node is not retained can be dealt with in a variety of ways. For example, a new "replace" operation could be introduced, the replace operation being a single operation taking the place of a delete-insert pair of operations.

Following the generation of the linear edit script, a matching algorithm 400 is performed in which operations in the linear edit script (e.g. retain, insert and delete operations) are matched back to the hierarchical structures of tree-A and tree-B. The matching algorithm generates two tree-form edit scripts: delta-A which describes retain and delete operations of the linear edit script structured according to tree-A; and delta-B which describes retain and insert operations of the linear edit script structured according to tree-B. The labels "A" and "B" (or "delta-A" and "delta-B" are again used solely for convenience and are not required to be used in embodiments. Alternative labels may be used, the relevant factor being that delta-A has a hierarchy corresponding to tree/dataset A (or, put alternatively, the first delta has a hierarchy corresponding to the first tree/dataset) and that delta B has a hierarchy corresponding to tree/dataset B (or, put alternatively, the second delta has a hierarchy corresponding to the second tree/dataset).

Following their generation, delta-A and delta-B are merged using a merge algorithm 500. In merge algorithm 500 delta-A and delta-B are merged by copying insert nodes from delta-B into delta-A and copying delete nodes from delta-A into delta-B. In addition, the merge algorithm identifies where nodes from tree-A have been moved to a different place in the hierarchy in tree-B and generates/inserts marker/wrapper nodes into the merged delta to indicate those moves. The merge algorithm generates and a merged delta including edit operations and markers indicating move operations.

The move insertion algorithm 600 processes the merged delta from merge algorithm 500 to insert move operations.

At 306 the hierarchical edit script generated by algorithm 500 is output.

The matching algorithm 400, merge algorithm 500, and move insertion algorithm 600 are described in detail below.

2.2 Edit Script Generation: Matching Algorithm

Figure 4:
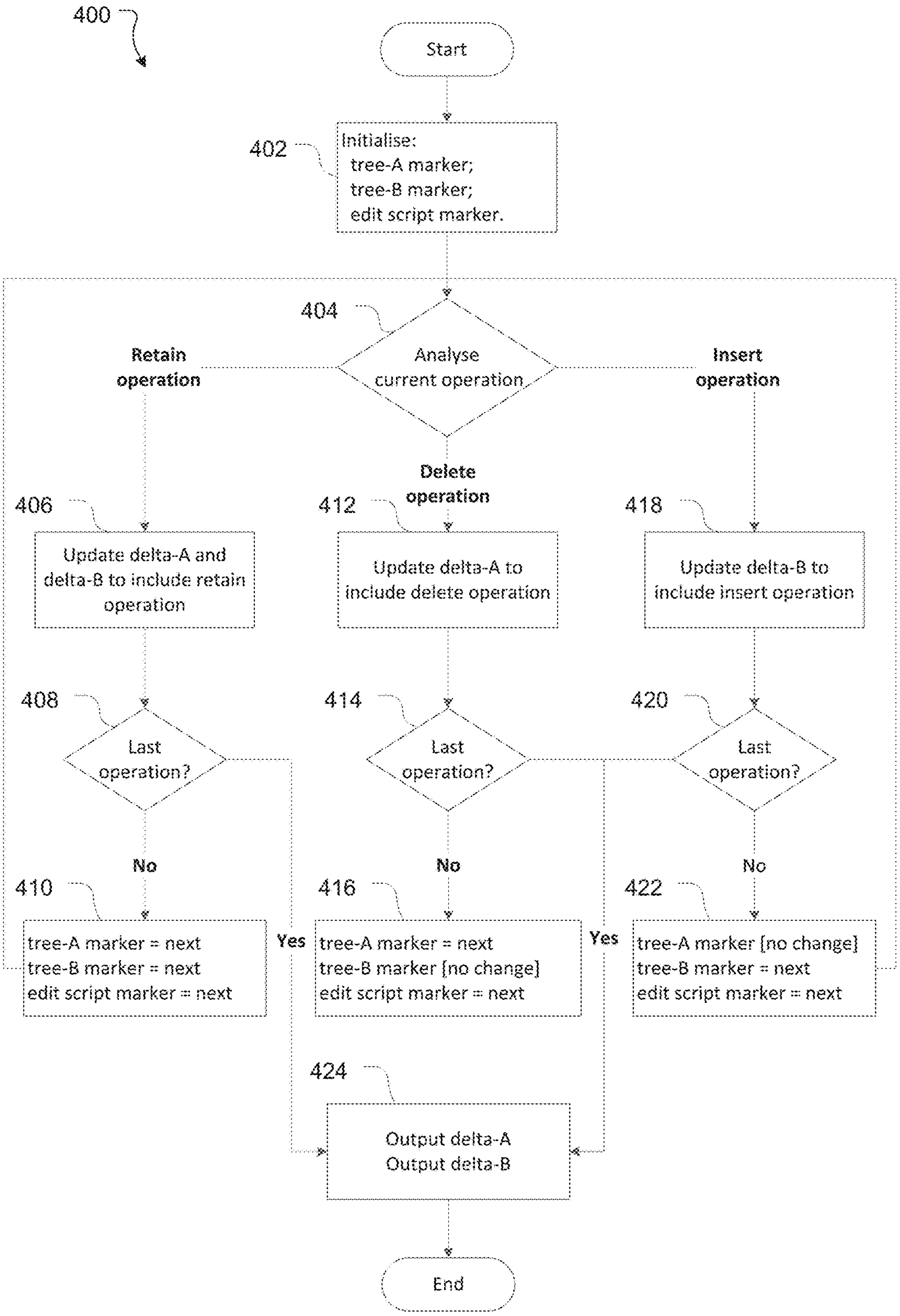
FIG. 4 is a flow chart illustrating a matching algorithm.

Turning to FIG. 4 the operation matching algorithm 400 will be described.

Generally speaking algorithm 400 is an iterative process in which the operations defined by the linear edit script are matched to the relevant tree-A and tree-B nodes in order to generate two intermediate tree-form edit scripts. "Tree-form" is used here to connote an edit script that includes information defining the hierarchical relationship between the operations in the edit script.

One tree-form edit script, referred to as delta-A, describes retain and delete operations from the linear edit script structured according to tree-A. The second tree-form edit script, referred to as delta-B, describes retain and insert operations of the linear edit script structured according to tree-B. In one embodiment the delta-A and delta-B are both expressed as s-expressions.

At 402 variables used in the operation matching algorithm 400 are initialized. These include: a tree-A marker indicating the tree-A marker being considered; a tree-B marker indicating the current tree-B node being considered; an edit script marker indicating the current edit operation (from the linear edit script) being considered; the delta-A tree-form edit script; and the delta-B tree-form edit script.

The tree-A marker is initialized to point to the first node of tree-A. The tree-B marker is initialized to point to the first node of tree-B. The first node of a tree is determined according to the particular traversal algorithm chosen. For example, where a depth-first pre-order traversal algorithm is used the first node of a tree is the root node. The edit script marker is initialized to point to the first operation described in the linear edit script. Delta-A and delta-B are initially empty.

At 404 the edit operation referenced by the edit script marker is considered and different steps are performed depending on whether the referenced edit operation is a retain operation, a delete operation, or an insert operation.

Retain Operation

At 406, if the edit operation is a retain operation, a retain node (i.e. a node indicating a retain operation) with associated hierarchical information is appended to delta-A, and a retain node with associated hierarchical information is appended to delta-B.

Identification and incorporation of the hierarchical information associated with a node being appended to a delta is achieved by reference to the relevant tree and the current position in that tree (per the current tree marker). For example, in order to determine the relevant hierarchical information when appending a node to delta-A, the position/hierarchy of the current tree-A node being considered (as referenced by the tree-A marker) within tree-A is used. Conversely, in order to determine the relevant hierarchical information when appending a node to delta-B, the position/hierarchy of the current tree-B node being considered (as referenced by the tree-A marker) within tree-B is used. Where s-expressions are used the hierarchical information is incorporated/represented in the delta by the positioning of opening and closing brackets.

At 408 a check is made to determine if the edit script marker is pointing to the last edit operation of the linear edit script. If so the operation matching process is complete and the delta-A and delta-B edit scripts are output at 424.

At 410, if the edit script marker is not pointing to the last operation in the linear edit script, tree-A and tree-B are both traversed to the next node. In other words, the tree-A marker is updated to point to the next tree-A node and the tree-B marker is updated to point to the next tree-B node. Determination of the "next" node in a tree is based on the traversal algorithm being used. In addition, the edit script marker is updated to point to the next operation in the linear edit script (the linear edit script being traversed sequentially from start to end).

The process then returns to 308.

Operation Matching: Delete Operation

At 412, If the edit operation referenced by the edit script marker is a delete operation, a delete node (i.e. a node indicating a delete operation) with associated hierarchical information is appended to delta-A.

At 414 a check is made to determine whether or not the edit script marker is the last edit operation of the linear edit script. If the edit script marker is the last edit operation the delta-A and delta-B edit scripts are output at 424.

At 416, if the edit script marker is not the last edit operation, the traversal of tree-A advances one step: i.e. the tree-A marker is updated to point to the next tree-A node. The edit script marker is also updated to point to the next edit operation in the linear edit script.

In the case of a delete operation no change is made to delta-B and the traversal of tree-B is not advanced (i.e. the tree-B marker variable is not changed). The process then returns to 308.

Operation Matching: Insert Operation

At 418, If the edit operation referenced by the edit script marker is an insert operation, an insert node (i.e. a node indicating an insert operation) with associated hierarchical information is appended to delta-B.

At 414 a check is made to determine whether or not the edit script marker is the last edit operation of the linear edit script. If the edit script marker is the last edit operation the delta-A and delta-B edit scripts are output at 424.

At 416, if the edit script marker is not the last edit operation, the traversal of tree-B advances one step: i.e. the tree-B marker is updated to point to the next tree-B node. The edit script marker is also updated to point to the next edit operation in the linear edit script.

In the case of an insert operation no change is made to delta-A and the traversal of tree-A is not advanced (i.e. the tree-A marker variable is not changed). The process then returns to 308.

At 424 all operations in the linear edit script have been considered and tree-form edit scripts delta-A and delta-B are complete. At this point delta-A and delta-B provide representations of tree-A and tree-B respectively, with the exception that nodes in the tree-form deltas are operations to be performed rather than the actual nodes of tree-A and tree-B.

2.3 Edit Script Generation: Merge Algorithm

Following their generation, delta-A and delta-B are processed according to the merge algorithm 500. The merge algorithm 500 merges delta-A and delta-B so that the delete operations of delta-A are included in delta-B and the insert operations of delta-B are included in delta-A. In addition, the merge algorithm 500 inserts marker and wrapper nodes into delta-A and delta-B to mark hierarchal moves. A hierarchal move is where a node group (i.e. one or more nodes) was moved from an original position in the hierarchy of tree-A to a different position in the hierarchy of tree-B.

For example, tree-A may be (a (b) (c)) and tree-B (a (b (c))). One way of expressing the change to tree-A would be by an operation that deletes node c as a child of node a, and inserts node c as a child of node b. An alternative way of expressing the change in tree-B, however, is as a move operation: node (c) has been moved down the hierarchy and is now a child of node (b) (instead of being a direct child of node (a)).

Generally speaking, moves are identified by considering corresponding retain nodes in delta-A and delta-B. If all corresponding pairs of retain nodes in delta-A and delta-B have the same parent node, all changes between tree-A and tree-B can be accounted for by insert and delete operations. In this case delta-A and delta-B will have retain nodes in the same hierarchical positions. Conversely, if a retain node in delta-A has a different parent in delta-A than the corresponding retain node has in delta-B, that retain node has been moved.

As retain nodes are always added to both delta-A and delta-B at the same time (per 406), any retain node in delta-A has a corresponding retain node in delta-B. Corresponding retain nodes may be identified by an identifier, or may be identified by a simple count: the first retain node in delta-A corresponds to the first retain node in delta-B, the second retain node in delta-A corresponds to the second retain node in delta-B and so on. Interleaving delete/insert operations may, of course, occur in delta-A and delta-B respectively, but this will not impact the general relationship that the $n^{th}$ retain node in delta-A corresponds to the $n^{th}$ retain node in delta-B.

Where corresponding retain nodes have different parent nodes, knowledge of the order in which tree-A and tree-B were originally traversed in order to generate the delta-A and delta-B edit scripts can be leveraged to identify information regarding the move.

Using a pre-order traversal algorithm preserves knowledge of the start of a known parent's child sequence: the node directly after the parent in the generated sequence. A pre-order traversal algorithm does not, however, preserve information on the end of the child sequence (i.e. the last node of the child sequence).

For example, using a pre-order traversal algorithm tree 1 (a (b) (c)) and tree 2 (a (b (c))) are both converted into the same linear sequence: [a, b, c]. As a pre-order traversal was used, the child sequence of node "a" must start at node "b". From the linear sequence [a, b, c], however, the end boundary of the child sequence cannot be determined. In this example the last node of parent a's child sequence could be node "b" (which is true to tree 2 but not tree 1) or it could be node "c" (true to tree 1 but not tree 2).

A move is always across the boundary not preserved by the traversal algorithm. In the case of a pre-order traversal the boundary not preserved is the boundary between the end of a child sequence and the next sibling.

Accordingly, if delta-A and delta-B were generated by a pre-order traversal, one side of a move must occur at the end of a child sequence. More specifically, where a pre-order traversal algorithm was used a node group can move either: from a position at the end of a parent's child sequence to a position as the next sibling of that parent; or from a position as a next sibling of a given node to a position at the end of the child sequence of that given node. For example, consider tree 1: (a (b) (c)) and tree 2 (a (b (c))). In this case node c has been moved from the next sibling of node b in tree 1 to the end of node b's child sequence in tree 2. Alternatively, consider tree 1 (a (b (c))) and tree 2 (a (b) (c)). In this case node c has been moved from the end of node b's child sequence in tree 3 to the next sibling of node b in tree 4.

Conversely, if a post-order traversal algorithm is used knowledge of where a known parent's child sequence ends is preserved (the node directly before the parent in the sequence), but not where it begins. In this case one side of a move must occur at the start of a child sequence. More specifically, for a post-order traversal a node group can move from either: from the start of a parent's child sequence to the previous sibling of the parent; or from the preceding sibling of a given node to the start of the child sequence of that given node.

Although the present embodiments are described in relation to a pre-order traversal algorithm they could be adapted for use with a post-order traversal algorithm.

During the merge algorithm 500 delta-A and delta-B are traversed and places where nodes have been moved are identified. As delta-A and delta-B were generated using a pre-order traversal algorithm, a given move must either be from the end of a child-sequence or to the end of a child sequence. Using this knowledge, if during the traversal of delta-A and delta-B one child sequence ends early (i.e. the child sequence in delta-A ends but the child sequence in delta-B has additional nodes or vice versa) it is determined that the remaining node and any of its following siblings in the child sequence that has not yet ended have been moved from the end of a child-sequence.

The merge algorithm 500 leverages this insight to merge the operations (nodes) included in delta-A and delta-B and to identify nodes that have moved hierarchically. Generally speaking, this involves copying insert nodes from delta-B into delta-A, copying delete nodes from delta-A into delta-B, and identifying where nodes from tree-A have been moved to a different place in the hierarchy in tree-B.

Figure 7:
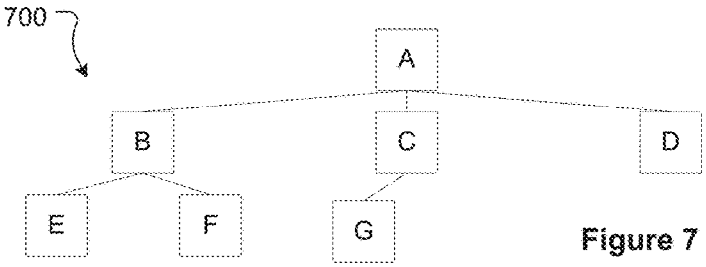
FIG. 7 is a tree diagram illustration of an s-expression hierarchy.

In describing merge algorithm 500 reference is made to child sequences. A child sequence is a sequence of nodes that directly descend from the same parent. For example, FIG. 7 provides a hierarchical representation 700 of the tree (A (B (E) (F)) (C (G)) (D)). In this example: [B, C, D] is a child sequence of parent node A (node B being the first child of A and the start of the child sequence, and node D being the last child of A and the end of the child sequence; [E, F] is a child sequence of parent node B (node E being the start of the child sequence and node F being the end); and [G] is the child sequence of parent node C (node G being both the start and end of the child sequence).

The top-most child sequence of a tree (e.g. a delta) is the child sequence of the root node. For example, in example tree (A (B (E) (F)) (C (G)) (D)) the root is node A, and the top-most child sequence is the child sequence of node A (which is [B, C, D]).

The end of a child sequence has been reached if a current delta marker points to an empty location after the last node of a child sequence. For example, in tree (A (B (C) (D)) (E)) the end of node B's child sequence is the empty location after node D—as shown by the highlighted carat in the following: (A (B (C) (D)^) (E)).

The merge algorithm maintains a current delta-A marker. Reference to a current delta-A node is reference to the delta-A node referenced by the delta-A marker.

The merge algorithm maintains a current delta-B marker. Reference to a current delta-B node is reference to the delta-B node referenced by the delta-B marker.

Reference to a current delta-A child sequence is reference to the delta-A child sequence which the current delta-A node (referenced by the current delta-A marker) is part of.

Reference to the current delta-B child sequence is reference to the delta-B child sequence which the current delta-B node (referenced by the current delta-B marker) is part of.

Reference to the current delta-A parent is reference the delta-A node that is the parent node of the current delta-A child sequence that the current delta-A node is a member of.

Reference to the current delta-B parent is reference the delta-B node that is the parent node of the delta-B child sequence that the current delta-B node is a member of.

The merge algorithm maintains a move identification counter used to obtain identifiers for wrapper and marker nodes (discussed below).

During the merge algorithm "wrapper" nodes are generated. Wrapper nodes are used to identify groups of nodes (each group being one or more nodes) that have been moved. A wrapper node is a node which "wraps" other nodes. On creation a wrapper node is assigned/associated with a primary wrapper node identifier (PID) which is taken from the move identification counter. By way of example, a wrapper node with primary identifier "1" may take the form: "wrapper-PID-1 ([wrapped nodes])"

In other embodiments a group of nodes that has been moved may be identified in alternative ways. For example, instead of creating a specific wrapper node wrapping a group nodes that has been moved, each node in the group may be assigned with a unique identifier. For example, if nodes (a) (b) (c) are a group of nodes that has been moved, they may be wrapped using a wrapper node with identifier (in this case "1")—i.e. "wrapper-id1 ((a) (b) (c))"—or could instead be individually identified—i.e. (a-id1) (b-id1) (c-id1). If individual identifiers (or an alternative identification scheme) was used the algorithms described below would need to be amended to account for this.

A wrapper node may have various properties associated with or assigned to it. These properties are essentially flags which are used to determine how the wrapper node is to be processed. Each wrapper node has a type property indicating that the wrapper node is either a "source" type wrapper node or a "target" type wrapper node. A wrapper node may also have a greedy property. A wrapper node may also have a split-identifier property, in which case the wrapper node has two identifiers: a primary identifier (taken from a related wrapper node) and a secondary identifier (SID). By way of example, a source wrapper node with primary identifier "1", and secondary identifier "3" may be indicated: "wrapper-PID1-SID3-source([wrapped nodes])".

The merge algorithm maintains a map of arrays (referred to as the array map) in which wrapper nodes are stored. The map of arrays is indexed by wrapper node primary identifiers. Each array in the array map (identified by the primary identifier) includes all wrapper nodes that are associated with that primary identifier. Where a primary identifier is associated with more than one wrapper node, one wrapper node will be associated solely with the primary identifier and other wrapper nodes will have a split-id—i.e. they will be associated with both the primary identifier and a secondary identifier. Wrapper nodes stored in the array map are stored with their primary identifier, secondary identifier (if applicable), and their type (source or target). The greedy property (where assigned to a wrapper node) is not used in the move insertion algorithm and as such does not need to be stored in the array map. As an example, the array map may take the following form (PID indicating a primary ID, SID indicating a secondary ID, S/T indicating the type—either source or target):

```
{
    PID-1 [wrapper-PID1-S/T, wrapper-PID1-SIDx-S/T, ...]
    PID-2 [wrapper-PID2-S/T, wrapper-PID2-SIDy-S/T, ...]
    ...
}
```

A wrapper node is added to the array map by looking up the array corresponding to the primary wrapper identifier and appending the wrapper node to the end of that array.

During the merge algorithm marker nodes are generated. Each marker node is associated with/assigned to a marker node identifier which is taken from the move identification counter when the marker node is created. Each marker node has a corresponding wrapper node (identified by both the marker and wrapper nodes having the same identifier). Each marker node has a type property indicating that the marker node is either a "source" type marker node (in which case the paired wrapper node is a target wrapper node) or a "target" type marker node (in which case the paired wrapper node is a source wrapper node).

With respect to navigation through the tree-form deltas, reference will be made to descending into a node. In order to descend into a node the marker is updated to point to the first child of the node being descended into. If the node being descended into does not have any children the marker will point to an empty location (which as described above is treated the end of a child sequence).

Reference will also be made to ascending out of a node. In the current context ascending out of a node involves updating the marker to point to the next sibling of the node being ascended out of. If there is no next sibling the marker will point to an empty location (treated as the end of a child sequence). For example, in the tree (A (B (C) (D)) (E)): ascending out of node B involves moving to the next sibling of node B-node E. Ascending out of node C involves moving to the next sibling of node C-node D. Ascending out of node D involves moving to the next sibling of node D. As node D is the end of parent node B's child sequence, this results in the marker pointing to the empty location: (A (B (C) (D)^) (E)).

By way of example, consider the following tree (a (b) (c (d) (e) (f)) (g)). Descending into node a will move the marker to node b (the first child of node a). Descending into node c will move the marker to node d (the first child of node c). Descending into node b will point to an empty location (as node b has no children), which is then treated as the end of node b's child sequence. Ascending out of node (d) will move the marker to g (the next sibling of node c, which is the parent of node d); ascending out of the parent of node c will move the marker to node g (node g being the next sibling of node a, node a being the parent of node c.

The merge algorithm will be described in detail with reference to FIG. 5.

Figure 5A:
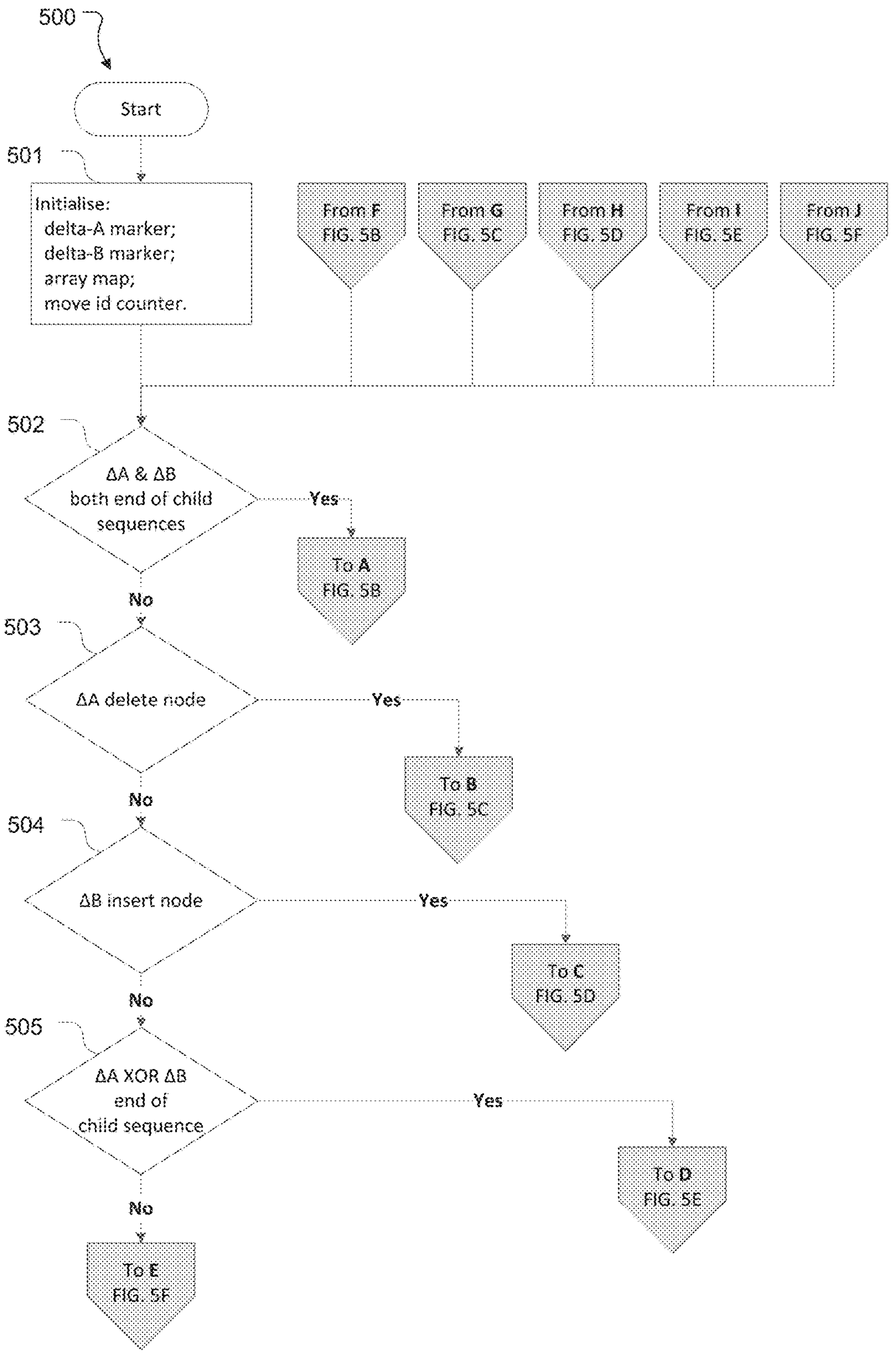
FIG. 5A to FIG. 5F are flow charts illustrating a merge algorithm.

Starting at FIG. 5A, at 501 variables used in the merge algorithm are initialized. The delta-A and delta-B markers are initialized to point to the first node of delta-A and the first node of delta-B respectively. The array map is initially empty. The move identification counter can be initialized to any value desired (for example 0).

Figure 5B:
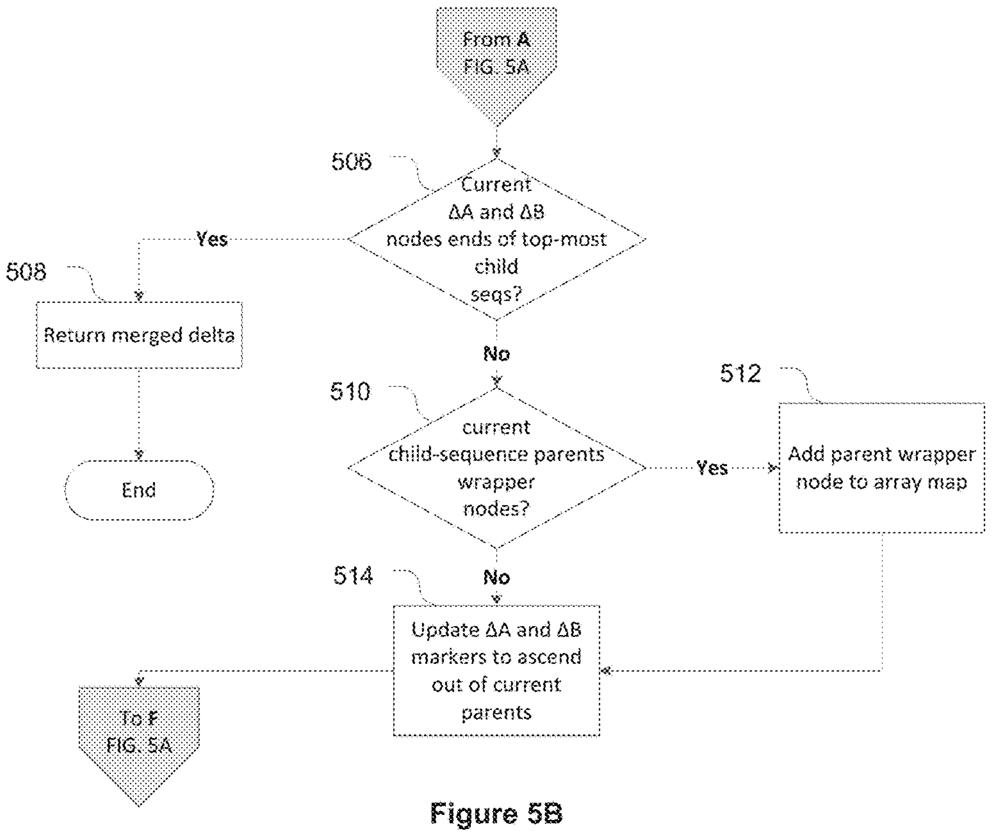

At 502 a check is made to determine if the current delta-A node (as referenced by the delta-A marker) is the end of a child sequence of delta-A and the current delta-B node (as referenced by the delta-B marker) is the end of a child-sequence of delta-B. If so the algorithm proceeds to 506 (FIG. 5B, described below). If not, the algorithm proceeds to 503.

Figure 5C:
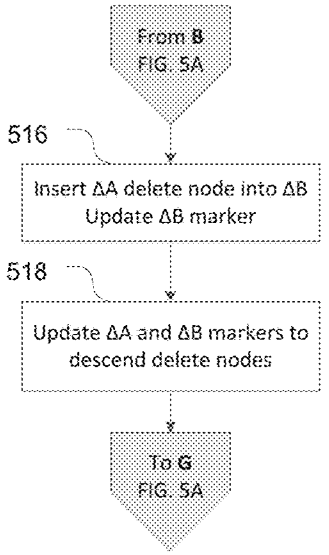

At 503 a check is made to determine if the current delta-A node is a delete node or a wrapper node that contains a delete node as its first child. If so the algorithm proceeds to 516 (FIG. 5C, described below). If not, the algorithm proceeds to 504.

Figure 5D:
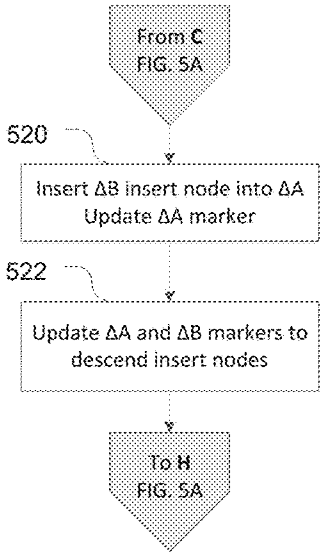

At 504 a check is made to determine if the current delta-B node is an insert node or a wrapper node that contains an insert node as its first child. If so the algorithm proceeds to 520 (FIG. 5D, described below). If not, the algorithm proceeds to 505.

Figure 5E:
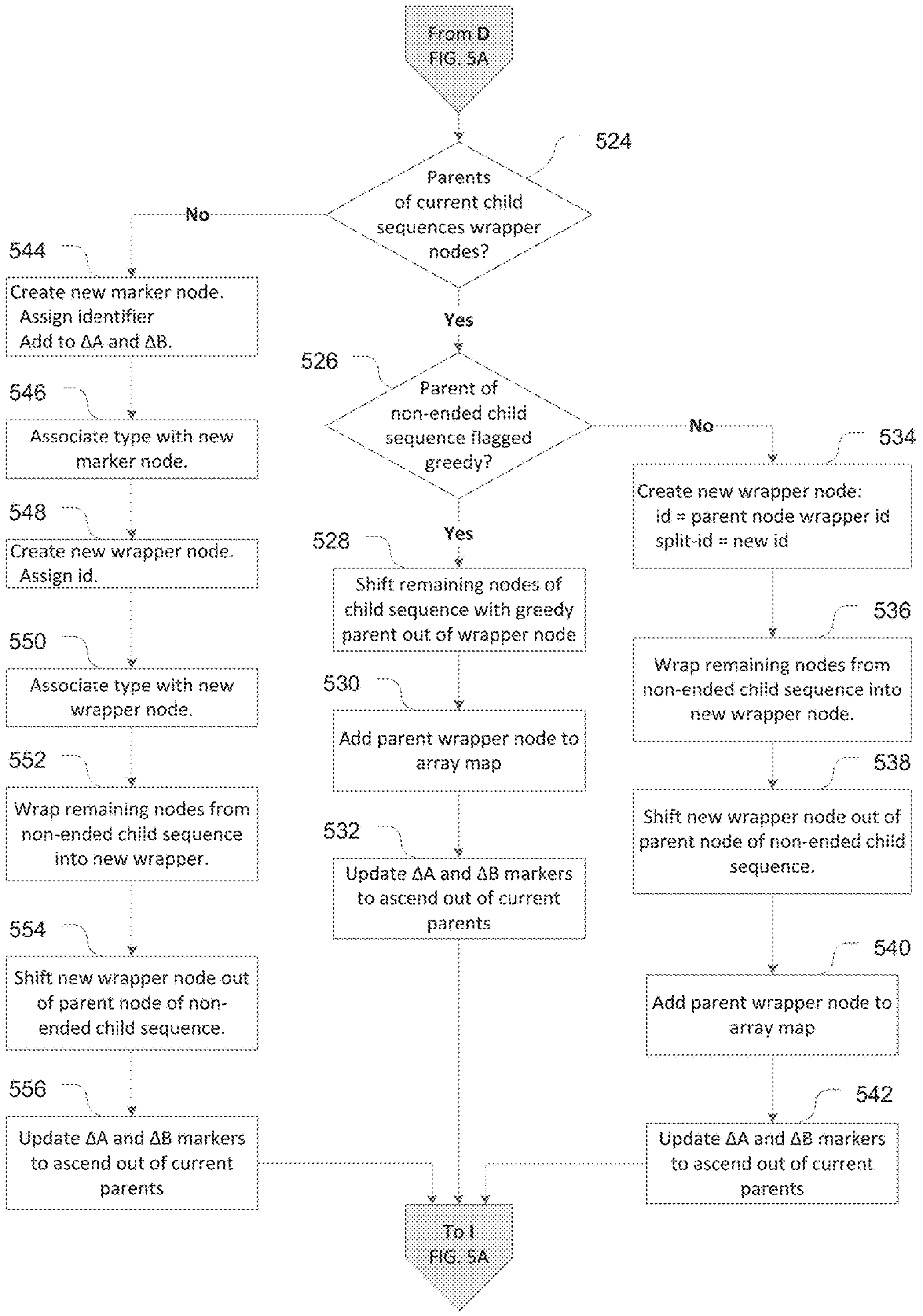

At 505 a check is made to determine if the current delta-A node is the end of a child sequence but the current delta-B node is not the end of a child sequence or the current delta-B node is the end of a child sequence but the current delta-A node is not the end of a child sequence (the "or" in this particular instance being an exclusive or: if the current nodes are both the ends of a child sequence this is captured at 502). If so the algorithm proceeds to 524 (FIG. 5E, described below).

Figure 5F:
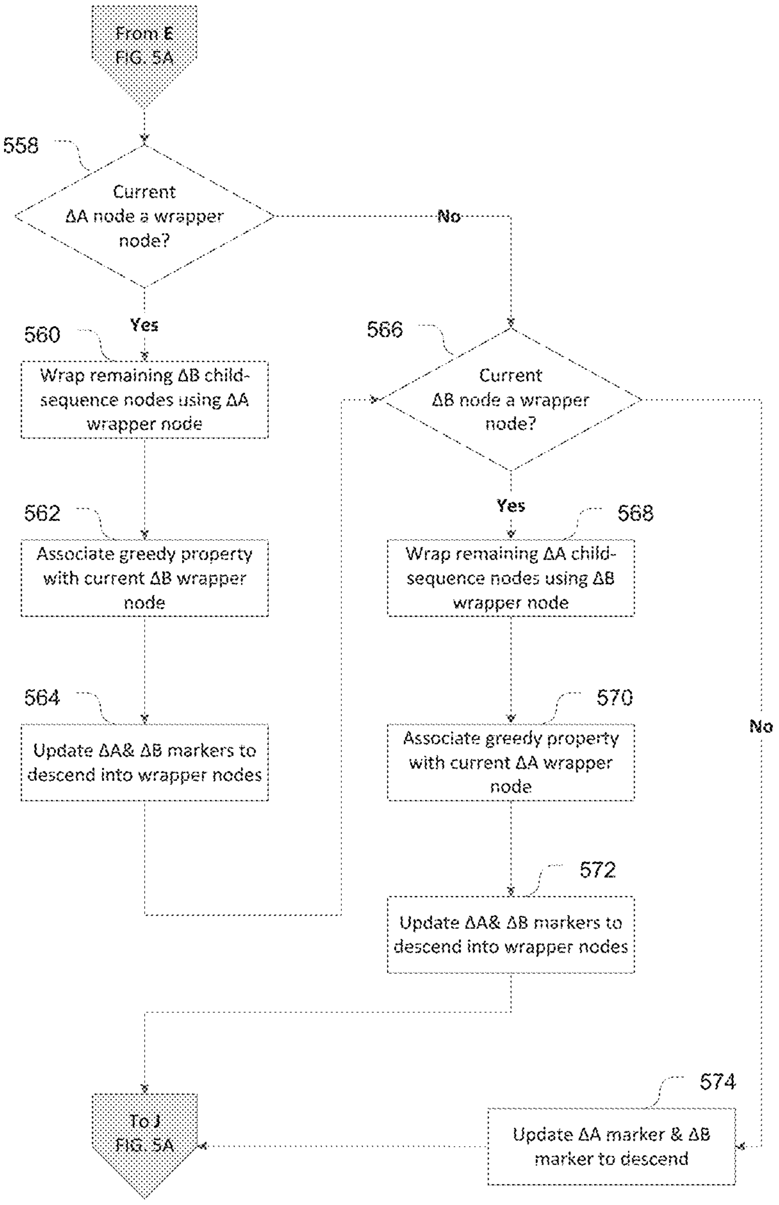

If, at 505, neither the current delta-A node nor the current delta-B node is the end of a child sequence, the process continues to 558 (FIG. 5F, described below).

End of Child Sequences in Delta-A and Delta-B

If the current delta-A node and the current delta-B node are each the end of a child sequence, algorithm 500 proceeds to 506 (FIG. 5B).

At 506 a check is made to determine whether the current delta-A and delta-B child sequences are the top-most child sequences of delta-A and delta-B respectively.

If (at 506) the current delta-A and delta-B child sequences are the top-most child sequences, the merge process is complete. At 508, the merged delta (which can be either delta-A or delta-B as at this stage they are substantively the same) is returned.

If (at 506) the current child sequences are not the top-most child sequences, at 510 a check is made to determine whether the parents of the current child sequences are wrapper nodes. If one of the current child sequence parent nodes is a wrapper node the other child sequence parent node will also be a wrapper node.

If (at 510) the current child sequence parent nodes are wrapper nodes, at 512 the parent wrapper node is added to the array map (i.e. the parent wrapper node is appended to the array in the array map that is identified by the primary identifier of the parent wrapper node). The parent wrapper node from either delta-A or delta-B may be used for this as both will be the same.

At 514 the current delta-A and delta-B markers are updated to ascend out of the parents of the current child sequences. E.g. the delta-marker (which currently points to a node at the end of a child sequence of a wrapper node) is updated to point to the next sibling of the parent of that wrapper node.

Following 514 the process then returns to decision point 502.

If (at 510) the current child sequence parent nodes are not wrapper nodes, the process continues to 514.

Delete Node (or Wrapper Containing Delete Node as First Child) in Delta-A

As will be recalled, delta-A does not contain insert nodes and delta-B does not contain delete nodes. In order to merge delta-A and delta-B if a delete node is encountered in delta-A it is copied (to the correct location) in delta-B.

If: the current delta-A and delta-B nodes are not both the end of a child sequence (per check 502); and the current delta-A node is a delete node or a wrapper node that contains a delete node as its first child (per check 503), algorithm 500 proceeds to 516 (FIG. 5C).

At 516 the current delta-A node is inserted into delta-B at the position indicated by the current delta-B marker (i.e. immediately before the node the current delta-B marker points to).

At 518 the current delta-A marker is updated to descend the delta-A delete node, and the current delta-B marker is updated to descend the newly inserted delta-B delete node.

The process then returns to decision point 502.

Insert Node (or Wrapper Containing Insert Node as First Child) in Delta-B

In order to merge delta-A and delta-B if an insert node is encountered in delta-B it is copied (to the correct location) in delta-A.

If: the current delta-A and delta-B nodes are not both the end of a child sequence (per check 502); the current delta-A node is not a delete node or a wrapper node that contains a delete node as its first child (per check 503); and the current delta-B node is an insert node or a wrapper node that contains an insert node as its first child (per check 504), algorithm 500 proceeds to 520 (FIG. 5D).

At 520 the current delta-B node is inserted into delta-A at the position indicated by the current delta-A marker (i.e. immediately before the node the current delta-A marker points to).

At 522 the current delta-B marker is updated to descend the delta-B insert node, and the current delta-A marker is updated to descend the newly inserted delta-A insert node.

The process then returns to decision point 502.

Not Delete or Insert, End of Child Sequence of One (but not Both) Delta-A and Delta-B If: the current delta-A and delta-B nodes are not both the end of a child sequence (per check 502); the current delta-A node is not a delete node or a wrapper node that contains a delete node as its first child (per check 503); the current delta-B node is not an insert node or a wrapper node that contains an insert node as its first child (per check 504); and one (but not both) of the current delta-A and current delta-B nodes are the end of a child sequence (per check 505), algorithm 500 proceeds to 524 (FIG. 5E).

For these steps reference will be made to the child sequence that has ended and the child sequence that has not ended. The child sequence that has ended is the child sequence containing the current delta node that is the end of a child sequence. The child sequence that has not ended is the child sequence containing the current delta node that is not the end of a child sequence (and the remaining nodes of the non-ended child sequence are the nodes of that child sequence falling after the current delta node). I.e. if the current delta-A marker points to a delta-A node that Is the end of a delta-A child sequence, the delta-A child sequence containing the node referenced by the current delta-A marker is the child sequence that has ended. In this case the child sequence that has not ended is the delta-B child sequence containing the node referenced by the current delta-B marker (and the remaining nodes of that child sequence are the delta-B nodes in the child sequence falling after the current delta-B marker). Conversely, if the current delta-B marker points to a delta-B node that is the end of a delta-B child sequence, the delta-B child sequence containing the node referenced by the current delta-B marker is the child sequence that has ended. In this case the child sequence that has not ended is the delta-A child sequence containing the node referenced by the current delta-A marker (and the remaining nodes of that child sequence are the delta-A nodes in the child sequence falling after the current delta-A marker).

At 524 a check is made to determine if the parents of the current child sequences are wrapper nodes (either both parents will be wrapper nodes or neither will be).

If (at 524) both child sequence parents are wrapper nodes, at 526 a check is made to see whether the parent node of the child sequence that has not ended has been flagged as a "greedy" node.

If (at 526) the parent node of the child sequence that has not ended is flagged as a greedy node, this indicates that there are too many nodes in the wrapper. This can happen where a greedy wrapper starts out wrapping too many nodes. To rectify this, the remaining nodes are shifted out of the greedy wrapper. Accordingly, at 528 all remaining nodes of the current child sequence that has not ended are shifted up and out of the parent wrapper node of that child sequence. I.e. each remaining child node becomes a sibling of the parent wrapper node.

At 530 the parent wrapper node (either the delta-A or delta-B parent wrapper node can be used as they are identical) is added to the array map.

At 532 the current delta-A and delta-B markers are updated to ascend out of the parent wrapper nodes of the current child sequences.

The process then returns to decision point 502.

If (at 526) the parent of the child sequence that has not ended is not flagged as a greedy node, this indicates that there were not enough nodes available to match the wrapper node in the opposite delta at that level in the tree hierarchy. As moves are not cross-hierarchy, both the greedy and non-greedy wrappers need to be ended at this point and a new wrapper is created for the remaining nodes on the non-greedy side. The new wrapper will result in a new greedy wrapper being inserted the next time a node is encountered on the greedy wrapper side. To implement this, at 534 a new wrapper node is created. The primary wrapper node identifier of the new wrapper node is given the same value as the primary wrapper node identifier of the parent wrapper node. The new wrapper node is also assigned the "split-id" property, the secondary identifier for the wrapper node being allocated an identification value taken from the move identification counter. After the move identification counter value has been assigned to the split-id property the counter is incremented [not shown].

At 536 remaining nodes from the child sequence that has not ended are wrapped in the new wrapper node created at 534. Any wrapped nodes are skipped in this wrapping process (i.e. not wrapped) in order to avoid double wrapping.

At 538 the new wrapper node created at 534 is shifted up and out of the parent node of the child sequence that has not ended. I.e. the new wrapper node is moved to be the next sibling of the parent node of the child sequence that has not ended.

At 540 the parent wrapper node (either the delta-A or delta-B parent wrapper node can be used as they are identical) is added to the array map.

At 542 the current delta-A and delta-B markers are updated to ascend out of the parent wrapper nodes of the current child sequences. The process then returns to decision point 502.

If (at 524) the parents of the current child sequences are not wrapper nodes, this indicates that a child sequence has ended prematurely. This is the origination of wrapper nodes. In this case the sequence is wrapped and shifted up in order to be able to ascend and continue the matching process. To implement this, at 544 a new marker node is created. The marker node identifier for the new marker node takes the value of the move identification counter. The new marker node is inserted into the current delta-A and delta-B locations (i.e. the marker node is inserted into delta-A immediately before the node that the current delta-A marker points to and the marker node is inserted into delta-B immediately before the node that the current delta-B marker points to).

The marker node created at 544 should not be confused with the current delta-A marker and current delta-B marker. The marker node is an actual node that is inserted into a delta-A and delta-B. In contrast, the current delta-A and delta-B markers are pointers or references to the current nodes in delta-A and delta-B that are being analyzed.

At 546 the type property of the new marker node created at 544 is set. If the current delta-A node is the end of a child sequence, the marker node is associated with the type "target". If the current delta-B node is the end of a child sequence, the marker node is associated with the type "source".

At 548 a new wrapper node is created. The primary identifier for the new wrapper node takes the value of the move identification counter (i.e. the same value assigned to the new marker node created at 544). After the move identification counter value has been assigned to the new wrapper node the counter is incremented [not shown].

At 550 the type property of the new wrapper node created at 548 is set. If the current delta-A node is the end of a child sequence, the wrapper node is associated with the type "source". If the current delta-B node is the end of a child sequence, the wrapper node is associated with the type "target".

At 552 the new wrapper node is inserted after the marker node and is used to wrap remaining nodes from the child sequence that has not ended. Any wrapped nodes are skipped in this wrapping process (i.e. not wrapped) in order to avoid double wrapping.

At 554 the new wrapper node created at 548 is shifted up and out of the parent node of the child sequence that has not ended. This results in the wrapper node becoming the next sibling of the parent of the non-ended child sequence.

At 556 the current delta-A and delta-B markers are updated to ascend out of the parent nodes of the current child sequences.

The process then returns to decision point 502.

Not Insert, not Delete, and Neither Delta-A Nor Delta-B Child Sequences Ended

If: the current delta-A and delta-B nodes are not both the end of a child sequence (per check 502); the current delta-A node is not a delete node or a wrapper node that contains a delete node as its first child (per check 503); the current delta-B node is not an insert node or a wrapper node that contains an insert node as its first child (per check 504); and neither of the current delta-A and current delta-B nodes is the end of a child sequence (per check 505), algorithm 500 proceeds to 558 (FIG. 5F). In this case the current delta-A and delta-B nodes are in child sequences with additional subsequent children.

In this case, if a wrapper node is encountered in one of the deltas a matching wrapper node is injected into the other delta. At the point the matching wrapper node is injected into the other delta it is not known where the non-greedy wrapper ends. As such the injected wrapper node wraps all following siblings (hence the greedy property).

To implement this, at 558, the current delta-A node is checked to see if it is a wrapper node. If not the process continues to 566.

If (at 558) the current delta-A node is a wrapper node, at 560 the remaining node(s) in the delta-B child sequence (i.e. the node marked by the delta-B marker and any following nodes in the child sequence) are wrapped using the delta-A wrapper node indicated by the current delta-A marker. This is achieved by inserting a copy of the delta-A wrapper node (including identifiers/properties) into delta-B and using it to wrap the relevant children nodes.

At 562 the wrapper node inserted into delta-B (and wrapping the remaining child sequence nodes in the delta-B child sequence) is flagged as being "greedy".

At 564 the current delta-A marker is updated to descend into the delta-A wrapper node. The delta-B marker is updated to descend into the wrapper node added to delta-B at 560 so that it points to the node it originally pointed to before the wrapper node was added at 560. The process then continues to decision point 566.

In order to illustrate 560, 562, and 564, consider the following delta-B (the highlighted carat indicating the delta-B marker):

Delta-B: (a ^(b) (c) . . . )

If the delta-A marker points to a wrapper node (wrapper-1), then 562 and 564 operate to wrap the remaining nodes of the delta-B child sequence (nodes (b) and (c)) using that wrapper node and associating the greedy property to the wrapper node:

Delta-B: (a (wrapper-1-greedy (b) (c) . . . )

At 564 the delta-B marker is then updated to descend the newly added wrapper node:

Delta-B: (a (wrapper-1-greedy ^(b) (c) . . . )

At 566, the current delta-B node is checked to see if it is a wrapper node. If not the process continues to 574.

If (at 566) the current delta-B node is a wrapper node as similar process as described in respect of 560, 562, and 564 is performed. At 568 the remaining node(s) in the delta-A child sequence (i.e. the node marked by the delta-A marker and any following nodes in the child sequence) are wrapped using the delta-B wrapper node.

At 570 the wrapper node inserted into delta-A (and wrapping the remaining child sequence nodes in the delta-A child sequence) is flagged as being "greedy".

At 572 the current delta-B marker is updated to descend into the delta-B wrapper node. The delta-A marker is updated to descend into the wrapper node added to delta-A at 568 so that it points to the node it originally pointed to before the wrapper node was added at 568. Following this the process returns to 502.

If (at 566) the current delta-B node is not a wrapper node, at 574 the delta-A and delta-B markers are both updated to descend.

2.4 Edit Script Generation: Move Insertion Algorithm

Figure 6A:
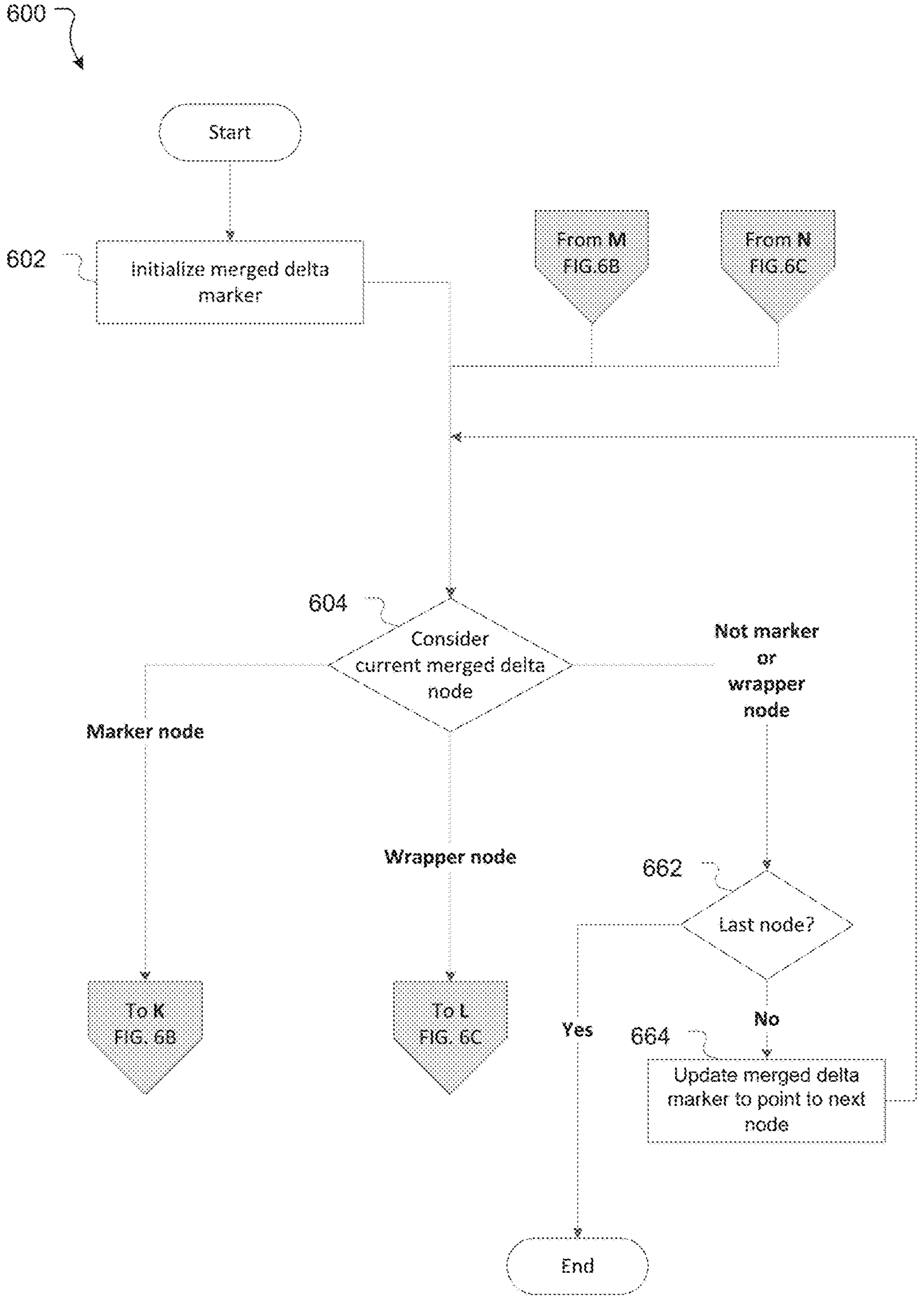
FIG. 6A to FIG. 6C are flow charts illustrating an algorithm for inserting move operations.
Figure 6B:
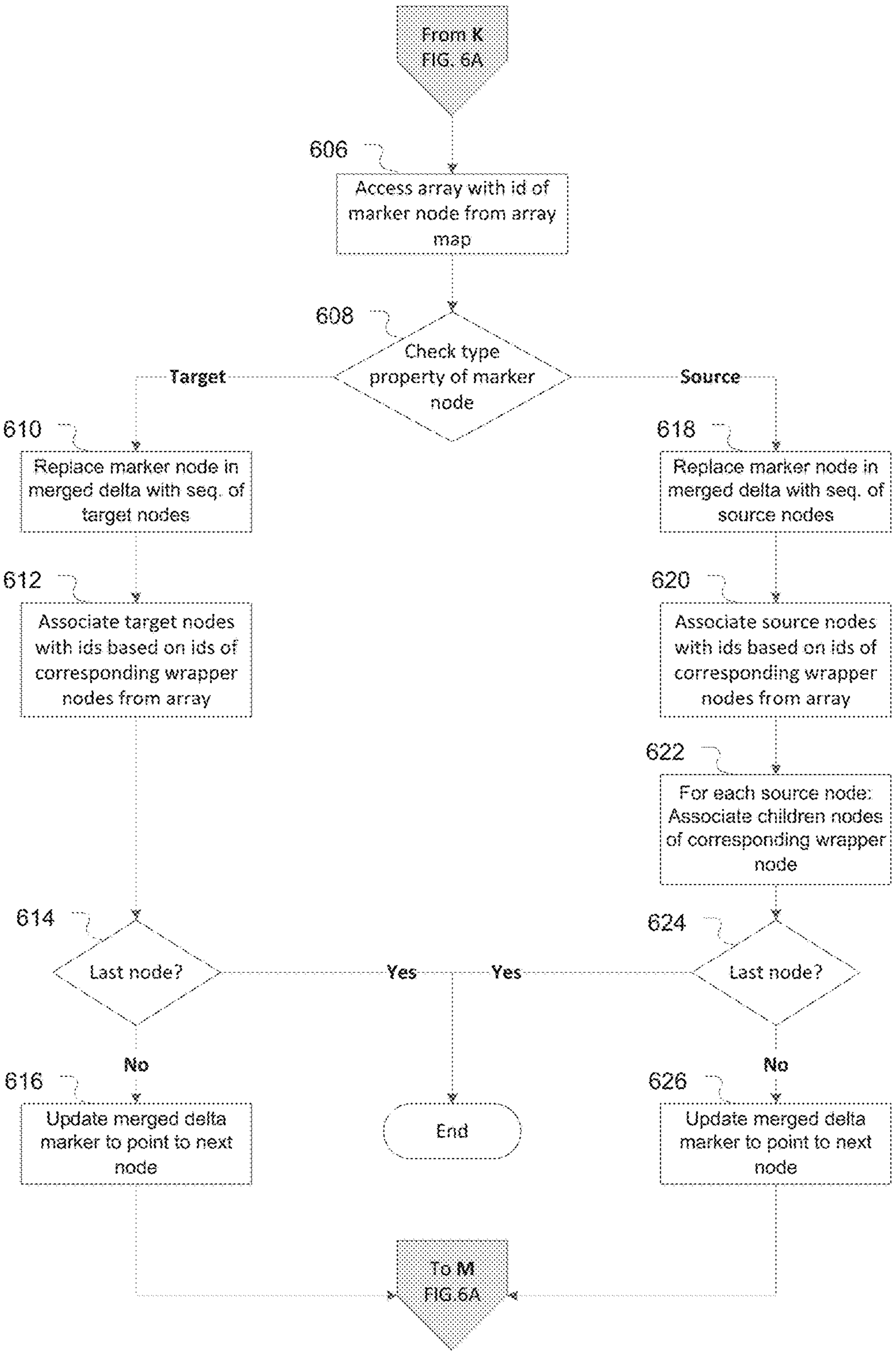
Figure 6C:
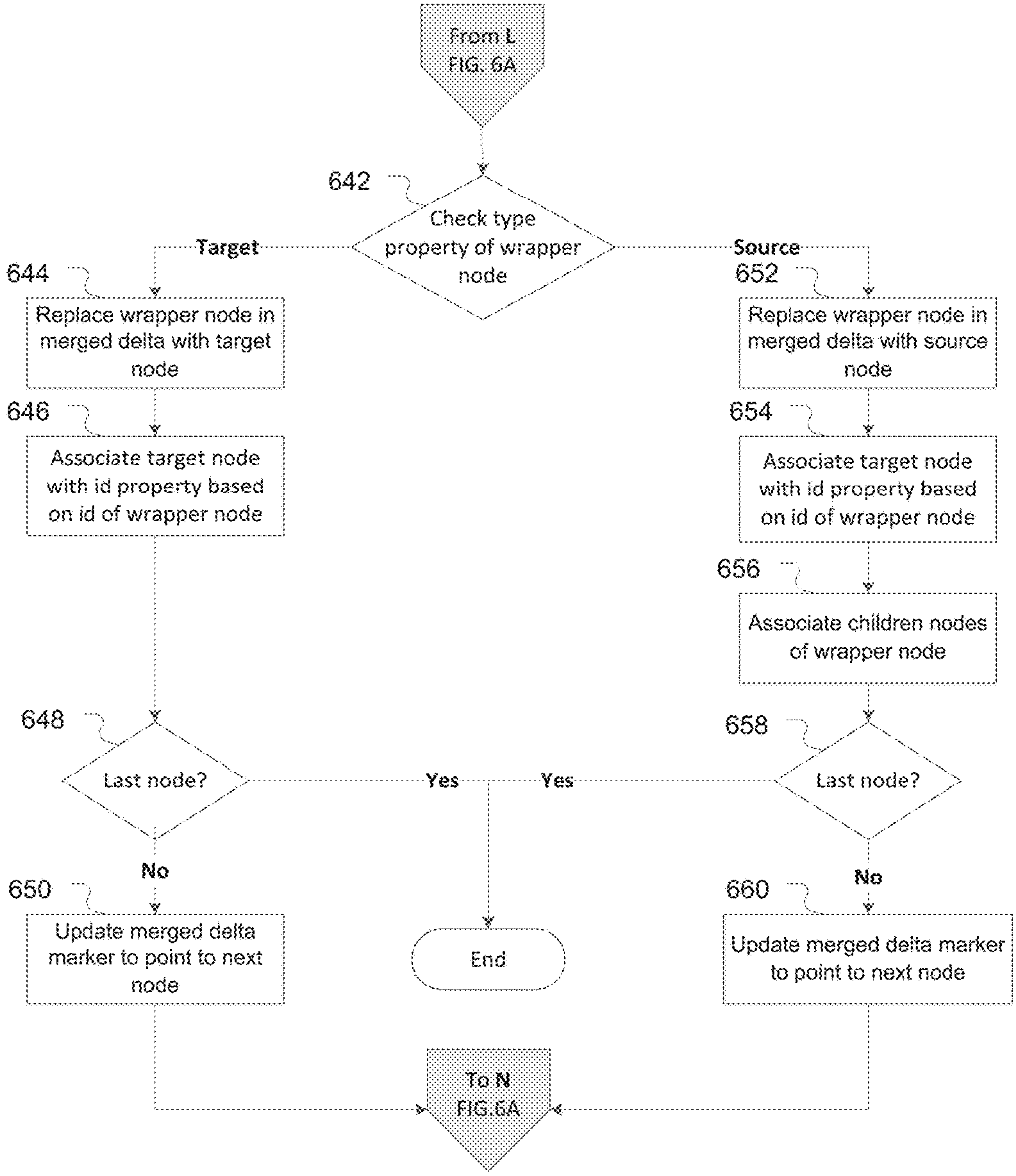

Following its generation, the merged delta (output at 508 in FIG. 5B) is processed using the move insertion algorithm 600, as shown in FIG. 6A to FIG. 6C.

At 602 a merged delta marker variable is initialized to point to the first node of the merged delta.

At 604 the current node of the merged delta (as indicated by the merged delta marker) is considered. Three possibilities exist: the current node is a marker node (see FIG. 6B), the current node is a wrapper node (see FIG. 6C), or the current node is a "normal" operation node (e.g. a retain, insert, or delete node) (see FIG. 6A).

Marker Node

As shown in FIG. 6B, if at 604 the current node is a marker node, the array map is looked up at 606 to access the array indexed by the index property of the current marker node.

At 608, the type property of the current marker node is checked.

If (at 608) the marker node is a "target" node, at 610 the marker node in the merged delta is replaced with a sequence of one or more target nodes, the number of target nodes being equal to the number of wrapper nodes in the array of wrapper nodes identified by the marker node identifier.

At 612 each target node added at 610 is associated with an identifier based on the identifier of the corresponding wrapper node from the array accessed at 606. If the wrapper node corresponding to a target node has a split-id property, the identifier of the target node takes the value of the secondary identifier of the wrapper node. Otherwise, the identifier of the target node takes the primary identifier of the corresponding wrapper node.

At 614 a check is made to identify whether the current node (per the merged delta marker) is the last node of the merged delta. If it is the process ends and the edit script (i.e. the merged delta as amended) is complete. If not, the merged delta marker is updated at 616 and the process returns to check 604.

If, at 608, the marker node has a "source" type property, at 618 the marker node in the merged delta is replaced with a sequence of source nodes, the number of source nodes being equal to the number of wrapper nodes in the array of wrapper nodes identified by the marker node identifier.

At 620, the source nodes added at 618 are associated with an identifier based on the identifier of the corresponding wrapper node from the array accessed at 606. If the wrapper node corresponding to a target node has a split-id property, the identifier of the source node takes the value of the secondary identifier of the wrapper node. Otherwise, the identifier of the source node takes the primary identifier of the corresponding wrapper node.

At 622, for each source node added at 618, the children nodes of the corresponding wrapper node are associated with that source node (i.e. made children of the source node).

At 624 a check is made to identify whether the current node (per the merged delta marker) is the last node of the merged delta. If it is the process ends and the edit script (i.e. the merged delta as amended) is complete. If not, the merged delta marker is updated at 626 and the process returns to check 604.

Wrapper Node

As shown in FIG. 6C, if at 604 the current node is a wrapper node, at 642, the type property of the current wrapper node is checked.

If (at 642) the current wrapper node is a "target" node, at 644 the wrapper node in the merged delta is replaced with a target node.

At 646, the target node added at 644 is associated with an identifier based on the identifier of the wrapper node that was encountered/checked at 642. If the wrapper node that was encountered has a split-id property, the identifier of the target node takes the value of the secondary identifier of the wrapper node. Otherwise, the identifier of the target node takes the primary identifier of the wrapper node that was encountered.

At 648 a check is made to identify whether the current node (per the merged delta marker) is the last node of the merged delta. If it is the process ends and the edit script (i.e. the merged delta as amended) is complete. If not, the merged delta marker is updated at 650 and the process returns to check 604.

If, at 642, if the wrapper node has a "source" type property, at 652 the wrapper node in the merged delta is replaced with a source node.

At 654, the source node added at 652 is associated with an identifier based on the identifier of the wrapper node that was encountered/checked at 642. If the wrapper node that was encountered has a split-id property, the identifier of the source node takes the value of the secondary identifier of the wrapper node. Otherwise, the identifier of the source node takes the primary identifier of the wrapper node that was encountered.

At 656, any children nodes of the wrapper node that was encountered are associated with the source node added at 652 (i.e. made children of the source node).

At 658, a check is made to identify whether the current node (per the merged delta marker) is the last node of the merged delta. If it is the process ends and the edit script (i.e. the merged delta as amended) is complete. If not, the merged delta marker is updated at 660 and the process returns to check 604.

Neither Wrapper Nor Marker Node

Returning to FIG. 6A, if at 604 the current node is neither a wrapper or a marker node (e.g. it is a retain, insert, or delete node) a check is made at 662 to identify whether the current node (per the merged delta marker) is the last node of the merged delta. If it is the process ends and the edit script (i.e. the merged delta as amended) is complete. If not, the merged delta marker is updated at 664 and the process returns to check 604.

Once the move insertion algorithm is complete the merged delta is output as the hierarchical edit script. This edit script can be applied to tree-A to generate tree-B.

2.5 Edit Script Generation: Worked Example

In order to illustrate operation of the hierarchical difference algorithm described above a specific example will be stepped through.

For this example tree-A and tree-B are represented by the following s-expressions:

Tree-A: (a (D) (b) (c))

Tree-B: (a (I) (b (c)))

FIGS. 8A and 8B provide hierarchical depictions of tree-A and tree-B respectively.

At 302 tree-A and tree-B are converted to linear sequences:

Linear sequence A: [a D b c]

Linear sequence B: [a I b c]

At 304 a sequential difference algorithm is applied to linear sequences A and B to generate a linear edit script. In this case the linear edit script is:

Linear edit script: ((retain a) (delete D) (insert I) (retain b) (retain c)).

Matching Algorithm 400

At 402: the tree-A marker is set to the first node of tree-A ("a"); the tree-B marker is set to the first node of tree-B ("a"); and the edit script marker is set to the first operation of the linear edit script ("retain a"). At this stage the delta-A and delta-B edit scripts are both empty.

In order to illustrate the matching algorithm 400 table 900 of FIG. 9 will be referenced. Each row of table 900 depicts an iteration of the matching algorithm, showing the current tree-A and tree-B nodes (per the tree-A and tree-B markers) and the current edit operation (per the edit script marker). The row also shows the changes to the delta-A edit script and/or delta-B edit script based on the current nodes/edit operation. In table 900 the current nodes and edit operation, and any operation appended to the delta-A or delta-B edit scripts based thereon, are indicated by highlighting and use of bold text.

The first iteration of the matching algorithm is illustrated by row 902 of table 900.

At 404 in the first iteration the edit script marker points to the "retain a" operation, the tree-A marker points to node "a", and the tree-B marker points to node "a".

As the current operation is a "retain" operation, a "retain" node is appended to both delta-A and delta-B at 406. The current delta-A and delta-B nodes (referenced by the tree-A and tree-B markers respectively) are both parent nodes—i.e. nodes at the beginning of a child sequence. As such the "retain" nodes appended to delta-A and delta-B are appended as parent nodes—i.e. "(retain ( )".

At 408 it is determined that further edit operations exist.

At 410: the tree-A marker is updated to point to the next node in tree-A, which is "D"; the tree-B marker is updated to point to the next node in tree-B, which is "I"; and the edit script marker is updated to point to the next operation in the linear edit script, which is "delete D". The process then returns to 404.

The second iteration of the matching algorithm is illustrated by row 904 of table 900.

At 404 the edit script marker points to the "delete D" operation, the tree-A marker points to node "D", and the tree-B marker points to node "I".

As the current operation is a "delete" operation, a "delete" node is appended to delta-A at 412. The current delta-A node is not a parent node and is not the end of a child sequence. Accordingly, the "delete" node appended to delta-A takes the same hierarchy—i.e. "delete) (".

At 414 it is determined that further edit operations exist.

At 416: the tree-A marker is updated to point to the next node in tree-A, which is "b" and the edit script marker is updated to point to the next operation in the linear edit script, which is "insert I". The process then returns to 404.

The third iteration of the matching algorithm is illustrated by row 906 of table 900.

At 404 the edit script marker points to the "insert I" operation, the tree-A marker points to node "b", and the tree-B marker points to node "I".

As the current operation is an "insert" operation, an "insert" node is appended to delta-B at 418. The current delta-B node is not a parent node and is not the end of a child sequence. Accordingly, the "insert" node appended to delta-B takes the same hierarchy—i.e. "insert) (".

At 420 it is determined that further edit operations exist.

At 422: the tree-B marker is updated to point to the next node in tree-B, which is "b" and the edit script marker is updated to point to the next operation in the linear edit script, which is "retain b". The process then returns to 404.

The fourth iteration of the matching algorithm is illustrated by row 908 of table 900.

At 404 the edit script marker points to the "retain b" operation, the tree-A marker points to node "b", and the tree-B marker points to node "b".

As the current operation is a "retain" operation, a "retain" node is appended to both delta-A and delta-B at 406. The current delta-A node is not a parent node and is not the end of a child sequence. Accordingly, the "retain" node appended to delta-A takes this hierarchy—i.e. "retain) (".

The current delta-B node is a parent node of a child sequence and is also the end of a child sequence itself (the child sequence of parent node a). As such the "retain" node appended to delta-B takes this hierarchy—i.e. "retain ( )".

At 408 it is determined that further edit operations exist.

The fifth iteration of the matching algorithm is illustrated by row 910 of table 900.

At 404 the edit script marker points to the "retain c" operation, the tree-A marker points to node "c", and the tree-B marker points to node "c".

As the current operation is a "retain" operation, a "retain" node is appended to both delta-A and delta-B at 406. The current delta-A and delta-B nodes are not a parent nodes and each is the end of a child sequence. Accordingly, the "retain" nodes appended to delta-A and delta-B take this hierarchy—i.e. "retain)".

At 408 it is determined that no further edit operations exist. This indicates that intermediate edit scripts delta-A and delta-B are complete:

Delta-A: (retain (delete D) (retain) (retain))

Delta-B: (retain (insert I) (retain (retain)))

As can be seen by comparing the hierarchical representation of delta-A and delta-B (provided in FIGS. 10A and 10B respectively) with the original hierarchical representations of tree-A and tree-B (FIGS. 8A and 8B), the structures of delta-A and delta-B match tree-A and tree-B respectively. The nodes in delta-A and delta-B, however, are operations rather than the actual nodes of tree-A and tree-B.

Merge Algorithm 500

In order to illustrate the operation of merge algorithm 500 table 1100 of FIG. 11 will be referred to. In the table, a bold highlighted carat character ("^") is used to indicate the current position in delta-A and delta-B (according to the delta-A and delta-B markers). Nodes inserted into (or moved in) delta-A or delta-B are indicated by bold/highlighted text.

Initially, as depicted by row 1102, the delta-A and delta-B markers point to the root nodes (both retain nodes).

The current delta-A and delta-B nodes are not the ends of child sequences (at 502). The current delta-A node is not a delete node (at 503). The current delta-B node is not an insert node (at 504). Neither node is the end of a child sequence (at 505). A 558 the delta-A node is not a wrapper node, and at 566 the delta-B node is not a wrapper node. At 574 the retain nodes are descended into. This results in the delta-A marker pointing to the "delete D" node, and the delta-B marker pointing to the "insert I" node as shown in row 1104. The process returns to 502.

At 502 the current delta-A and delta-B nodes are not the ends of child sequences (at 502). At 503 the delta-A marker does point to a delete node. At 516 the delete node is inserted at the current position in delta-B, as shown in row 1106.

At 518 the delta-A and delta-B markers are updated to descend the delete nodes. Neither delete node has any children nodes, so in both cases this results in the markers pointing to an empty location as shown in row 1108. The process returns to 502.

At 502 the empty locations are treated as the ends of the child sequences of the delete nodes. At 506 the markers do not point to the ends of the top-most child sequences (the delete nodes themselves being children of the root retain nodes). At 510 the markers do not point to child sequence nodes where both parents are wrapper nodes. Accordingly, at 514 the delta-A and delta-B markers are updated to ascend out of the current child sequences (i.e. out of the empty child sequences of the delete nodes). This results in the delta-A and delta-B markers pointing to the next siblings of the delete nodes: in the case of delta-A a retain node, and in the case of delta-B the "insert I" node, as shown in row 1110. The process returns to 502.

At 502 the current delta-A and delta-B nodes are not the ends of child sequences (at 502). At 503 the delta-A marker does not point to a delete node. At 504 the delta-B marker does point to an insert node. At 520 the insert node is inserted at the current position in delta-A as shown in row 1112.

At 522 the delta-A and delta-B markers are updated to descend the insert nodes (neither of which has any children) as shown in row 1114. The process returns to 502.

At 502 the empty locations referenced by the markers are treated as the ends of the child sequences. At 506 the markers do not point to the ends of the top-most child sequences. At 510 the nodes do not point to nodes in child sequences where both parents are wrapper nodes. Accordingly, at 514 the delta-A and delta-B markers are updated to ascend out of the current child sequences (i.e. out of the empty child sequences of the insert nodes). This results in the delta-A and delta-B markers pointing to the next sibling of the insert nodes—both being retain nodes as shown in row 1116. The process returns to 502.

At 502 the delta-A and delta-B markers don't both point to end of child sequences. At 503 delta-A does not point to a delete node. At 504 delta-B does not point to an insert node. At 505 neither delta-A nor delta-B points to the end of a child sequence. At 558 and 566 respectively the delta-A and delta-B nodes are not wrapper nodes. At 574 the retain nodes are descended into. This results in the delta-A marker pointing to an empty location (as the delta-A retain node does not have any children) and the delta-B marker pointing to the child retain node as shown in row 1118. The process returns to 502.

At 502 the delta-A and delta-B markers don't both point to end of child sequences. At 503 delta-A does not point to a delete node. At 504 delta-B does not point to an insert node. At 505 delta-A points to the end of a child sequence but delta-B does not. At 524 the parents of the child sequences are not wrapper nodes. At 544 a marker node is created, assigned an identifier (id-1 will be used, presuming the move identifier counter was initialized at 1), and added to delta-A and delta-B immediately before the current markers. At 546 the type of the wrapper nodes is set to "target" (as the current delta-A node is the end of a child sequence). This is shown in row 1120.

At 548 a new wrapper node is created and assigned the same id as the marker node (id-1 in this example). At 550 the type property of the new wrapper node is set to be "source". At 552 the remaining nodes from the delta-B child sequences (in this case a single retain node) are wrapped into the new wrapper node. This is depicted in row 1122.

At 554 the wrapper node is shifted up and out of the parent node of the delta-B child sequence, resulting in the wrapper node (and the nodes wrapped by it) becoming the next sibling of the original parent of the child sequence. This is shown in row 1124.

At 556 the current delta-A and delta-B markers are updated to ascend out of the parent nodes of the current child sequences. This results in the delta-A marker pointing to the final retain node in delta-A, and in the delta-B marker pointing to the newly inserted wrapper node. This is shown in row 1126. The process then returns to 502.

At 502 the delta-A and delta-B markers don't both point to end of child sequences. At 503 delta-A does not point to a delete node. At 504 delta-B does not point to an insert node. At 505 neither marker points to the end of a child sequence. At 558 the delta-A marker does not point to a wrapper node. At 566, the delta-B marker does point to a wrapper node. At 568 the remaining nodes in the delta-A child sequence (in this case a single retain node) are wrapped using the delta-B wrapper node. At 570 the wrapper node is associated with the greedy property. This is shown in row 1128.

At 572 the newly added delta-A wrapper node and the delta-B wrapper node are descended into. This is shown in row 1130. The process returns to 502.

At 502 the delta-A and delta-B markers don't both point to end of child sequences. At 503 the delta-A marker does not point to a delete node. At 504 delta-B marker does not point to an insert node. At 505 neither marker delta points to the end of a child sequence. A 558 and 566 neither node is a wrapper node. At 574 the retain nodes are descended into. This results in the delta-A and delta-B markers pointing to empty locations as shown in row 1132. The process returns to 502.

At 502 the delta-A and delta-B markers both point to end of child sequences. At 506 the parent nodes of the current children nodes are wrapper nodes. At 512 the wrapper node is added to the array map. This generates an array map of, for example:

```
{
    1 [wrapper-1]
}
```

At 514 the markers are updated to ascend out of the current parents—i.e. to point to the next sibling of the wrapper parent nodes. No next sibling exists so the pointers point to an empty location, as shown in row 1134.

At 502 the delta-A and delta-B markers both point to end of child sequences. At 506 both markers point to the ends of the top-most child sequences. At 508 the merged delta is returned. As can be seen from row 1032, both delta-A and delta-B are the same (with the exception of the greedy property in delta-A's wrapper node, which is not relevant/ignored in the move insertion algorithm 600).

The merged delta for this example, therefore, is:

Merged delta: (retain (delete D) (insert I) (retain (marker-1-target)) (wrapper-1-source (retain)))

Move Insertion Algorithm

The working example of the move insertion algorithm 600 will be described with reference to table 1200. Row 1202 shows the merged delta as generated b merge algorithm 500, with subsequent rows highlight changes made to the merged delta by the move insertion algorithm.

At 620 the merged delta marker is initialized to point to the first node of the merged delta.

At 604 the current node is not a marker or a wrapper node. At 662 it is determined that the current node is not the last node. At 664 the merged delta marker is updated to point to the next node—in this case the "delete D" node. Process loops through 604, 662, and 664 until the merged delta marker points to the "marker-1-target" node.

At 604 the node is a marker node. At 606 the array map is looked up and the array identified by the identifier of the marker node (in this case "1") is accessed. At 608 the type of the marker node is "target". At 610 the marker node is replaced with a single target node (as there is only one wrapper node in the array). The target node is assigned with the primary identifier of the wrapper node ("1"). This is depicted in row 1204.

At 614 the last node of the merged delta has not been reached. At 616 the merged delta marker is updated to point to the next node (the "wrapper-1-source" node).

At 604 a wrapper node reached. At 642 the type of the wrapper node is "source". At 652 the wrapper node is replaced with a source node. At 654 the source node is assigned with the primary identifier of the wrapper node ("1"). At 656 the children of the wrapper node (in this case a single retain node) are associated with the new source node. This is depicted in row 1206.

At 624 the merged delta marker points to the last node and the move insertion algorithm ends. The merged delta is then output as the edit script.

2.6 Hierarchical Edit Script Generation Clauses

Described herein is a computer implemented method for generating a hierarchical edit script, the method comprising: accessing a first hierarchical dataset and a second hierarchical dataset from one or more computer readable storage media; processing, using one or more computer processors, the first hierarchical dataset to generate a first linear sequence, the first linear sequence being a linear sequence of nodes defined in the first hierarchical dataset; processing the second hierarchical dataset to generate a second linear sequence, the second linear sequence being a linear sequence of nodes defined in the second hierarchical dataset; processing the first linear sequence and the second linear sequence using a difference algorithm to generate a linear edit script, the linear edit script defining a linear sequence of operations that can be applied to the first linear sequence to generate the second linear sequence; processing the linear edit script and the first hierarchical dataset to generate a first delta, the first delta having a same hierarchy as the first hierarchical dataset and comprising nodes describing retain operations and delete operations; processing the linear edit script and the second hierarchical dataset to generate a second delta, the second delta having a same hierarchy as the second hierarchical dataset and comprising nodes describing retain operations and insert operations; and processing the first delta and the second delta to generate the hierarchical edit script, the hierarchical edit script describing operations which can be applied to the first hierarchical dataset to generate the second hierarchical dataset, the hierarchical edit script defining at least one move operation, a move operation identifying one or more nodes that have been moved from an original location in the first hierarchical dataset to a new location in the second hierarchical dataset.

A move operation may be defined in the hierarchical edit script by a corresponding pair of source and target nodes, a source node indicating one or more nodes in the first hierarchical dataset that have been moved from an original position in the first hierarchical dataset, and a target node indicating a position in the second hierarchical dataset to which one or more nodes associated with a corresponding source node have been moved.

Processing the first delta and the second delta to generate the hierarchical edit script may comprise: maintaining a first delta position record indicating a current first delta position and a second delta position record indicating a current second delta position; comparing the current first delta position and the current second delta position; and in response to identifying that the current first delta position is at a child sequence boundary and the current second delta position is not at a child sequence boundary: identifying that a move operation has occurred; generating a source node identifying a source position for the move operation; generating a target node identifying a target position for the move operation; and identifying one or more nodes between the current second delta position and a second delta child sequence boundary as the one or more nodes that have been moved in the move operation.

Processing the first dataset to generate the first linear sequence may comprise processing the first dataset using a pre-order traversal algorithm; and processing the second dataset to generate the second linear sequence may comprise processing the second dataset using a pre-order traversal algorithm. In this case a child sequence boundary may be an end of a child sequence.

Processing the first dataset to generate the first linear sequence may comprise processing the first dataset using a post-order traversal algorithm; and processing the second dataset to generate the second linear sequence may comprise processing the second dataset using a post-order traversal algorithm. In this case a child sequence boundary may be a start of a child sequence.

Processing the linear edit script and the first dataset to generate the first delta may comprise: maintaining a linear edit script position record indicating a current linear edit script operation and a first dataset position record indicating a current first dataset node; processing the current linear edit script operation by: in response to the current linear edit script operation being a retain operation, inserting a retain operation into the first delta at a hierarchical position matching a hierarchical position of the current first dataset node; and in response to the current linear edit script operation being a delete operation, inserting a delete operation into the first delta at a hierarchical position matching a hierarchical position of the current first dataset node; and updating the linear edit script position record to point to a next operation in the linear edit script; and updating the first dataset position record to point to a next node in the first dataset.

Processing the linear edit script and the second dataset to generate the second delta may comprise: maintaining a linear edit script position record indicating a current linear edit script operation and a second dataset position record indicating a current second dataset node; processing the current linear edit script operation by: in response to the current linear edit script operation being a retain operation, inserting a retain operation into the second delta at a hierarchical position matching a hierarchical position of the current second dataset node; and in response to the current linear edit script operation being an insert operation, inserting an insert operation into the second delta at a hierarchical position matching a hierarchical position of the current second dataset node; and updating the linear edit script position record to point to a next operation in the linear edit script; and updating the second dataset position record to point to a next node in the second dataset.

The difference algorithm used to process first linear sequence and second linear sequence may be based on the Myers O(ND) Difference Algorithm.

Also described herein is a system for generating a hierarchical edit script, the system comprising one or more processors and one or more non-transitory computer readable storage media storing sequences of instructions which, when executed by the one or more processors, cause the one or more processors to perform a method for generating a hierarchical edit script as described above.

3. HIERARCHICHAL EDIT SCRIPT SIMPLIFICATION

Once an edit script has been generated it will, in some cases, be able to be simplified. One embodiment relates to systems and methods for simplifying a hierarchical edit script. The hierarchical edit script may, for example, have been generated according to difference algorithm 300 described above.

As a very simple example, consider the following hierarchical edit script with three operations (a parent retain node with two insert children nodes):

(retain (insert “a”) (insert “b”))

This hierarchical edit script can be simplified to an edit script with two operations (a parent retain node with a single insert child node):

(retain (insert “ab”))

Where an edit script can be simplified doing so is advantageous. In many cases a simplified edit script will: result in a smaller edit script (having repercussions for the transmission of the edit script between various systems); make transformations that need to be performed on an edit script more efficient (as less operations need to be transformed); make application of the edit script to a dataset more efficient (again as less operations are required).

A general algorithm for simplifying a hierarchical edit script will be described, followed by a worked example of that algorithm.

3.1. Edit Script Simplification Algorithm

Figures 12, 13:
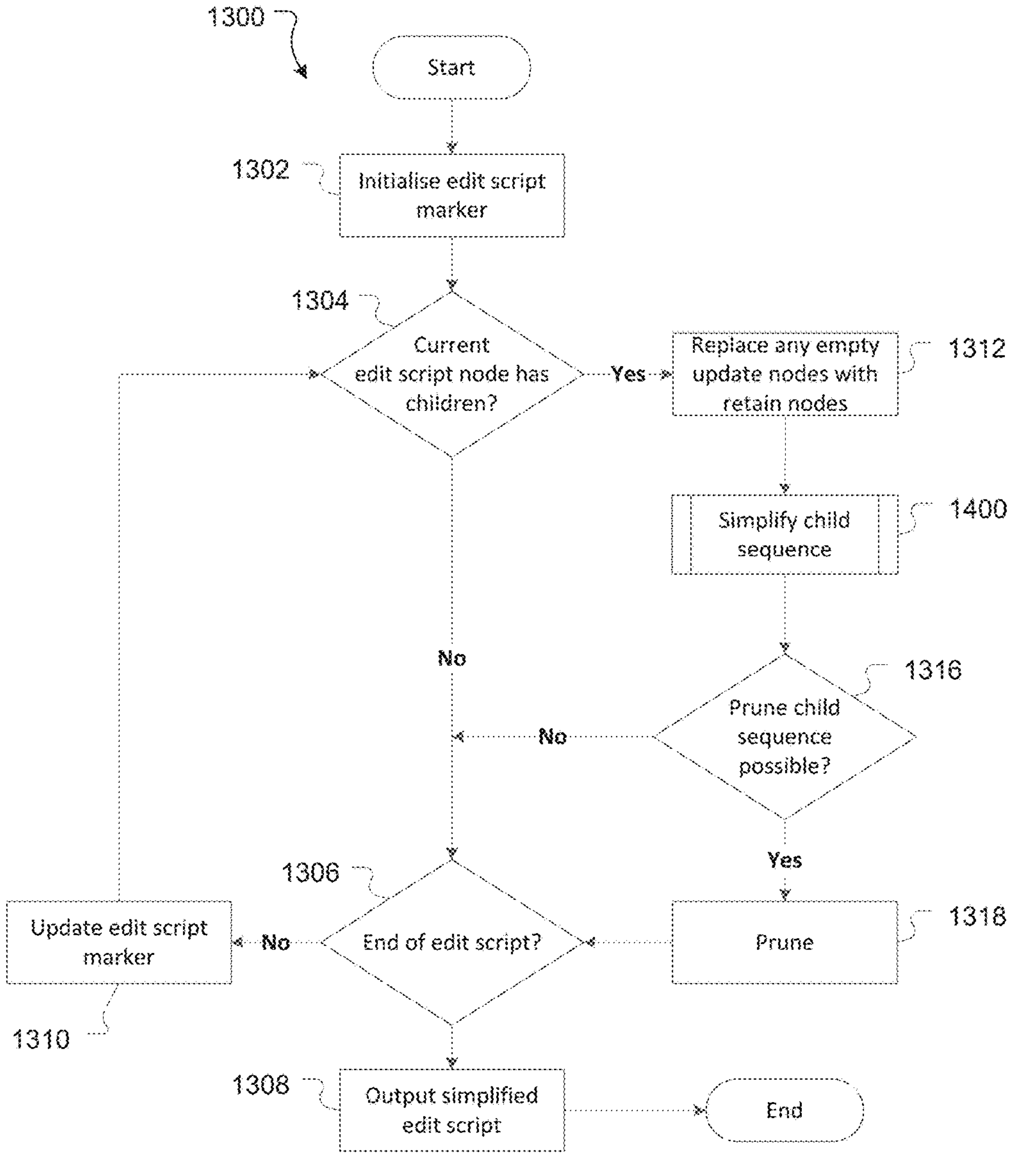
FIG. 12 is a table illustrating a worked example of the move insertion algorithm of FIG. 6A to FIG. 6C.
FIG. 13 is a flowchart illustrating an edit script simplification algorithm.

FIG. 13 is a flowchart depicting the steps involved in an edit script simplification algorithm 1300 according to an embodiment. The simplification algorithm 1300 takes as its input a hierarchical edit script: i.e. an edit script describing a hierarchy of nodes indicating operations to be performed on a dataset in state-A to generate a dataset in state-B.

During the simplification process the edit script is traversed using, in this embodiment, a depth first post-order traversal algorithm. In order to maintain a record of the current position in the edit script an edit script marker is used.

At 1302 the edit script marker is initialized to point to the first node of the edit script as defined by the traversal algorithm.

At 1304 the current edit script node (i.e. the node referenced by the edit script marker) is checked to see if it has any children.

If, at 1304, the current edit script node does not have any children it cannot be simplified and the algorithm proceeds to 1306.

At 1306 a check is made to determine if the end of the edit script has been reached. In the case of a depth first post-order traversal the root node is the last node reached). If the end of the edit script is reached the process is complete and the simplified edit script is output at 1308.

If, at 1306, the end of the edit script has not been reached, at 1310 the edit script marker is updated to point to the next edit script node (according to the traversal algorithm). The algorithm then returns to 1304.

If, at 1304, the current edit script node does have children the child sequence of the current edit script node is simplified.

In this embodiment, at 1312, the siblings of the child sequence are traversed and any empty update node is replaced with a retain node. An empty update node is an update node which does not define any update operations (e.g. (update{ }). Conversely, an update node that does define operations (e.g. (update {“attributes” {“name1” “value 2”}})) is not an empty update node. Empty update nodes are replaced with retain nodes on the basis that an update node that does not define any operations is operationally the same as a retain operation.

Replacement of empty update nodes with retain nodes in a child sequence can be achieved in a variety of ways. For example, the siblings of the child sequence can be sequentially traversed and if an empty update node is encountered it is deleted and a retain node is inserted in its place.

Following replacement of empty update nodes with retain nodes at 1312, the child sequence is simplified according to a child sequence simplification algorithm 1400. This algorithm is described in detail below with respect to FIG. 14.

Once the child sequence has been simplified, at 1316 a check is made to see whether pruning the child sequence of the current edit script node is possible.

Generally speaking, pruning a child sequence will be possible where expressing the entire child sequence as a single node is possible. For example, if all nodes depending from a "retain" parent node (children, grand-children etc.) are themselves retain nodes, then the entire sub-tree can be expressed by a single retain node. Similarly, if all nodes depending from a "delete" parent node (children, grand-children etc.) are themselves delete nodes, then the entire sub-tree can be expressed by a single delete node. In the present algorithm, pruning a child sequence will only be possible if: the current edit script node (i.e. the parent of the child sequence) is a retain or a delete node; the child sequence contains a single node of the same type as the parent node (noting that during the algorithm multiple siblings of the same type (and which have children of the same type) are progressively collapsed); and the single child node does not have any children of its own. In this case retention or deletion of the child sequence can be indicated by the parent node alone.

If, at 1316, the child sequence cannot be pruned the algorithm proceeds to 1306 (described above).

If, at 1316, the child sequence can be pruned this is performed at 1318. The child sequence is pruned by being deleted from the edit script, leaving the parent node in place (the parent node now having no children). The algorithm then proceeds to 1306.

3.2 Child Sequence Simplification Algorithm

Turning to FIG. 14, the algorithm for simplifying a child sequence will be described.

The child sequence simplification process generally involves traversing sequentially through the siblings of the child sequence. Adjacent siblings that can potentially be simplified and are of the same type are grouped together in a node group. Once a node group is complete—i.e. all sibling nodes that can be included in the node group have been—an attempt is made to simplify that node group. This involves condensing the node group into a single node describing all operations of the nodes in the node group, and replacing the node group with that single node.

In order to group or partition nodes that can be simplified a mechanism for grouping such nodes together is used. A node group may be identified/maintained/referenced in any appropriate way. By way of example, in the worked example discussed below a node group is identified by opening and closing square brackets, with any nodes bounded by the brackets being in the node group. In this example, opening a node group involves inserting an open square bracket into the edit script. Closing a node group involves inserting a closed square bracket into the edit script. Node groups may be implemented in alternative ways.

At 1402 a child sequence maker is initialized to point to the first child in the child sequence.

At 1404 the current child node (as indicated by the child sequence marker) is checked to see if it is a node that can potentially be simplified.

In the current embodiment, nodes that can potentially be simplified are: retain nodes with no children; delete nodes with no children; and insert nodes in respect of text with no children.

Nodes that cannot be simplified are: any node with its own children; insert nodes in respect of elements; update nodes (which in this particular embodiment will define operations given empty update nodes are replaced at 1312); source nodes; and target nodes.

If, at 1404, the current child node is not a node that can potentially be simplified, the process continues to 1416 (discussed below).

If, at 1404, the current child node is a node that can potentially be simplified, at 1406 a node group is created/opened and at 1408 the current node is added to the node group. In the current example opening the node group involves inserting a square bracket immediately before the current node, which serves to automatically add the current node to the node group.

At 1410 a check is made to see whether the next sibling of the current node (i.e. the next sibling of the node currently referenced by the child sequence marker) can be added to the open node group.

If the next sibling is a node of the same type as the node(s) currently in the node group and does not have any children of its own it can be added to the open node group. Where the current node is an insert node it must be an insert node in respect of text (given step 1404), and in order for the next sibling to be of the same type it must also be an insert node relating to text. Conversely, if the next sibling is a node of a different type as the node(s) currently in the node group, is a node with its own children nodes, or no next sibling exists (i.e. the child sequence maker points to the last child of the parent node), it cannot be added to the open node group.

If, at 1410, the next sibling can be added to the open node group, at 1412 the child sequence marker is updated to point to the next sibling and the process returns to 1408. In the present example, adding a node to an already open node group (at 1408) is effectively achieved by not closing the node group.

If, at 1410, the next sibling cannot be added to the open node group, at 1414 the node group is closed. In this example a node group is closed by adding a closing square bracket to the child sequence immediately after the current node referenced by the child sequence marker.

After a node group has been closed an attempt is made to simplify the node group (per 1440 to 1452 show in FIG. 14B and described below). Following simplification of the node group the process continues to 1416.

At 1416 a check is made to determine if the current node is the last sibling of the child sequence (i.e. the last direct child node of the parent). If the current node is not the last sibling of the child sequence, at 1418 the child sequence marker is updated to point to the next sibling in the child sequence and the process returns to 1404.

If, at 1416, the current node is the last sibling of the child sequence (i.e. no further direct children of the parent exist), simplification of the child sequence is complete. The process then proceeds to 1316 of FIG. 13.

Once a node group has been closed an attempt is made to simplify that node group. A closed node group in this embodiment takes the form [(node) (node) (node)], where all nodes in the node group are of the same type.

This process is described with reference to FIG. 14B.

At 1440 the type of the node group is checked. The type of the node group is determined according to the type of the node(s) in the node group: a node group with one or more retain nodes is a retain group; a node group with one or more insert nodes is an insert group; and a node group with one or more delete nodes is a delete group.

Retain Node Group

If, at 1440, the node group is a retain group, the process continues to 1442.

Adjacent sibling retain nodes without any children of their own can be collapsed into a single retain node. When multiple retain nodes are collapsed into a single retain node, that node is given a numeric parameter indicating the number of adjacent sibling retain nodes represented. For example the node ( . . . (retain 3) . . . ) is shorthand for three sibling retain nodes—i.e.: ( . . . (retain) (retain) (retain) . . . ).

More generally, the node "(retain n)" defines n adjacent sibling retain nodes.

In order to collapse retain nodes in a retain group, a new retain length is calculated. If a retain node does not have a length (i.e. it represents a single retain node) the new retain length is incremented by 1. If a retain node does have a length (i.e. represents a number of adjacent sibling retain nodes) the new retain length is incremented by that length. The node group is then replaced with a single retain node having a length equal to the new retain length calculated.

By way of specific example: [(retain)] simplifies to (retain); [(retain) (retain)] simplifies to (retain 2); [(retain) (retain 3) (retain 5)] simplifies to (retain 9).

In order to implement this, at 1442 the new retain length is calculated by summing the retain lengths of the retain nodes in the node group. Any retain node does not have a length parameter is treated as a (retain 1) node (i.e. having a length of 1). Where the node group contains a single retain node the new length is the length of that single node.

At 1444 the retain node group is replaced with a single retain node having a length equal to the new retain length. The child sequence marker is set to point at the newly added retain node.

Figure 14A:
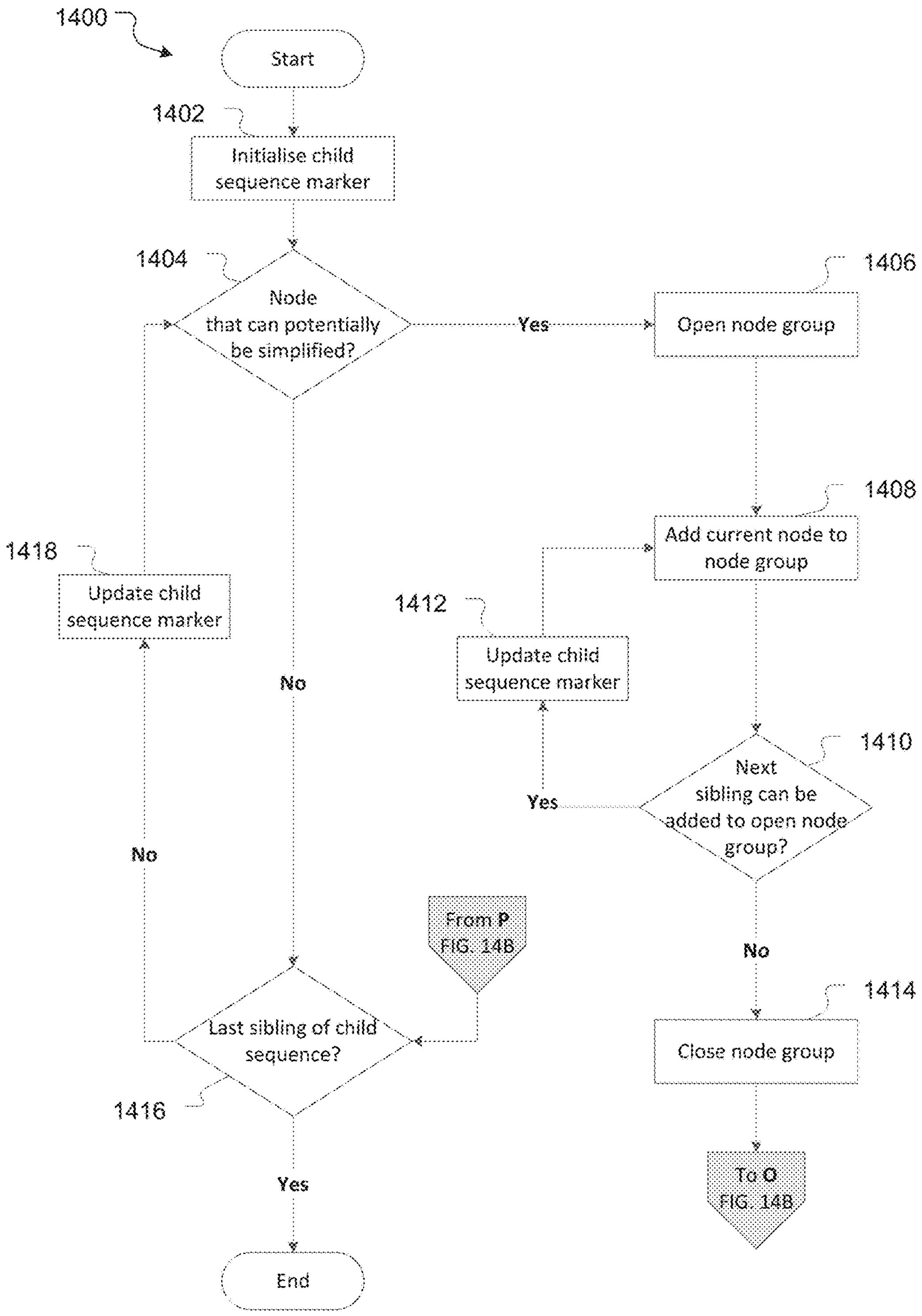
FIG. 14A and FIG. 14B are flowcharts illustrating a child sequence simplification algorithm.
Figure 14B:
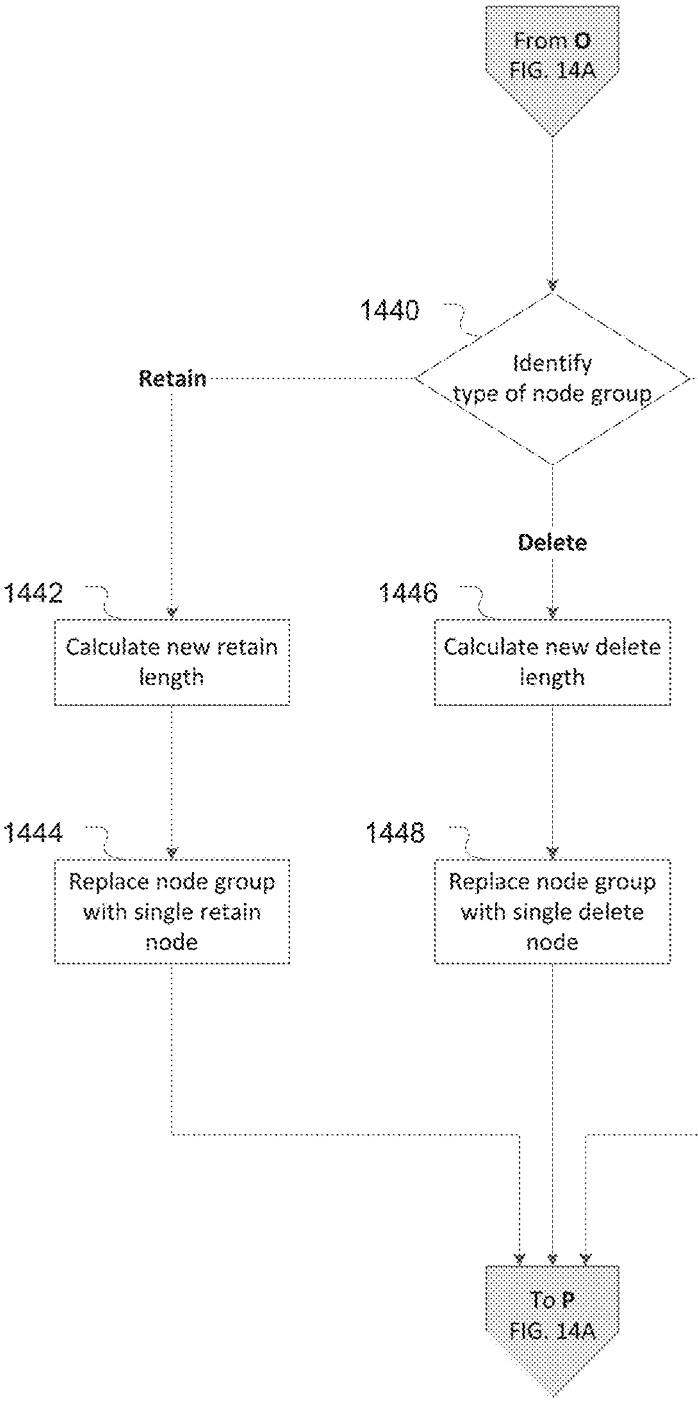
Figure 17:
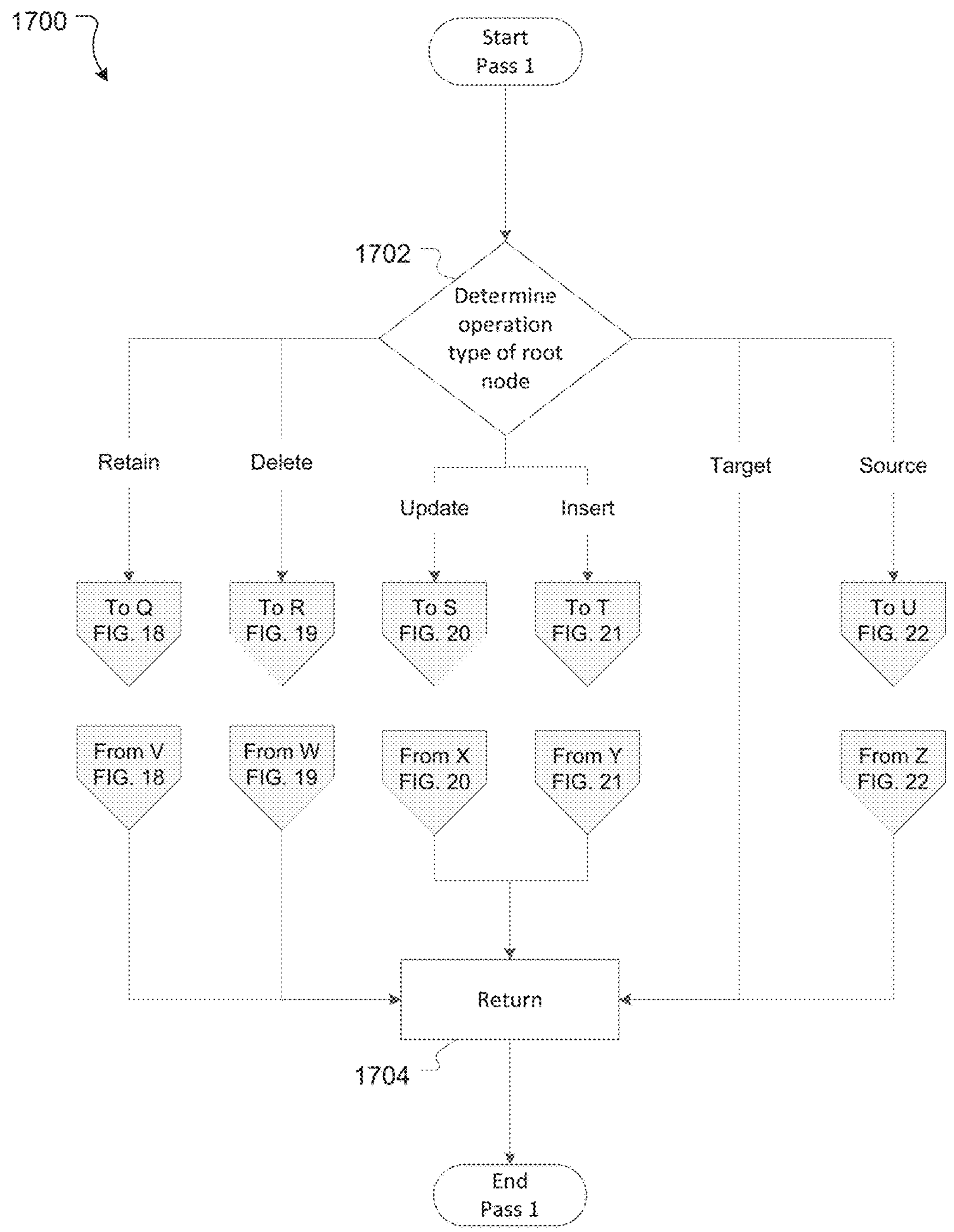
FIG. 17 is a flow chart illustrating steps involved in a first materialize algorithm pass.

The node group is then simplified and the process continues to 1416 (FIG. 14A).

Delete Node Group

If, at 1440, the node group is a delete node group, the process continues to 1446.

Delete node groups are handled in the same manner as retain node groups, with the group being replaced by a single delete node representing the number of delete nodes in the group.

At 1446 a new delete length is calculated by summing the delete lengths (if any) of the delete nodes in the node group. Any delete node does not have a length parameter is treated as a (delete 1) node (i.e. having a length of 1). Where the node group contains a single delete node the new length is the length of that single node.

At 1448 the node group is replaced with a single delete node having a length equal to the new delete length. The child sequence marker is set to point at the newly added delete node.

The node group is then simplified and the process continues to 1416 (FIG. 14A).

Insert Node Group

If, at 1440, the node group is an insert node group, the process continues to 1450.

Due to the operation at 1404 and 1410, the nodes of an insert node group will all relate to text. This being the case, adjacent insert node siblings can be collapsed by concatenating the insert text defined by each insert node into a single string.

For example, to simplify the following node group:

[(insert "string a") (insert "string b") . . . (insert "string n")]

A new string is generated which is the concatenation of "string a"+"string b"+ . . . +"string n". The node group is then replaced with a single insert node with the new string.

By way of specific example: [(insert "a")] simplifies to (insert "a"); [(insert "a") (insert "bc")] simplifies to (insert "abc"); [(insert "g") (insert "oo") (insert "d")] simplifies to (insert "good").

At 1450 a new string is formed by concatenating the strings of the insert nodes in the node group. Where the node group contains a single insert node the new string is the string of that single node.

At 1452 the node group is replaced with a single insert node defining the new string having a length equal to the new retain length. The child sequence marker is set to point at the newly added insert node.

The node group is then simplified and the process continues to 1416 (FIG. 14A).

3.3. Edit Script Simplification: Worked Example

In order to illustrate the edit script simplification algorithm an example will be walked through. For the purposes of the worked example the original hierarchical edit script input is:

(retain (delete (delete)) (retain) (retain) (insert "a") (insert "b") (retain (retain (target 1)) (source 1 (retain))))

In order to describe the walk through table 1500 of FIG. 15A and FIG. 15B will be referred to. In table 1500 a bold highlighted carat ("^") is used to indicate the position of the edit script marker, a bold highlighted asterisk ("*") is used to indicate the position of the child sequence marker, and changes made to the edit script/child sequence are indicated by bold highlighted text. In addition, a hierarchical depiction of the example edit script in its original form is provided at FIG. 16A.

Not all steps of the simplify algorithm will be stepped through at each iteration.

At 1302 the edit script marker is initialized to point to the first node reached by the traversal algorithm. As a depth first post-order traversal is used the first node is the (delete) node, as indicated in row 1502.

At 1304 the current delete node does not have any children of its own and at 1306 it is not the end of the edit script. Accordingly, at 1310 the edit script marker is updated to point to the next node: the (delete) node that is the first child of the root (retain) node as indicated in row 1504.

At 1304 the current node does have a child sequence (a single delete node). At 1312 the child sequence does not have any empty insert nodes to replace.

At 1314 the simplify process is called. At 1402 the child sequence marker is initialized to point to the first node in the child sequence of the (delete) node. This is the (delete) node as shown in row 1506.

At 1404 the child node can potentially be simplified (as it is a delete node without any children). At 1406 a node group is opened and at 1410 the current child node is added to the node group. In this example this is achieved by inserting an opening square bracket before the node indicated by the child sequence marker, as shown in row 1508.

At 1410 there is no next sibling, so at 1414 the child group is closed by (in this example) adding a closing square bracket after the node indicated by the child sequence marker. This is shown in row 1510, and provides a node group of: [(delete)]

At 1440 the node group is a delete node group. At 1446 a new delete length of 1 is calculated as there is a single delete node without an associated length. At 1448 the node group is replaced with a single delete node—in this example no length parameter is indicated as the length is "1". This is shown in row 1512. (Given, in this instance, the child sequence was already in its simplest form the original (delete) node is replaced with a new (delete) node).

At 1416 the current node is the last node of the child sequence to the process returns to 1316 to see if the child sequence can be pruned. As the parent node is a "delete" node and the child sequence is a single "delete" node with no children, the child sequence can be pruned. This is done at 1318 by deleting the child sequence. In other words, the sequence (delete (delete)) is replaced with a single delete node: (delete). This is shown in row 1514.

At 1306 the current node is not the end of the edit script. Accordingly, at 1310 the edit script marker is updated to point to the next node: the (retain) node that is the second sibling of the root retain node as indicated in row 1516.

At 1304 the (retain) node does not have any children of its own and at 1306 it is not the end of the edit script. Accordingly, at 1310 the edit script marker is updated to point to the next node: the (retain) node that is the third sibling of the root retain node as indicated in row 1518.

Following this, the series of steps in the preceding paragraph is performed to traverse through a number of nodes that do not have child sequences: the (insert "a") node as indicated in row 1520; the (insert "b") node as indicated in row 1522; the (target-1) node as indicated in row 1524.

When the edit script marker points to the (retain) node that is the parent of the (target-1) node: at 1304 the (retain) node does have a child sequence; at 1312 the child sequence does not have any empty insert nodes to replace; at 1314 the simplify process is called; at 1402 the child sequence marker is initialized to point to the first node in the child sequence (the (target-1) node—also indicated in row 1526); at 1404 the child sequence node cannot be simplified (as it is a target node); at 1416 the current child sequence node is the last node in the child sequence; at 1316 the child sequence cannot be pruned; at 1306 the end of the edit script has not been reached; and at 1310 the edit script marker is updated to point to the next node. This is the (retain) node that is the child of the (source-1) node, as shown in row 1528.

As the (retain) node that is the child of the (source-1) node does not have any children it cannot be simplified and the process results in the edit script marker being updated to point to the next node, which is the (source-1) node. This is shown in row 1530.

Dealing with the (source-1) node's child sequence (a single (retain) node) is similar to dealing with the (delete) node's child sequence as discussed above. Processing the child sequence result in no change being made (as the single-node child sequence is already in its simplest form). The process continues to 1316 where the child sequence cannot be pruned (as the child sequence is a (retain) node and the parent is a (source) node), and then to 1310 to update the edit script marker to point to the next node: the (retain) node that is the parent of the (retain) and (source-1) retain nodes as indicated in row 1532.

At 1304 the (retain) node does have a child sequence: "(retain (target 1)) (source 1 (retain))", the two siblings of the child sequence being the underlined (retain) and (source-1) nodes. At 1312 the child sequence does not have any empty insert nodes to replace. At 1314 the simplify process is called. At 1402 the child sequence marker is initialized to point to the first node in the child sequence (the (retain) node, as shown in row 1532). At 1404 the child node cannot potentially be simplified (as the child node has a child of its own). At 1416 the child node is not the last sibling of the child sequence. At 1418 the child sequence marker is updated to point to the next sibling of the child sequence—the (source-1) node, as shown in row 1534.

In a similar fashion to the preceding paragraph, the algorithm determines that the (source-1) node cannot be simplified at 1404 as it has its own child node. At 1416 the (source-1) node is the last sibling of the child sequence, at 1316 the child sequence cannot be pruned, at 1306 the current node is not the end of the edit script, and at 1310 the edit script marker is updated to point to the next node. This is the (retain) root node, as shown in row 1536 of FIG. 15B.

The process continues to 1402 and initializes the child sequence marker to point to the (delete) node, as indicated in row 1536. At 1404 the node can potentially be simplified so a node group is opened at 1406 and the node is added to the group at 1408. At 1410 the next sibling (the (retain) node) cannot be added to the group as it is a different type of node. Accordingly, the group is closed at 1414—the group being [(delete)]. This cannot be simplified further so no change is made in the simplify process (except for essentially removing the node group brackets). The child script marker is eventually updated to point to the next sibling—the (retain) node—as shown in row 1538.

At 1404 the node can potentially be simplified; at 1406 a node group is opened; at 1408 the node is added to the node group; at 1410 the next sibling (the (retain) node) can be added to the node group; at 1412 the marker is update to point to the next sibling, as shown in row 1540 (which also indicates the open square bracket opening the node group).

At 1408 the (retain) node is added to the node group (essentially by not closing the node group before it), and at 1410 the next sibling (the (insert "a") node) cannot be added to the node group. At 1414 the node group is closed, giving a node group of [(retain) (retain)] and the simplify process is called. At 1442 a new length of 2 is calculated, and at 1444 the node group is replaced with a single (retain 2) node and the child sequence marker is update to point to that node. This is shown in row 1542.

At 1418 the child sequence marker is updated to point to the next sibling—the "(insert "a") node, as shown in row 1544.

The algorithm progresses adding the (insert "a") and (insert "b") nodes to a node group (1408, 1410, and 1412). The insert node group is simplified by concatenating the strings (1450) and replacing the node group with a single insert operation—(insert "ab") at 1452. The result of these processing steps is shown at row 1546.

The algorithm progresses but no further changes are made to the child sequence. The next sibling is the (retain) node that is the parent of the (retain) and (source-1) nodes as shown at row 1548. This sibling cannot be simplified at 1404 as it has children of its own. At 1416 it is the last sibling of the child sequence, and at 1316 the child sequence cannot be pruned. At 1306 the edit script marker points to the root node, which is the last node of the child sequence, and at 1308 the simplified edit script is output.

Following the simplification algorithm the edit script is:

(retain (delete) (retain 2) (insert "ab") (retain (retain (target 1)) (source 1 (retain))))

A tree diagram representation of the simplified edit script is shown at FIG. 16B.

3.4 Hierarchical Edit Script Simplification Clauses

Described herein is a computer implemented method for simplifying a hierarchical edit script, the hierarchical edit script comprising nodes describing operations which can be applied to dataset A to generate dataset B, the method comprising: identifying nodes in the hierarchical edit script that can potentially be simplified; forming one or more node groups, each node group comprising one or more sibling nodes from the hierarchical edit script that are of a same node type and that can potentially be simplified; and for each node group: identifying a node group type based on a type the node or nodes in the node group; based on the node group type, processing the node group to generate a single node, the single node capturing the operations described be the node or nodes in the node group; and replacing the node group in the hierarchical edit script with the single node.

A retain node that does not have any children of its own is a node that can potentially be simplified and a node group having sibling retain nodes is identified as a retain type node group. Processing a retain type node group to generate a single node may comprise: calculating a new retain length indicating the number of retain operations to be expressed by the single node; and generating a single retain node and associating it with the new retain length.

A delete node that does not have any children of its own is a node that can potentially be simplified and a node group having sibling delete nodes is identified as a delete type node group. Processing a delete type node group to generate a single node may comprise: calculating a new delete length indicating the number of delete operations to be expressed by the single node; and generating a single delete node and associating it with the new delete length.

An insert node in relation to text and that does not have any children of its own is a node that can potentially be simplified and a node group having sibling insert nodes is identified as an insert type node group. Processing an insert type node group to generate a single node may comprise: generating a new string, the new string being a concatenation of strings associated with the node or nodes in the insert type node group; and generating a single insert node and associating it with the new string.

The method may further comprise identifying empty update nodes in the hierarchical edit script, an empty update node being an update node that does not define an update operation; and replacing empty update nodes identified in the hierarchical edit script with retain nodes.

The method may further comprise identifying any prunable parent-child node combinations in the hierarchical edit script; and for any prunable parent-child node combination identified: pruning the parent-child node combination by deleting the child node from the hierarchical edit script.

A prunable parent-child node combination may include a parent node which is a retain node and which has a child sequence including only retain nodes.

A prunable parent-child node combination may include a parent node which is a delete node and which has a child sequence including only delete nodes.

Also described herein is a system for simplifying a hierarchical edit script, the system comprising one or more processors and one or more non-transitory computer readable storage media storing sequences of instructions which, when executed by the one or more processors, cause the one or more processors to perform a method for simplifying a hierarchical edit script as described above.

4. Hierarchical Edit Script Materialization

As described above, a hierarchical edit script describes operations which can be applied to a dataset (e.g. dataset A) to generate a modified or updated version of that hierarchical dataset (e.g. dataset B).

Processing an edit script and input dataset to generate a new dataset will be referred to as materialization. Materialization may be performed in a variety of circumstances. For example, and returning to the concurrent editing example described above, an edit script may be materialized on a local version of a document in order to incorporate changes made by another user to their own local version of the document, thereby aligning the two documents.

In this embodiment, materialization of an edit script and original dataset involves performing two processing passes of the dataset and edit script. In the first pass the materialize algorithm processes the edit script and original dataset (which will be referred to as dataset A) to perform non-move edit script operations—i.e. edit script operations that do not involve moving nodes such as retain, delete, update, and insert operations. In addition, during the first pass information regarding move operations that need to be performed is accumulated. In the second pass the materialize algorithm uses the move information accumulated in the first pass to perform the move operations defined by the edit script.

In each pass the materialize algorithm iterates over the nodes of the edit script and dataset that are input. The edit script input to the materialize algorithm is either an edit script with a root node having children or an edit script with a single node (i.e. a root node with no children). The processing steps performed are determined according to the operation type defined by the edit script root node. If the root node has children these are processed in turn by recursively calling new materialize instances on each child node (noting that a child node may have its own children resulting in further recursion).

In the implementation described the materialize algorithm makes use of two variables to store information relating to move operations. These will be referred to as moves and state.

The moves variable stores node(s) from dataset A that relate to a particular move (the move being identified by the identifier of a source/target node pair). In the implementation described the moves variable is a hash map. For each entry of the moves map the key is the identifier of a source/target node pair and the value is the node(s) from the dataset that are to be moved from its/their original position to the position indicated by the target node of the source/target node pair. E.g.:

```
Moves = {
1: [nodes(s) from dataset A that relate to target node 1]
2: [nodes(s) from dataset A that relate to target node 2]
...
n: [node(s) from dataset A that relate to target node n]
}
```

The state variable stores the edit script sequence that relates to a particular move (again, the move identified by the identifier of a source/target node pair). This information is accumulated and stored in order to account for the possibility that (and allow processing where) an edit script move node has one or more children nodes that themselves define move operations (i.e. one or more source or target children nodes). In the implementation described the state variable is also a hash map. For each entry of the state map the key is the identifier of a source/target node pair and the value is the edit script sequence related to that source node (i.e. the edit script sequence including a source root node and all children of that source node). E.g.:

```
State = {
1: (source 1 (...))
2: (source 2 (...))
...
n: (source n (...))
}
```

The variables input to a given instance of the materialize algorithm (whether in the first or second processing pass) are shown in Table A:

TABLE A

| Values input to materialize | |
|---|---|
| Input | Description |
| Index | A value referencing a position in the dataset |
| Dataset | The dataset to be processed |
| Edit script | The edit script to be processed (e.g. an s-expression including one or more nodes) |
| Moves | The moves map described above |
| State | The state map described above |

In the edit script materialization description the dataset input to a given materialize instance may be an array/sequence (e.g. a sequence of nodes) or a map (e.g. an attribute map). For most of the operations/processing described below (e.g. the processing of edit script retain, delete, and insert nodes) the elements (and sub-elements) of the dataset—i.e. the nodes—have a sequential property (children). For example, in the dataset [["a" "b" "c"]] the outer vector is the root of the tree and the inner vector contains the children of that (unnamed) root node. In the case of an update operation a dataset has additional properties which are discussed further below. Edit scripts will be expressed using s-expression notation.

The return values of a given instance of the materialize algorithm (whether in the first or second processing pass) are shown in Table B:

TABLE B

| Materialize return values | |
|---|---|
| Output | Description |
| Index | The value of the index variable (as updated during processing) |
| Dataset | The value of the dataset variable (as updated during processing) |
| Moves | The value of the moves map (as updated during processing) |
| State | The value of the state map (as updated during processing) |

In order to generate dataset B, a main materialize function operates to call two passes of the input dataset and edit script. These will be referred to the first and second passes of the materialize algorithm. When invoked, the main materialize function initially calls the first pass. The inputs to the first pass are the input dataset (dataset A) and the edit script. When the first pass returns the main materialize function calls the second pass using the dataset, moves and state values returned by the first pass. The general steps performed are similar in both passes, however the manner in which the different types of edit script nodes are processed can differ depending on which pass of the algorithm is being performed.

In both passes the materialize algorithm performs operations based on the operation type of the edit script root node input to the materialize instance. If the edit script root node has children the algorithm recursively processes each child node in turn. Materialize instances recursively called from in the first pass are processed in accordance with the first pass. Similarly, materialize instances recursively called in the second pass are processed in accordance with the second pass.

A call to the first or second pass returns when the input edit script to the call consists of a single node without children or, if the edit script root node does have children, when all child nodes have been processed. The outputs of a given call to the first or second pass are as shown in Table B above.

4.1 Materialization: First Processing Pass

FIG. 17 to FIG. 22 provide flow charts depicting processing performed in the first processing pass of the materialize algorithm.

When calling the first pass of the materialize algorithm the input arguments are as follows. The index is a value that points to the first element in the dataset (e.g. "0"). The dataset is dataset A in its entirety. The edit script is the edit script defining the operations to be performed on dataset A. Moves is empty. State is empty. For the first pass the root node to the edit script will be either a retain node or an update node.

At 1702 the type of operation defined by the root node of the edit script input to materialize is determined.

Following 1702, the specific processing steps performed are based on the operation type defined by the root node. This processing is described in detail below. Once the processing has been completed (which, if the root node of the edit script has children, will involve recursion) the materialize algorithm returns at 1704.

The pass 1 processing for each different type of root node will be described in detail in the following order:

4.1.1 Retain-type root node pass 1
4.1.2 Delete-type root node pass 1
4.1.3 Update-type root node pass 1
4.1.4 Insert-type root node pass 1
4.1.5 Target-type root node pass 1
4.1.6 Source-type root node pass 1

In order to further illustrate the principles of the algorithm worked examples are provided in section 4.3 below.

4.1.1 First Processing Pass: Retain Root Node

Figure 18:
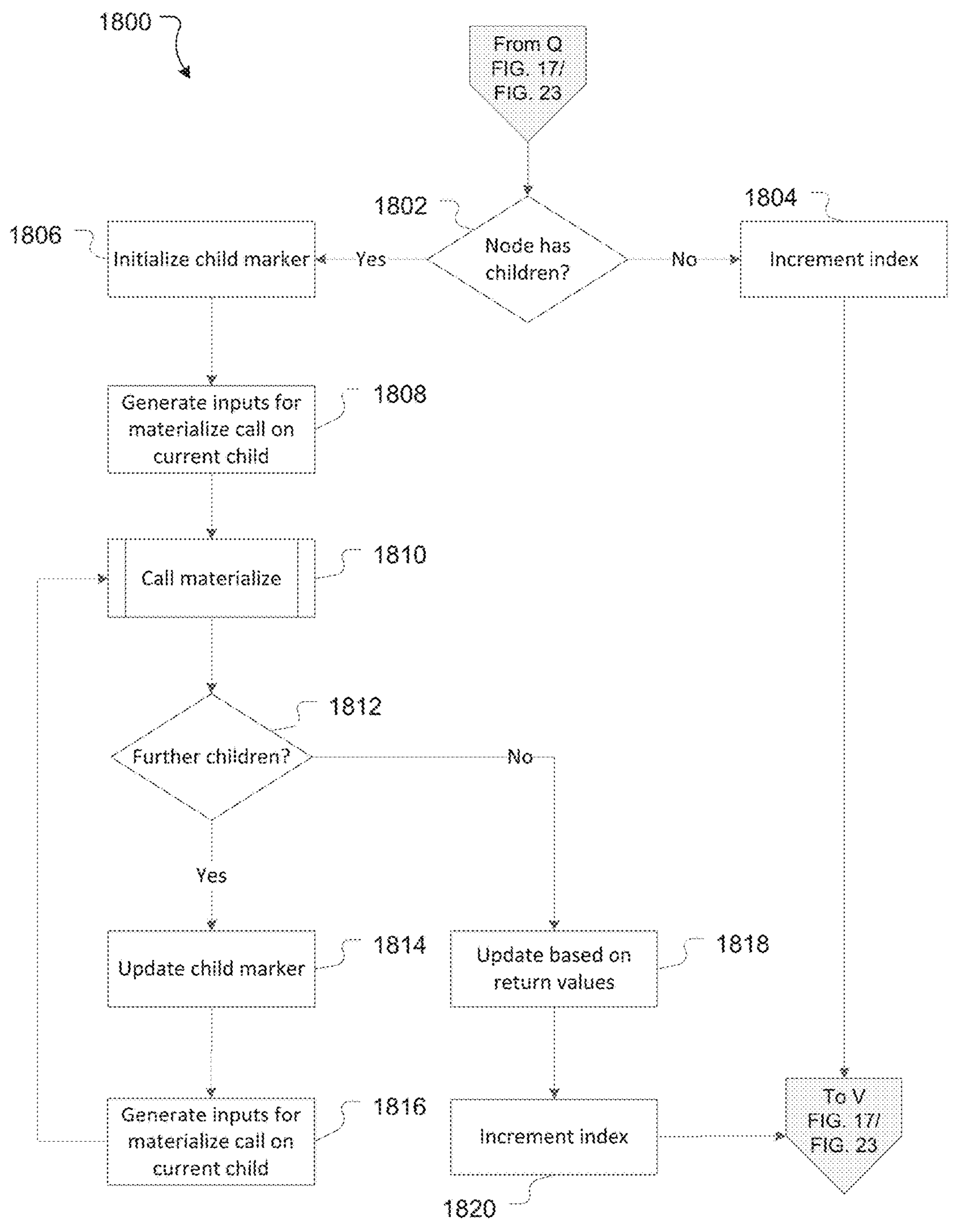
FIG. 18 is a flow chart illustrating steps involved in a first materialize algorithm pass where the input edit script has a retain root node.

If, at 1702, the root node of the edit script input is a retain node the operations illustrated in flowchart 1800 of FIG. 18 are performed.

At 1802 a check is made to see if the root node has any children.

Retain Operation Pass 1—No Children

If the retain node does not have any children, at 1804 the index that was input to the materialize instance is incremented.

The increment made to the index is determined according to the length of the retain node. If the retain node does not specify a length it is treated as a having length of 1 (i.e. a single retain operation) and the index is incremented by 1. If the retain node does have a specific length (e.g. retain n, indicating n retain operations) the index is incremented by n.

If the node does not have any children no other changes are made to the variables and the process returns at 1704. The index return value is the index as incremented at 1804. The dataset, moves, and state return values are the corresponding values that were input to the materialize instance.

Section 4.3.1 below provides a worked example of a materialize instance in the first pass that has an edit script input with a retain-type root node and no children.

Retain Operation Pass 1—Children

If, at 1802, the root node of the edit script is a retain root node that does have children, each child is processed in turn by recursive calls to the materialize algorithm.

At 1806 a child marker is initialized to point to the first child of the edit script root node.

At 1808 inputs to a new materialize instance are generated. The index to be input to the new materialize instance is set to 0. The dataset input for the new materialize instance is the element of the current materialize dataset that is indicated by the index of the current materialize instance. The edit script input for the new materialize instance is the child of the current materialize edit script that is indicated by the child marker. The moves and state inputs to the new materialize instance are the moves and state values of the current materialize instance.

At 1810 the new instance of the materialize algorithm is called based on the inputs generated at 1808. The new materialize instance returns outputs as described above (i.e. index, dataset, moves, state).

At 1812 a check is performed to see whether there are further children of the edit script root node to process.

If, at 1812, further children need to be processed, the child marker is updated to point to the next child of the root node at 1814.

At 1816 inputs to a new materialize instance are generated. The index, dataset, moves and state inputs to the new materialize instance are the corresponding values as returned by the immediately preceding materialize instance called at 1810. The edit script input to the new materialize instance is the child indicated by the child marker.

At 1810 the new materialize instance is called using the inputs generated at 1816.

If, at 1812, no further children of the root node exist variables of the current materialize instance are updated at 1818. This update is based on the dataset returned by the last materialize instance called at 1810. The element of the dataset indicated by the index of the current materialize instance (i.e. not the index returned by a new materialize instance) is replaced by the dataset returned by the last materialize instance called at 1810. The moves and state variables of the current materialize instance are replaced by the moves and state values returned by the last materialize instance.

At 1820 the index of the current materialize instance is incremented.

At 1704 the current materialize instance returns. The index return value is the index as incremented at 1820. The dataset, moves, and state return values are the values as updated at 1818.

Section 4.3.2 below provides a worked example of a materialize instance in the first pass that has an edit script input with a retain-type root node that has children.

4.1.2 First Processing Pass: Delete Root Node

Figure 19:
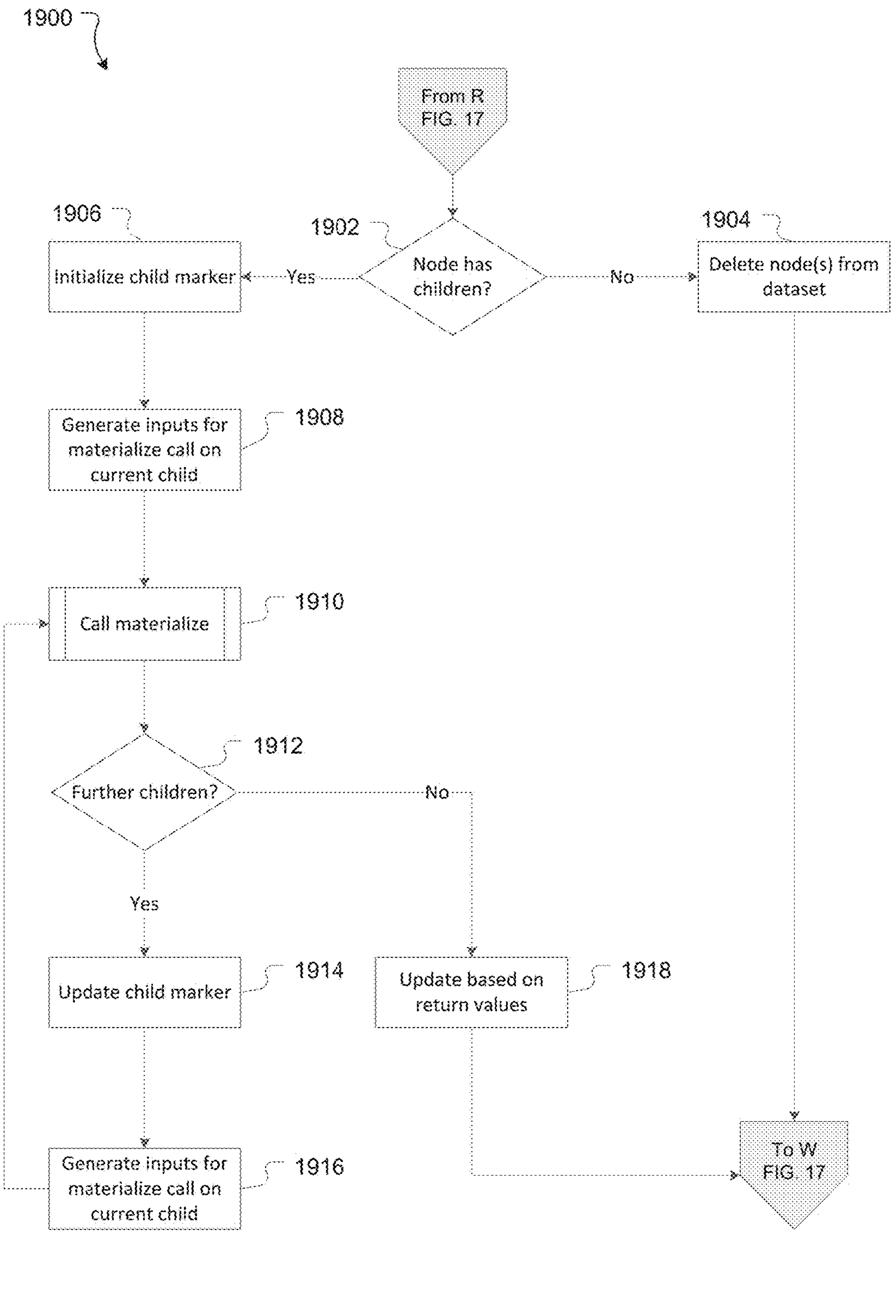
FIG. 19 is a flow chart illustrating steps involved in a first materialize algorithm pass where the input edit script has a delete root node.

If, at 1702, the root node of the edit script is a delete node the operations illustrated in flowchart 1900 of FIG. 19 are performed.

At 1902 a check is made to see if the root node has any children. A delete node may have one or more source node children. In this case although a sub-tree is being deleted from the dataset one or more nodes of that sub-tree are actually being moved to a new location in the dataset.

Delete Node Pass 1—No Children

If the delete node does not have any children, at 1904 elements are deleted from the dataset input to the materialize instance.

If the delete node does not specify a length (or specifies a length of 1) a single element is deleted from the dataset at the position indicated by the index. If the delete node specifies a length greater than 1 (e.g. delete n), n elements are deleted from the dataset starting at the position indicated by the index.

In the case of a delete node the index is not incremented and no other changes are made to the input variables. At 1704 the materialize instance returns. The dataset return value is the dataset as updated at 1904. The index, moves, and state return values are the corresponding values that were input to the materialize instance.

Section 4.3.3 below provides a worked example of a materialize instance in the first pass that has an edit script input with a delete-type root node with no children.

Delete Node Pass 1—Children

If, at 1902, the root node of the edit script is a delete node that does have children, each child is processed in turn by recursive calls to the materialize algorithm.

At 1906 a child marker is initialized to point to the first child of the edit script root node.

At 1908 inputs to a new materialize instance are generated. The index to be input to the new materialize instance is set to 0. The dataset input for the new materialize instance is the element of the current materialize dataset that is indicated by the index of the current materialize instance. The edit script input for the new materialize instance is the child of the current materialize edit script that is indicated by the child marker (which may itself have children nodes). The moves and state inputs to the new materialize instance are the moves and state values of the current materialize instance.

At 1910 the new instance of the materialize algorithm is called based on the inputs set at 1908. The new materialize instance returns outputs as described above (i.e. index, dataset, moves, state).

At 1912 a check is performed to see whether there are further children of the edit script root node to process.

If, at 1912, further children need to be processed, the child marker is updated to point to the next child of the root node at 1914.

At 1916 inputs to a new materialize instance are generated. The index, dataset, moves and state inputs to the new materialize instance are the corresponding values as returned by the immediately preceding materialize instance called at 1910. The edit script input to the new materialize instance is the child indicated by the child marker.

After preparing inputs at 1916 the new materialize instance is called at 1910.

If, at 1912, no further children of the root node need to be processed the variables of the current materialize instance are updated at 1918. This update is based on the dataset returned by the last materialize instance called at 1910. The element of the dataset indicated by the index of the current materialize instance is replaced by the dataset returned by the last materialize instance. The moves and state variables of the current materialize instance are replaced by the moves and state values returned by the last materialize instance.

As the root node is a delete node the index is not incremented.

At 1704 the current materialize instance returns. The index return value is the index as originally input. The dataset, moves, and state return values are the values as updated at 1918.

Section 4.3.4 below provides a worked example of a materialize instance in the first pass that has an edit script input with a retain-type root node that has children.

4.1.3 First Processing Pass: Update Root Node

Figure 20:
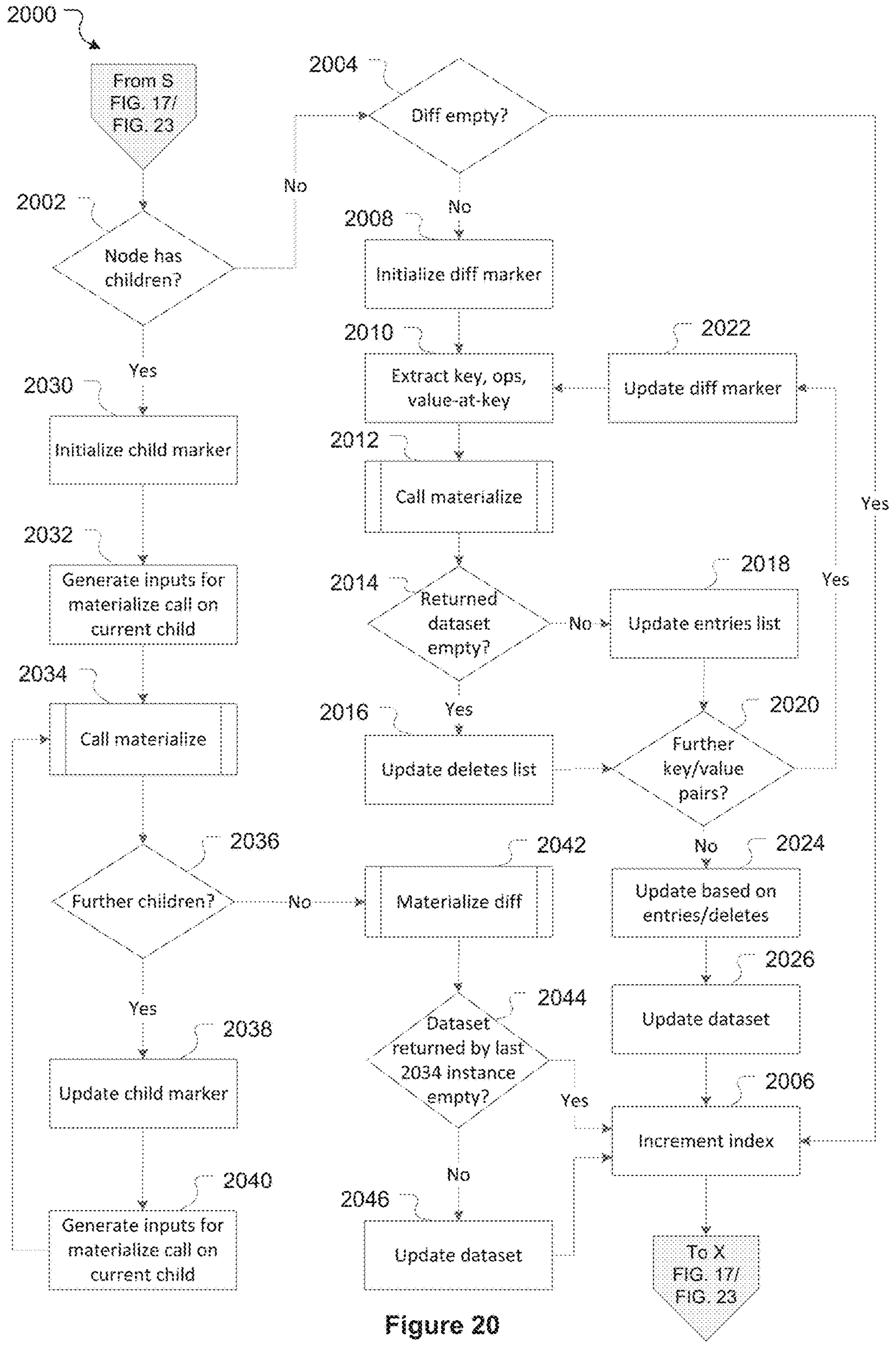
FIG. 20 is a flow chart illustrating steps involved in a first materialize algorithm pass where the input edit script has an update root node.

If, at 1702, the root node of the edit script is an update node the operations illustrated in flowchart 2000 of FIG. 20 are performed.

Update nodes have a diff property that defines update operations to be performed. The general form of an edit script update node is:

(update {key 1 [values 1] key 2 [values 2] . . . key n [values n]})

The diff property of the update node is the map of key/value pairs (which may be empty).

For each key/value pair in the diff property map the key represents the dataset values that are to be updated and the value indicates the update operations to be performed for that key.

As noted, the dataset corresponding to an update node has additional properties. In this embodiment a dataset corresponding to an update node has the following general syntax:

[(:p{ . . . } body)]

This is an html/xml example. The ":p" element indicates an arbitrary read only property (in this case a paragraph). The map element—"{ . . . }"—is an associative property defining attributes (e.g. styles or other attributes). The "body" may be a sequential property (e.g. a vector [ . . . ] defining one or more children of the dataset, or a text node (e.g. "hello").

Broadly speaking, there are three different processing paths for update nodes: update nodes with an empty diff and no children; update nodes with a non-empty diff and no children; and update nodes with children.

These three paths are (in this instance) handled by a check at 2002 to see if the root update node has any children and (if the root update node does not have any children) a check at 2004 to see if the diff of the childless root node is empty.

Update Node Pass 1—No Children, Diff Empty

Processing of an update node with no children and an empty diff is, in essence, the same as processing a retain node without children. The input index is incremented and no other changes to the inputs are made before returning.

If the update node has no children at 2002 and the diff is empty at 2004, no update operations need to be performed. In this case the index is incremented at 2006 and the materialize instance returns at 1704.

In some embodiments the edit script may be simplified before being materialized. This simplification process may result in update nodes with empty diffs being converted to retain nodes (e.g. as described above). In this case update nodes with empty diffs will not be encountered in the materialize process.

Update Node Pass 1—No Children, Non-Empty Diff

If the update node has no children at 2002 and the diff is not empty at 2004, update operations do need to be performed.

If the diff is not empty the key/value pairs defined by the diff are iterated over.

At 2008 a diff marker is initialized to reference the first key/value pair defined by the update node diff map.

At 2010, key, operations, and value-at-key values are extracted from the dataset and edit script. The key value is the key of the key/value pair indicated by the diff marker and indicates the key of the attribute hash map entry that is to be updated. The operations value is the value of the key/value pair indicated by the diff marker and defines the operations that are to be performed on the key. The value-at-key is the attribute hash map value at the key (e.g. given an attribute hash map (such as {"a" "b"}), the value-at-key for the key "a" is "b".

At 2012, a new materialize instance is called in order to perform the update operation. The update operation involves replacing an attribute (i.e. the value-at-key) with another (defined by the operations retrieved at 2010).

In the present embodiment this replacement is implemented by an insert operation which inserts the "updated" value and a delete operation that deletes the original value. In order to perform this, the edit script to be input to the new materialize instance is generated as a retain root node having children nodes that are the operations extracted at 2010. I.e. if the operations extracted at 2010 are (insert x) (delete), the edit script input to the new materialize instance is: (retain (insert x) (delete)). The index to be input to the new materialize instance is set to 0. The dataset input for the new materialize instance is the value-at-key value extracted at 2010. The moves and state inputs to the new materialize instance are the moves and state values of the current materialize instance.

In an alternative embodiment instead of updating a node by recursively materializing an edit script with an insert and delete operation a "replace" operation could be implemented to handle the update directly.

At 2014 the dataset returned by the materialize instance called at 2012 is checked to see if it is empty or not.

If, at 2014, the dataset returned by the materialize instance called at 2012 is empty the key value needs to be deleted from the dataset of the original materialize instance. To track this, the key value is added to a deletes vector at 2016 (the deletes vector storing any key values which, when materialized at 2012, return an empty dataset).

If, at 2014, the dataset is not empty the dataset returned by the materialize instance is added (together with the key value) to an entries vector. The entries vector in this example takes the form

```
[
    ["key 1 value", "non-empty dataset returned by materialize on key 1
    value"]
    ["key n value", "non-empty dataset returned by materialize on key n
    value"]
]
```

The new entry to the entries vector is the key value extracted from the diff at 2010 along with the dataset returned by the materialize instance called at 2012.

At 2020 a check is made to see whether the diff defines additional key/value pairs. If so the diff marker is updated to point to the next key/value pair at 2022 and the process returns to 2010.

If, at 2020, the diff does not have any further key/value pairs, at 2024 any entries in the deletes vector are removed and any entries in the entries vector are inserted/updated to yield a materialized diff.

At 2026 the attributes of the dataset element indicated by the index is replaced with the materialized diff generated by 2024.

Processing then continues to 2006 to increment the index before the materialize instance returns at 1704.

Section 4.3.5 below provides a worked example of a materialize instance in the first pass that has an edit script input with an update-type root that does not have any children and has a non-empty diff.

Update Node Pass 1—Children

If, at 2002, the update node does have children, both the update operation and the children node(s) need to be processed. This can be performed in any order desired (or in parallel). In the present embodiment the children are processed first (by recursive calls to the materialize algorithm on each child node) before the update operation is performed (as described above).

To process the children, at 2030 a child marker is initialized to point to the first child of the edit script root node.

At 2032 inputs to a new materialize instance are generated. The index to be input to the new materialize instance is set to 0. The dataset input for the new materialize instance is the element of the current materialize dataset that is indicated by the index of the current materialize instance. The edit script input for the new materialize instance is the child of the current materialize edit script that is indicated by the child marker (which may itself have children). The moves and state inputs to the new materialize instance are the moves and state values of the current materialize instance.

At 2034 the new instance of the materialize algorithm is called based on the inputs set at 2032. The new materialize instance returns outputs as described above (i.e. index, dataset, moves, state).

At 2036 a check is performed to see whether there are further children of the edit script root node to process.

If, at 2036, further children need to be processed, the child marker is updated to point to the next child of the root node at 2038.

At 2040 inputs to a new materialize instance are generated. The index, dataset, moves and state inputs to the new materialize instance are the corresponding values as returned by the immediately preceding materialize instance called at 2034. The edit script input to the new materialize instance is the child indicated by the child marker.

After preparing inputs at 2040 the new materialize instance is called at 2034.

If, at 2036, no further children need to be processed the diff operation is processed. Processing the diff operation is indicated at 2042, and is performed according to steps 2004, 2006, 2008, 2010, 2012, 2014, 2016, 2018, 2020, 2022, 2024, and 2026 discussed above. As described above, this processing generates (at 2024) a materialized diff which replaces the attributes of the dataset element indicated by the index (at 2026).

At 2044 a check is performed to see whether the dataset returned by last materialize instance called at 2034 is empty.

If, at 2044, the dataset returned by last materialize instance called at 2034 is empty, the process proceeds to 2006 to increment the index and return at 1704.

If, at 2044, the dataset returned by last materialize instance called at 2034 is not empty, at 2046 the dataset returned by last materialize instance called at 2034 is added to the dataset of the current materialize instance at the position indicated by the index of the current materialize instance. The process then proceeds to 2006 to increment the index and then to return at 1704.

Section 4.3.6 below provides a worked example of a materialize instance in the first pass that has an edit script input with an update-type root node that has children.

4.1.4 First Processing Pass: Insert Root Node

Figure 21:
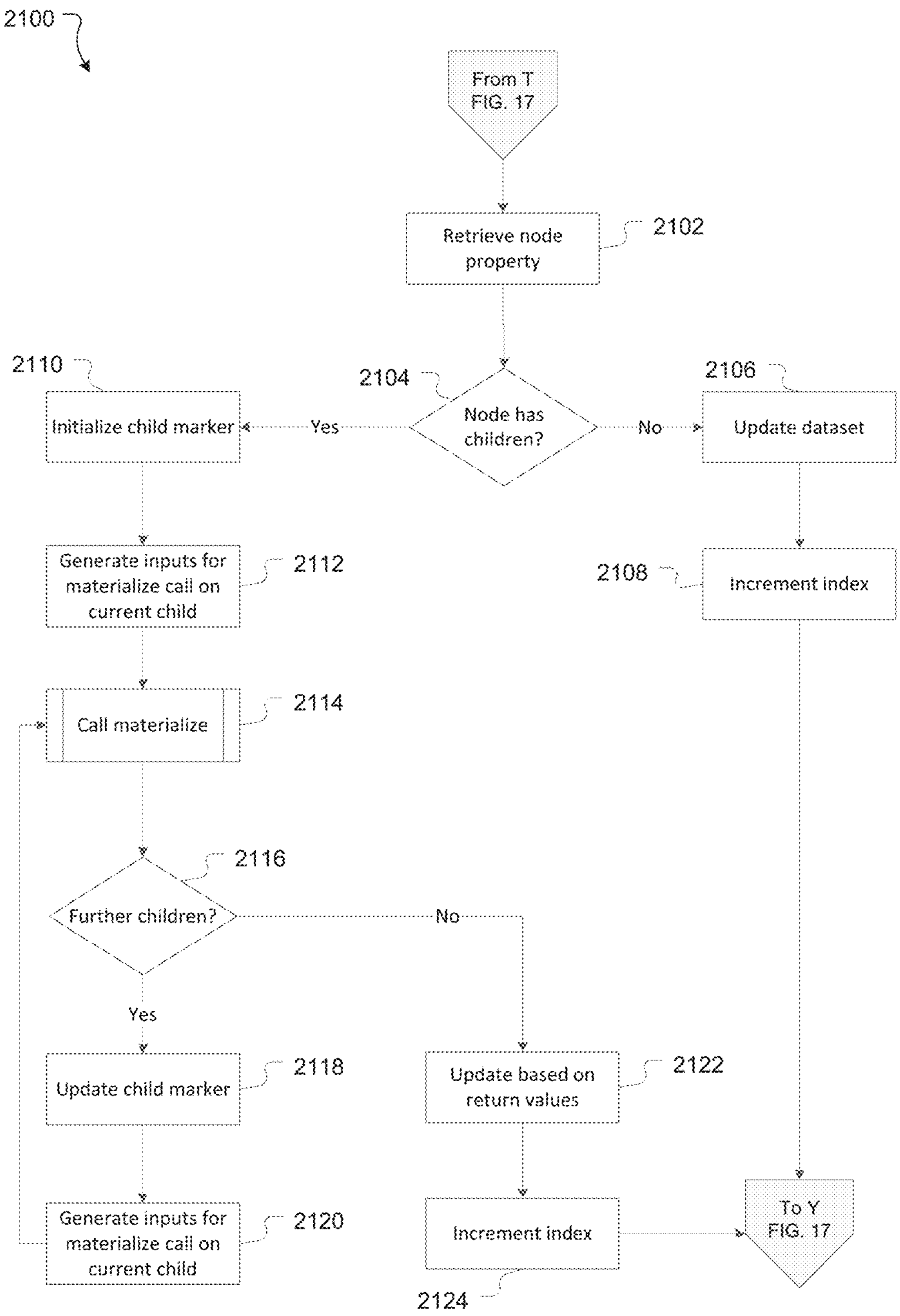
FIG. 21 is a flow chart illustrating steps involved in a first materialize algorithm pass where the input edit script has an insert root node.

If, at 1702, the root node of the edit script is an insert node the operations illustrated in flowchart 2100 of FIG. 21 are performed.

An insert node will have the general form of (insert [property]). The [property] is the node(s) to be inserted, and may be null/empty.

At 2102 the property of the insert node is retrieved.

At 2104 a check is made to see if the root node has any children.

Insert Node—No Children

If the insert node does not have any children, at 2106 the property of the insert node (retrieved at 2104) is inserted into the dataset at the position indicated by the index.

At 2108 the index is incremented.

If the node does not have any children no other changes are made to the variables and the process returns at 1704.

Section 4.3.7 below provides a worked example of a materialize instance in the first pass that has an edit script input with an insert-type root node and no children.

Insert Node Pass 1—Children

If, at 2104, the root node of the edit script is an insert root node that does have children, each child is processed in turn by recursive calls to the materialize algorithm.

At 2110 a child marker is initialized to point to the first child of the edit script root node.

At 2112 inputs to a new materialize instance are generated. The index to be input to the new materialize instance is set to 0. For an edit script with an insert root node the dataset input for the new materialize instance is the property of the insert node retrieved at 2102. The edit script input for the new materialize instance is the child of the current materialize edit script that is indicated by the child marker (which may itself have children). The moves and state inputs to the new materialize instance are the moves and state values of the current materialize instance.

At 2114 the new instance of the materialize algorithm is called. The new materialize instance returns outputs as described above (i.e. index, dataset, moves, state).

At 2116 a check is performed to see whether there are further children of the edit script root node to process.

If, at 2116, further children need to be processed, the child marker is updated to point to the next child of the root node at 2118.

At 2120 inputs to a new materialize instance are generated. The index, dataset, moves and state inputs to the new materialize instance are the corresponding values as returned by the immediately preceding materialize instance called at 2116. The edit script input to the new materialize instance is the child indicated by the child marker.

After preparing inputs at 2120 the new materialize instance is called at 2114.

If, at 2116, no further children of the root node need to be processed the variables of the current materialize instance are updated at 2122. This update is based on the dataset returned by the last materialize instance called at 2114. The dataset returned by the last materialize instance is inserted into the dataset of the current materialize instance at the location indicated by the index of the current materialize instance. The moves and state variables of the current materialize instance are replaced by the moves and state values returned by the last materialize instance.

At 2124 the index of the current materialize instance is incremented, and at 1704 the current materialize instance returns. The index return value is the index as incremented at 2124. The dataset, moves, and state return values are the values as updated at 2122.

Section 4.3.8 below provides a worked example of a materialize instance in the first pass that has an edit script input with an insert-type root node that does have children.

4.1.5 First Processing Pass: Target Root Node

In the first pass of the algorithm no operations are performed on an edit script that has a target node as the root node.

Accordingly, if at 1702 the root node of the edit script is a target node, the materialize instance returns at 1704 (the return values being the same as the corresponding values input to the materialize instance).

4.1.6 First Processing Pass: Source Root Node

Figure 22:
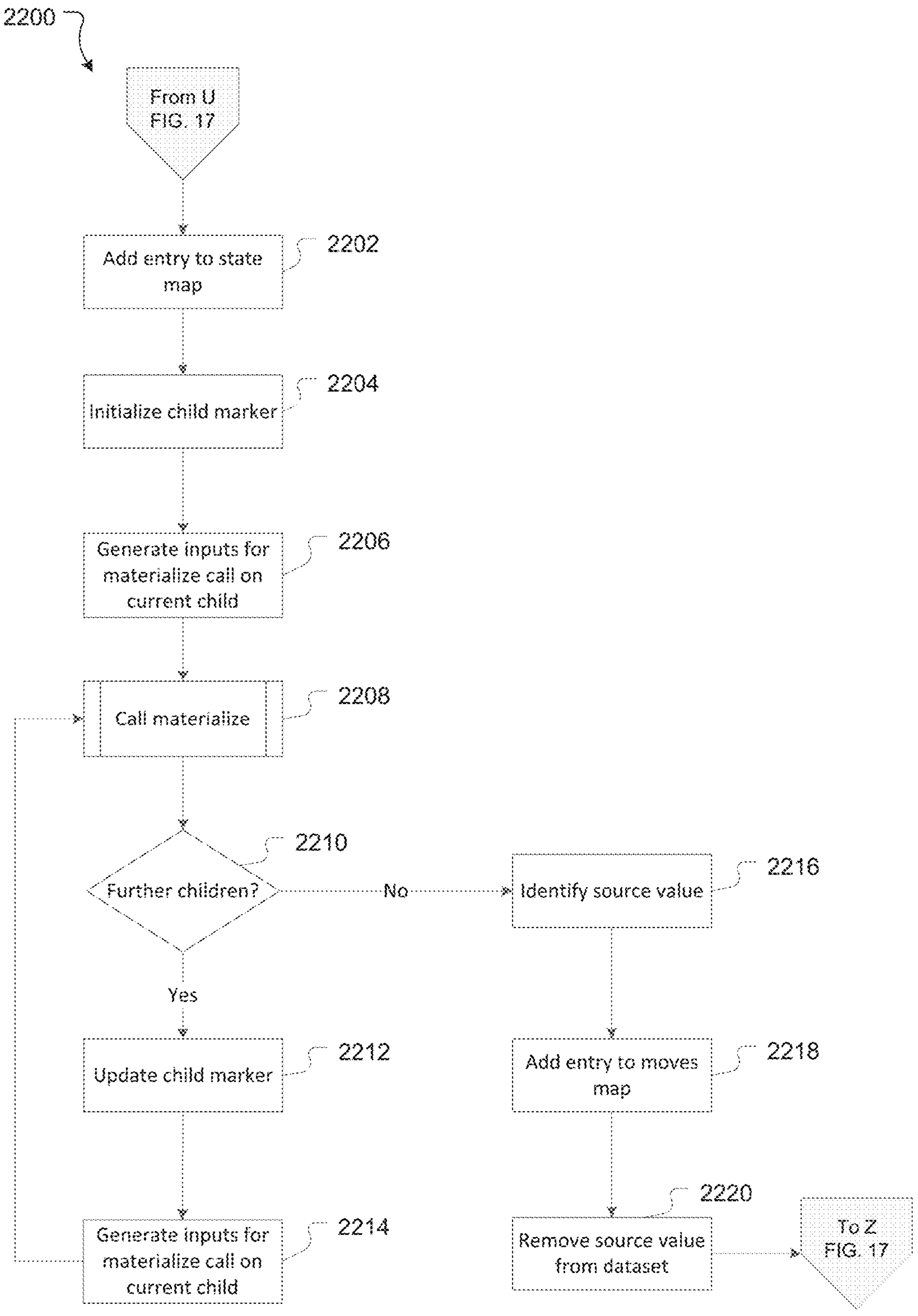
FIG. 22 is a flow chart illustrating steps involved in a first materialize algorithm pass where the input edit script has a source root node.

If, at 1702, the root node of the edit script is a source node the operations illustrated in flowchart 2200 of FIG. 22 are performed.

Source nodes are markers that indicate nodes/elements that have been moved rather than operations themselves. Accordingly, an edit script source node will always have at least one child which describes the operation(s) performed on the node(s) being moved. In the first pass of the algorithm source nodes are processed to populate the state and moves maps (which are then used in the second pass of the algorithm to actually perform the move). In addition, the node(s) to which the source relates are deleted from the dataset (to be reinserted in the second pass of the algorithm).

At 2202 a new entry in respect of the move is added to the state map. The key for the new entry is the identifier of the source node and the associated value is the edit script input to the materialize instance (i.e. the edit script having the source-type root node).

At 2204 a child marker is initialized to point to the first child of the root source node.

At 2206 inputs to a new materialize instance are generated. As the source node is a marker rather than an operation per se, the index and dataset to be input to the new materialize instance are set to the index and dataset of the current materialize instance. The edit script input for the new materialize instance is the first child of the root source node (which may itself have children). The moves and state inputs to the new materialize instance are the moves and state values of the current materialize instance.

At 2208 the new instance of the materialize algorithm is called. The new materialize instance returns outputs as described above (i.e. index, dataset, moves, state).

At 2210 a check is performed to see whether there are further children of the edit script root node to process.

If, at 2210, further children need to be processed, the child marker is updated to point to the next child of the root node at 2212.

At 2214 inputs to a new materialize instance are generated. The index, dataset, moves and state inputs to the new materialize instance are the corresponding values as returned by the immediately preceding materialize instance called at 2208. The edit script input to the new materialize instance is the child indicated by the child marker.

After preparing inputs at 2214 the new materialize instance is called at 2208.

If, at 2210, no further children of the root node need to be processed, the source value for the move operation being processed is identified at 2216.

At 2216 the source value is identified to be the element(s) of the dataset returned by the last materialize instance that are between the index of the current materialize instance and the index returned by the last called materialize instance. I.e. if the dataset returned by the last materialize instance is ["a"], the current materialize instance index is 0 and the index returned by the last materialize instance is 1, the source value for the move is "a".

At 2218 a new entry is added to the moves map to capture the source value. The key for the new moves map entry is the identifier of the source node and the value is the source value as identified at 2216.

At 2220 the source value identified at 2216 is removed from the dataset of the current materialize instance. The element(s) of the source value are re-inserted into the dataset at the appropriate location in the second pass of the algorithm.

Given the deletion that occurs at 2220 no increment is made to the index of the current materialize instance.

At 1704 the current materialize instance returns. The return values are the index originally input to the materialize instance, the dataset with source values removed at 2220, the state map as updated at 2202, and the moves map as updated at 2218.

Section 4.3.9 below provides a worked example of a materialize instance in the first pass that has an edit script input with a source-type root node.

4.2 Materialize Algorithm: Second Processing Pass

The first pass of the materialize algorithm is complete when the initial materialize call returns. At this point the main materialize function calls the second pass of the algorithm.

The input arguments to the initial call of the second pass are as follows. The index is a value that refers to the first node in the dataset (e.g. "0"). The dataset is the dataset returned by the first pass of the materialize algorithm. The edit script is the edit script in its entirety. Moves is the moves output from the first pass of the materialize algorithm. State is the state output from the first pass of the materialize algorithm.

Figure 23:
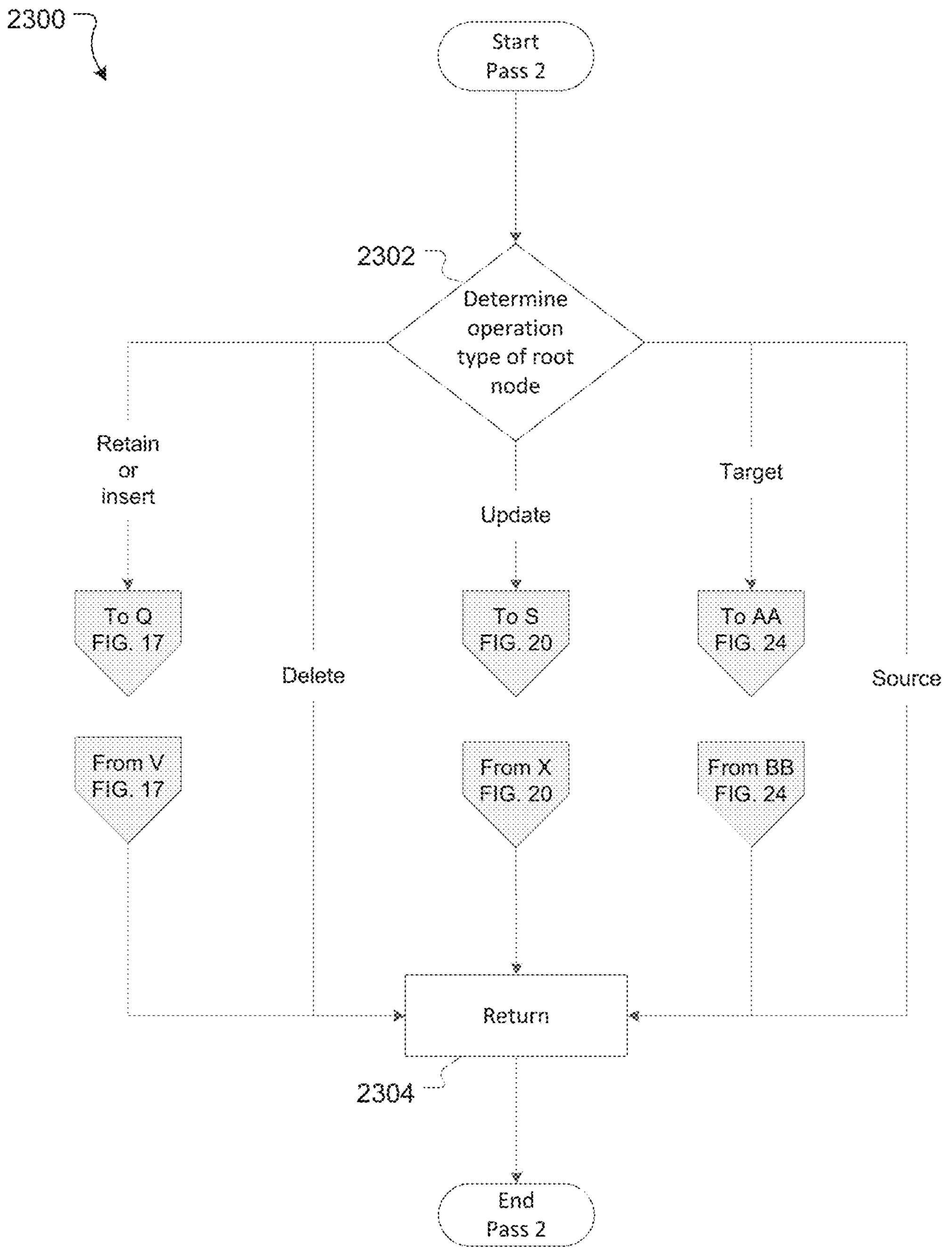
FIG. 23 is a flow chart illustrating steps involved in a second materialize algorithm pass.
Figure 24:
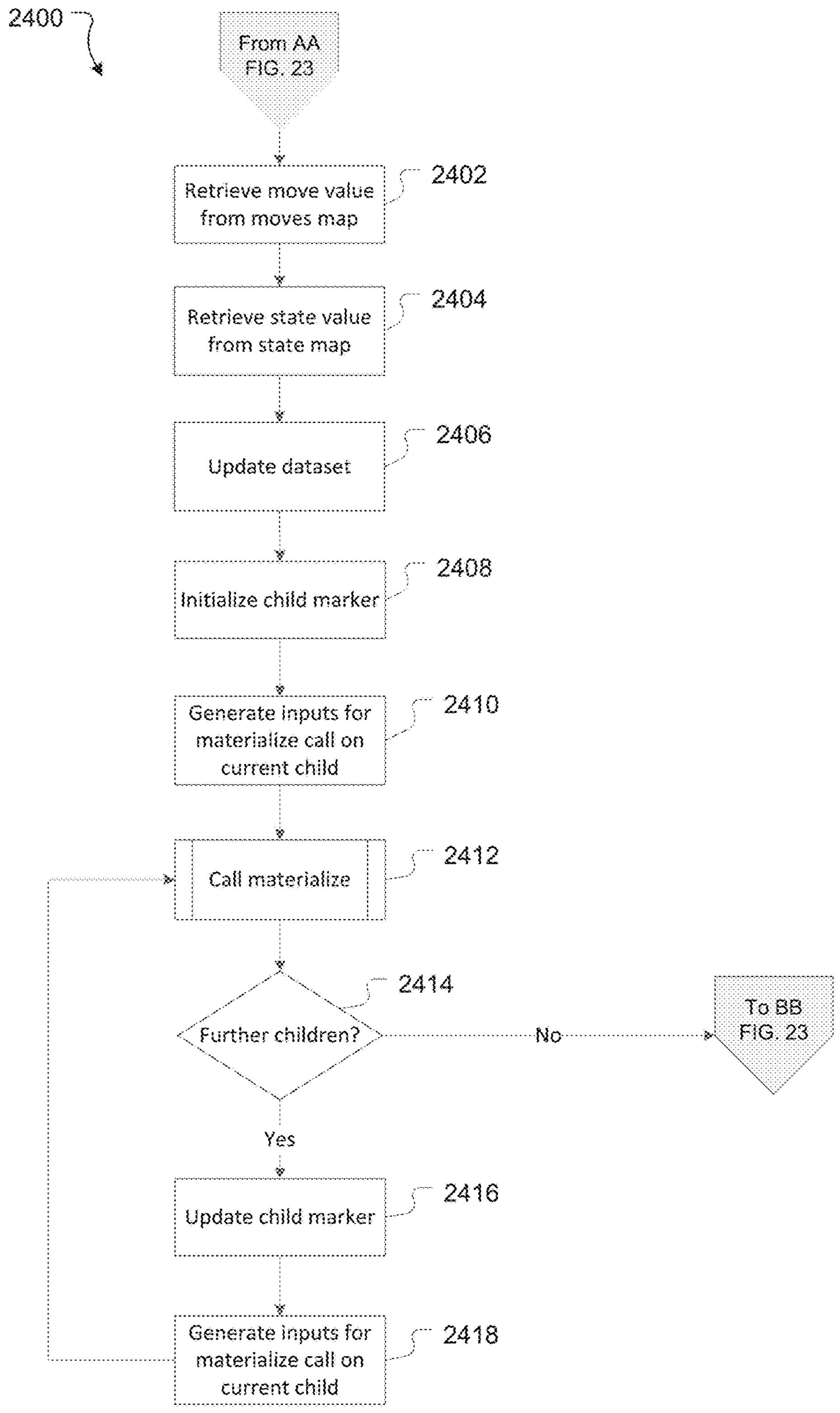
FIG. 24 is a flow chart illustrating steps involved in a second materialize algorithm pass where the input edit script has a target root node.

FIG. 23 and FIG. 24 provide flow charts depicting steps of the second pass of the materialize algorithm.

At 2302 the type of operation defined by the root node of the edit script input to materialize is identified.

Following 2302, the specific processing steps performed depend on the operation type defined by the root node. This processing is described in detail below. Once the processing has been completed (which may involve recursion) the materialize algorithm returns at 2304.

Processing in the second pass will be described in detail in the following order:

4.2.1 Edit script with retain- or insert-type root node pass 2

4.2.2 Edit script with delete-type root node pass 2

4.2.3 Edit script with update-type root node pass 2

4.2.4 Edit script with target-type root node pass 2

4.2.5 Edit script with source-type root node pass 2

4.2.1 Second Processing Pass: Retain or Insert Root Node

Materialize instances with edit scripts having a retain or an insert root node in the second pass are processed in the same way that retain nodes are processed in pass 1. Accordingly if, at 2302, the root node of the edit script is a retain node or an insert node the materialize instance proceeds to 1802 of FIG. 18. At the end of the processing (i.e. following 1804 or 1820) the process continues to 2304 to return.

4.2.2 Second Processing Pass: Delete Root Node

In the second pass no actions are performed on an edit script with a root delete node.

Accordingly if, at 2302, the root node of the edit script is a delete node the materialize instance returns at 2304 (the return values taking the corresponding values input to the materialize instance).

4.2.3 Second Processing Pass: Update Root Node

In the second pass, materialize instances having an edit script input with an update root node are processed in the same way as they are processed in pass 1.

Accordingly if, at 2302, the root node of the edit script is an update node the materialize instance proceeds to 2002 of FIG. 20. At the end of the update processing (i.e. following 2006) the process continues to 2304 to return.

4.2.4 Second Processing Pass: Target Root Node

If, at 2302, the root node of the edit script input is a target node the operations illustrated in flowchart 2400 of FIG. 24 are performed.

If a target node exists in the second pass both the moves and state maps must have been populated in the first pass (during the processing of the source node corresponding to the target node).

At 2402 the moves value in respect of the move operation is retrieved from the moves map (i.e. the value in the moves map indexed by the identifier of the root target node).

At 2404 the source edit script in respect of the move operation is retrieved from the state map (i.e. the value in the state map indexed by the identifier of the root target node). The source edit script will have the general form of (source n ( . . . )).

At 2406, the move value (retrieved at 2402) is added to the dataset at the current index.

Once the moved node(s) have been added to the dataset at 2406, children of the state value in respect of the move are recursively materialized in turn. This is done in case there are any additional move operations that are defined in the state value and need to be processed.

At 2408 a child marker is initialized to point to the first child of the source edit script retrieved at 2404.

At 2410 inputs to a new materialize instance are generated. The index to be input to the new materialize instance is set to 0. The dataset input for the new materialize instance is the dataset retrieved from the moves map. The edit script input for the new materialize instance is the child of the source edit script that is indicated by the child marker (the child may itself have children). The moves and state inputs to the new materialize instance are the moves and state values of the current materialize instance.

At 2412 the new instance of the materialize algorithm is called based on the inputs set at 2410. The new materialize instance returns outputs as described above (i.e. index, dataset, moves, state).

At 2414 a check is performed to see whether there are further children of the source edit script to process.

If, at 2414, further children need to be processed, the child marker is updated at 2416 to point to the next child of the source edit script.

At 2418 inputs to a new materialize instance are generated. The index, dataset, moves and state inputs to the new materialize instance are the corresponding values as returned by the immediately preceding materialize instance called at 2412. The edit script input to the new materialize instance is the child of the source edit script indicated by the child marker.

After preparing inputs at 2418 the new materialize instance (pass 2) is called at 2412.

If, at 2414, no further children of the source root node need to be processed materialization of the target operation (including any nested source/target pairs that may exist) is complete.

At 2304 the materialize instance returns. The dataset returned is the dataset as updated at 2406. The index, moves, and state return values are the corresponding input values to the materialize instance.

Section 4.3.10 below provides a worked example of a materialize instance in the second pass that has an edit script input with a target-type root node.

4.2.5 Second Processing Pass: Source Root Node

In the second pass no actions are performed on an edit script with a root source node.

Accordingly if, at 2302, the root node of the edit script is a source node the materialize instance returns at 2304 (the return values being the same values input to the materialize instance).

4.3 Materialize: Worked Examples

In order to further illustrate the materialize algorithm several worked examples will be described. These include worked examples of materialize instances having edit script inputs with:

4.3.1 A retain-type root node without children (pass 1)
4.3.2 A retain-type root node with children (pass 1)
4.3.3 A delete-type root node without children (pass 1)
4.3.4 A delete-type root node with children (pass 1)
4.3.5 An update-type root node without children, non-empty diff (pass 1)
4.3.6 An update-type root node with children (pass 1)
4.3.7 An insert-type root node without children (pass 1)
4.3.8 An insert-type root node with children (pass 1)
4.3.9 A source-type root node in pass 1 (pass 1)
4.3.10 A target-type root node in (pass 2)
4.3.11 Complete worked example (pass 1 and pass 2)

The materialize algorithm is recursive. In the worked examples below the following naming convention will be used. An initial call to the materialize algorithm in the first pass will be referred to as materialize 1 or M1. An initial call to the materialize algorithm in the second pass will be referred to as materialize 2 or M2.

Recursive calls to the materialize algorithm made by M1 will be referred to as M1.1 through to M1.n. Recursive calls made by M1.n will be referred to as M1.n.1 through to M1.n.n.

To illustrate this naming convention, consider the first call to the first pass of the materialize algorithm (i.e. M1) having an input edit script with the following hierarchy: (a (b) (c (d) (e (f))) (g)). Table C outlines the edit script inputs to recursive materialize calls made in this example.

TABLE C

Naming convention for recursive process calls

| Materialize No. | Edit script input to materialize instance | Comment |
|---|---|---|
| M1 | (a (b) (c (d) (e (f))) (g)) | Original/root call of algorithm |
| M1.1 | (b) | Materialize first child of root node a from M1 |
| M1.2 | (c (d) (e (f))) | Materialize second child of root node a from M1 |
| M1.2.1 | (d) | Materialize first child of root node c from M1.2 |
| M1.2.2 | (e (f)) | Materialize second child of root node c from M1.2 |

TABLE C-continued

| Naming convention for recursive process calls | | |
|---|---|---|
| Materialize No. | Edit script input to materialize instance | Comment |
| M1.2.2.1 | (f) | Materialize first child of root node e from M1.2.2 |
| M1.3 | (g) | Materialize third child of root node a from M1 |

In the second pass of the algorithm the edit script input will be the same, and the same recursion would occur—referenced by M2.n etc.

4.3.1 Materialize Example: Retain Node without Children (Pass 1)

Retain Node without Children—Materialize 1

To illustrate processing of a retain node that does not have any children, consider a call to materialize—i.e. materialize 1 (M1)—with inputs as shown in the "M1 In" column of Table D:

TABLE D

| Retain node without children, M1 | | | |
|---|---|---|---|
| Variable | M1 In | M1 ΔA | M1 Return |
| Index | 0 | 1 | 1 |
| Dataset | [["a"]] | | [["a"]] |
| Edit script | (retain) | | NA |
| Moves | { } | | { } |
| State | { } | | { } |

At 1702 the root node of the edit script is identified as a retain node. At 1802 the root node does not have any children.

At 1804 the index variable is incremented by 1. This is shown in the "M1 ΔA" column of Table D above.

At 1704 the materialize function returns with the values shown in the "M1 Return" column of Table D above.

4.3.2 Materialize Example: Retain Node with Children (Pass 1)

Retain Node with Children—Materialize 1

To illustrate processing of a retain node that does have children, consider a call to materialize with inputs shown in the "M1 In" column of Table E:

TABLE E

| Retain node with children, M1 inputs | |
|---|---|
| Variable | M1 In |
| Index | 0 |
| Dataset | [["a" "b"]] |
| Edit script | (retain (retain) (insert "d")) |
| Moves | { } |
| State | { } |

At 1702 the root node of the input edit script is identified as a retain node. At 1802 the root node is identified to have children. At 1806 the child marker is initialized to point to the first child node, in this case (retain).

At 1808 inputs for a new materialize instance (M1.1) are generated. The M1.1 index input is initialized to 0. The M1.1 dataset input is the element of the M1 dataset indicated by the M1 index: ["a" "b"]. The M1.1 edit script input is the child indicated by the child marker: (retain). The M1.1 moves and state inputs are the M1 moves and state values. At 1810 a new materialize instance (M1.1) is called on the inputs generated at 1808.

Processing of the M1.1 instance is described in detail below. The M1.1 inputs and outputs are shown in columns "M1.1 In" and "M1.1 Return" columns of Table F:

TABLE F

| Retain node with children, M1.1 inputs and return values | | |
|---|---|---|
| Variable | M1.1 In | M1.1 Return |
| Index | 0 | 1 |
| Dataset | ["a" "b"] | ["a" "b"] |
| Edit script | (retain) | NA |
| Moves | { } | { } |
| State | { } | { } |

At 1812 further children of the M1 root node exist. At 1814 the M1 child marker is updated to point to the next child of the M1 root node: (insert "d").

At 1816 inputs to a new materialize instance (M1.2) are generated. The index, dataset, moves and state inputs to materialize 1.2 are the corresponding values as returned by M1.1. The edit script input to M1.2 is the M1 child indicated by the M1 child marker: (insert "d"). At 1810 a new materialize instance (M1.2) is called on the inputs generated at 1816.

Processing of the M1.2 instance is described in detail below. The M1.2 inputs and outputs are shown in columns "M1.2 In" and "M1.2 Return" columns of Table G:

TABLE G

| Retain node with children, M1.2 inputs and return values | | |
|---|---|---|
| Variable | M1.2 In | M1.2 Return |
| Index | 1 | 2 |
| Dataset | ["a" "b"] | ["a" "d" "b"] |
| Edit script | (insert "d") | NA |
| Moves | { } | { } |
| State | { } | { } |

At 1812 there are no further children of the M1 root node to process.

At 1818 the M1 variables are updated based on the return values of M1.2.

The M1 index is 0, indicating the position shown by the ^ character here: [^ ["a" "b"]]. Accordingly, the M1 dataset is updated by replacing the element indicated by the M1 index (i.e. element ["a" "b"]) with the dataset returned by M1.2 (i.e. ["a" "d" "b"]). The M1 state and moves are replaced by the state and moves returned by M1.2 (in this case both are empty: { }). These updates are shown in the "M1 ΔA" column of Table H below.

At 1820 the M1 index is incremented (from 0 to 1). This update is shown in the "M1 ΔB" column of Table H.

At 1704 M1 returns with the values shown in the "M1 return" column of Table H.

TABLE H

| Retain node with children, M1 return values | | | | | |
|---|---|---|---|---|---|
| Variable | M1 In | M1.2 Return | M1 ΔA | M1 ΔB | M1 Return |
| Index | 0 | 2 | | 1 | 1 |
| Dataset | [["a" "b"]] | ["a" "d" "b"] | [["a" "d" "b"]] | | [["a" "d" "b"]] |
| Edit script | (retain (retain) (insert "d")) | NA | | | NA |
| Moves | { } | { } | { } | | { } |
| State | { } | { } | { } | | { } |

Retain Node with Children—Materialize 1.1

In the retain node with children example, M1 calls a new instance of materialize (M1.1) with the inputs as shown in the "M1.1 In" column of Table I:

TABLE I

| Retain node with children, M1.1 | | | |
|---|---|---|---|
| Variable | M1.1 In | M1.1 ΔA | M1.1 Return |
| Index | 0 | 1 | 1 |
| Dataset | ["a" "b"] | | ["a" "b"] |
| Edit script | (retain) | | NA |
| Moves | { } | | { } |
| State | { } | | { } |

At 1702 the root node of the edit script is identified as a retain node. At 1802 the root node does not have any children.

At 1804 the M1.1 index variable is incremented by 1 (see "M1.1 ΔA" column of Table I above).

At 1704 M1.1 returns with the values shown in the "M1.1 Return" column of Table I above.

Retain Node with Children—Materialize 1.2

In the retain node with children example, M1 calls a new instance of materialize (M1.2) with the inputs as shown in Table J:

TABLE J

| Retain node with children, M1.2 | | | | |
|---|---|---|---|---|
| Variable | M1.2 In | M1.2 ΔA | M1.2 ΔB | M1.2 Return |
| Index | 1 | | 2 | 2 |
| Dataset | ["a" "b"] | ["a" "d" "b"] | | ["a" "d" "b"] |
| Edit script | (insert "d") | | | NA |
| Moves | { } | | | { } |
| State | { } | | | { } |

At 1702 the root node of the edit script is identified as an insert node. At 2102 the property of the insert node is retrieved: property="d".

At 2104 the insert node does not have any children.

At 2106 the M1.2 index is 1, pointing to the position shown by the ^ character here: ["a" ^ "b"]. Accordingly, the retrieved property ("d") is inserted into the M1.2 dataset at this position to yield ["a" "d" "b"]. This is shown in the "M1.2 ΔA" column of table J above.

At 2108 the M1.2 index is incremented, as shown in the "M1.2 ΔB" column of table J above.

At 1704 M1.2 returns with the values shown in the "M1.2 Return" column of Table J above.

4.3.3 Materialize Example: Delete Node without Children (Pass 1)

Delete Node without Children—Materialize 1

To illustrate processing of a delete node that does not have any children, consider a call to materialize (M1) with inputs as shown in the "M1 In" column of Table K:

TABLE K

| Delete node without children, M1 | | | |
|---|---|---|---|
| Variable | M1 In | M1 ΔA | M1 Return |
| Index | 0 | | 0 |
| Dataset | [["a" "b"]] | [ ] | [ ] |
| Edit script | (delete) | | NA |
| Moves | { } | | { } |
| State | { } | | { } |

At 1702 the root node of the edit script is identified as a delete node. At 1902 the root node does not have any children.

At 1904 elements are deleted from the dataset. The M1 index is 0, pointing to the position indicated by the ^ character here: [^ ["a" "b"]]. As the delete node does not specify a length a single element at the position indicated by the index is deleted—i.e. element ["a" "b"]. The resulting dataset is shown in the "M1 ΔA" column of Table K above.

At 1704, M1 returns with the values shown in the "M1 Return" column of Table K.

4.3.4 Materialize Example: Delete Node with Children (Pass 1)

Delete Node with Children—Materialize 1

To illustrate processing of a delete node that has children, consider a call to materialize (M1) with inputs as shown in the "M1 In" column of Table L:

TABLE L

| Delete node with children, M1 | |
|---|---|
| Variable | M1 In |
| Index | 0 |
| Dataset | [["a" "b"]] |
| Edit script | (delete (source 1 (retain 2)) |
| Moves | { } |
| State | { } |

At 1702 the root node of the input edit script is identified as a delete node. At 1902 the root node is identified to have children. At 1906 the child marker is initialized to point to the first child node, in this case (delete).

At 1908 inputs for a new materialize instance (M1.1) are generated. The M1.1 index input is initialized to 0. The M1.1 dataset input is the element of the M1 dataset indicated by the M1 index: [“a” “b”]. The M1.1 edit script input is the child indicated by the child marker: (source 1 (retain 2)). The M1.1 moves and state inputs are the M1 moves and state values. At 1910 a new materialize instance (M1.1) is called on the inputs generated at 1908.

Processing of the M1.1 instance is described in detail below. The M1.1 inputs and outputs are shown in columns “M1.1 In” and “M1.1 Return” columns of Table M:

TABLE M

Delete node with children, M1.1 inputs and return values

| Variable | M1.1 In | M1.1 Return |
|---|---|---|
| Index | 0 | 1 |
| Dataset | [“a” “b”] | [ ] |
| Edit script | (source 1 (retain 2)) | NA |
| Moves | { } | {1: “a” “b”} |
| State | { } | {1: (source 1 (retain 2)} |

At 1912 there are no further children of the M1 root node to process.

At 1918 the M1 variables are updated based on the return values of M1.1. The position indicated by the M1 index is as shown by the ^ character here: [^ [“a” “b”]]. Accordingly, the M1 dataset is updated by replacing the element indicated by the M1 index (i.e. element [“a” “b”]) with the dataset returned by M1.1 (i.e. [ ]). The M1 state and moves are replaced by the state and moves returned by M1.1. These updates are shown in the “M1 ΔA” column of Table N below.

At 1704 M1 returns with the values shown in the “M1 return” column of Table N.

TABLE N

Delete node with children, M1 return values

| Variable | M1 In | M1.1 Return | M1 ΔA | M1 Return |
|---|---|---|---|---|
| Index | 0 | 1 | | 1 |
| Dataset | [[“a” “b”]] | [ ] | [[ ]] | [[ ]] |
| Edit script | (delete (retain 2)) | NA | | NA |
| Moves | { } | {1: “a” “b”} | {1: “a” “b”} | {1: “a” “b”} |
| State | { } | {1: (source 1 (retain 2)} | {1: (source 1 (retain 2)} | {1: (source 1 (retain 2)} |

Delete Node with Children—Materialize 1.1

In the delete node with children example, M1 calls a new instance of materialize (M1.1) with the inputs as shown in the “M1.1 In” column of Table O:

TABLE O

Delete node with children, M1.1

| Variable | M1.1 In | M1.1 ΔA |
|---|---|---|
| Index | 0 | |
| Dataset | [“a” “b”] | |
| Edit script | (source 1 (retain 2)) | |
| Moves | { } | |

TABLE O-continued

Delete node with children, M1.1

| Variable | M1.1 In | M1.1 ΔA |
|---|---|---|
| State | { } | {1: (source 1 (retain 2)} |

At 1702 the root node of the edit script is a source node.

At 2202 a new entry is added to the M1.1 state map: state={1: (source 1 (retain 2)}. This is shown in the M1.1 ΔA column of table O above.

At 2204 an M1 child marker is initialized to point to the first child of the edit script root node: (retain 2).

At 2206 inputs to a new materialize instance (M1.1.1) are generated. The M1.1.1 index input is the M1.1 index value: 0. The M1.1.1 dataset input is the M1.1 dataset: [“a” “b”]. The M1.1.1 edit script input is the child indicated by the M1.1 child marker: (retain 2). The M1.1.1 moves and state inputs are the M1.1 moves and state values. At 2208 the new materialize instance (M1.1.1) is called on the inputs generated at 2206.

At 1702 the root node of the M1.1.1 edit script is identified to be a retain node, and at 1802 no children are identified. Examples of processing a retain node without children are provided in sections 4.3.1 (M1) and 4.3.2 (M1.1) above. The M1.1.1 inputs and outputs are shown in columns “M1.1.1 In” and “M1.1.1 Return” columns of Table P below:

TABLE P

Delete node with children, M1.1.1 inputs and return values

| Variable | M1.1.1 In | M1.1.1 Return |
|---|---|---|
| Index | 0 | 2 |
| Dataset | [“a” “b”] | [“a” “b”] |
| Edit script | (retain 2) | NA |
| Moves | { } | { } |
| State | {1: (source 1 (retain 2)} | {1: (source 1 (retain 2)} |

At 2210 no further children of the M1.1 root node exist.

At 2216 the move source value is identified as “a” “b”. These are the elements of the dataset returned by M1.1.1 between index position 0 (the M1.1 index value) and index position 2 (the index value returned by M1.1.1).

At 2218 the source value is added to the M1.1 moves map, indexed by the identifier of the source node being processed: Moves={1: “a” “b”}. This is shown in the “M1.1 ΔA” column of Table Q below.

At 2220 the source value is removed from the M1.1 dataset (i.e. by removing the elements between index 0 (the M1.1 index) and index 2 (the index returned by M1.1.1)). This is shown in the “M1.1 ΔB” column of Table Q. At 1704 M1.1 returns with the values shown in the “M1.1 return” column of Table Q.

TABLE Q

| Delete node with children, M1.1 return values | | | | | |
|---|---|---|---|---|---|
| Variable | M1.1 In | M1.1.1 Return | M1.1 ΔA | M1.1 ΔB | M1.1 Return |
| Index | 0 | 2 | | | 1 |
| Dataset | [“a” “b”] | [“a” “b”] | | [ ] | [ ] |
| Edit script | (source 1 (retain 2)) | NA | | | NA |
| Moves | { } | { } | {1: “a” “b”} | | {1: “a” “b”} |
| State | { } | {1: (source 1 (retain 2)} | | | {1: (source 1 (retain 2)} |

4.3.5 Materialize Example: Update Node, No Children, Non-Empty Diff (Pass 1)

Update Node without Children, Non-Empty Diff, Materialize 1

To illustrate processing of an update node without children (and a non-empty diff), consider a call to materialize (M1) with inputs as shown in the “M1 In” column of Table R:

TABLE R

| Update node without children, non-empty diff, M1 inputs | |
|---|---|
| Variable | M1 In |
| Index | 0 |
| Dataset | [(:p {“a” “b”} [:div])] |
| Edit script | (update {“a” [(insert “z”) (delete)]}) |
| Moves | { } |
| State | { } |

At 1702 the root node of the edit script is identified as an update node. At 2002 the root node does not have children. At 2004 the diff is not empty.

At 2008 a diff marker is initialized to point to the first (and in this case only) key/value pair of the update node: {“a” [(insert “z”) (delete)]}.

At 2010 relevant values are extracted from the dataset and edit script: key=“a” (the key of the key/value pair indicated by the diff marker); operations=(insert “z”) (delete) (the value of the key/value pair indicated by the diff marker); value-at-key=“b” (the value of key “a” of the attributes hash map).

At 2012 a new materialize instance (M1.1) is called. The input index for M1.1 is set to 0. The dataset input for M1.1 is the value-at-key: “b”. The edit script input for M1.1 is a retain root node with children being the operations retrieved at 2010: (retain (insert “z”) (delete)). The moves and state inputs to M1.1 are the M1 moves and state values.

Processing of the M1.1 instance is described in detail below. Columns “M1.1 In” and “M1.1 Return” of Table S below show the input and return values of the M1.1 instance:

TABLE S

| Update node without children, non-empty diff, M1.1 | | |
|---|---|---|
| Variable | M1.1 In | M1.1 Return |
| Index | 0 | 1 |
| Dataset | [[“b”]] | [[“z”]] |
| Edit script | (retain (insert “z”) (delete)) | NA |
| Moves | { } | { } |
| State | { } | { } |

At 2014 the dataset returned by M1.1 is not empty.

At 2018 the dataset returned by M1.1 is added to the entries vector against the key (“a”) of the key/value pair: Entries=[[“a”, “z”]].

At 2020 the diff does not define any additional key/value pairs.

At 2024 entries in the entries vector are updated to yield a materialized diff: {“a” “z”}.

At 2026 the attributes of the indexed element (:p {“a” “b”} [:div]) is replaced with the materialized diff generated at 2024. This is shown in the “M1 ΔA” column of Table T below.

At 2006 the M1 index is incremented (shown in the “M1 SB” column of Table T) and M1 returns at 1704 (with return values shown in the “M1 Return” column of Table T below).

TABLE T

| Update node without children, non-empty diff, M1 return values | | | | |
|---|---|---|---|---|
| Variable | M1 In | M1 ΔA | M1 ΔB | M1 Return |
| Index | 0 | | 1 | 1 |
| Dataset | [(:p {“a” “b”} [:div])] | [[(:p {“a” “z”} [:div]]] | | [[(:p {“a” “z”} [:div]]] |
| Edit script | (update {“a” [(insert “z”) (delete)]}) | | | NA |
| Moves | { } | | | { } |
| State | { } | | | { } |

Update Node without Children, Non-Empty Diff, Materialize 1.1

In the update node without children example, M1 calls a new instance of materialize (M1.1) with the inputs as shown in Table U:

TABLE U

| Update node without children, non-empty diff, M1.1 | |
|---|---|
| Variable | M1.1 In |
| Index | 0 |
| Dataset | [[“b”]] |
| Edit script | (retain (insert “z”) (delete)) |
| Moves | { } |
| State | { } |

At 1702 the root node of the input edit script is identified as a retain node. At 1802 the root node is identified to have children. At 1806 the child marker is initialized to point to the first child node, in this case (insert “z”).

At 1808 inputs for a new materialize instance (M1.1.1) are generated. The M1.1.1 index input is initialized to 0. The M1.1.1 dataset input is the element of the M1.1 dataset indicated by the M1.1 index: [“b”]. The M1.1.1 edit script input is the child indicated by the child marker: (insert “z”). The M1.1.1 moves and state inputs are the M1.1 moves and state values. At 1810 a new materialize instance (M1.1.1) is called on the inputs generated at 1808.

Processing of the M1.1.1 instance is described in detail below. The M1.1.1 inputs and outputs are shown in columns "M1.1.1 In" and "M1.1.1 Return" columns of Table V:

TABLE V

Update node without children, non-empty diff, M1.1.1 inputs and return values

| Variable | M1.1.1 In | M1.1.1 Return |
|---|---|---|
| Index | 0 | 1 |
| Dataset | ["b"] | ["z" "b"] |
| Edit script | (insert "z") | NA |
| Moves | { } | { } |
| State | { } | { } |

At 1812 further children of the M1.1 root node exist. At 1814 the M1.1 child marker is updated to point to the next child of the M1 root node: (delete).

At 1816 inputs to a new materialize instance (M1.1.2) are generated. The index, dataset, moves and state inputs to materialize 1.1.2 are the corresponding values as returned by M1.1.1. The edit script input to M1.1.2 is the M1.1 child indicated by the M1.1 child marker: (delete). At 1810 a new materialize instance (M1.2) is called on the inputs generated at 1816.

Processing of the M1.1.2 instance is described in detail below. The M1.1.2 inputs and outputs are shown in columns "M1.1.2 In" and "M1.1.2 Return" columns of Table W:

TABLE W

Update node without children, non-empty diff, M1.1.2 inputs and return values

| Variable | M1.1.2 In | M1.1.2 Return |
|---|---|---|
| Index | 1 | 1 |
| Dataset | ["z" "b"] | ["z"] |
| Edit script | (delete) | NA |
| Moves | { } | { } |
| State | { } | { } |

At 1812 there are no further children of the M1.1 root node to process.

At 1818 the M1.1 variables are updated based on the return values of M1.1.2.

The position indicated by the M1.1 index (0) is as shown by the ^ character here: [^ ["b"]]. Accordingly, the M1.1 dataset is updated by replacing the element indicated by the M1.1 index (i.e. element ["b"]) with the dataset returned by M1.1.2 (i.e. ["z"]). The M1.1 state and moves are replaced by the state and moves returned by M1.1.2 (in this case both are empty: { }). These updates are shown in the "M1.1 ΔA" column of Table X below.

At 1820 the M1.1 index is incremented (from 0 to 1). This update is shown in the "M1.1 ΔB" column of Table X.

At 1704 M1.1 returns with the values shown in the "M1.1 return" column of Table X.

TABLE X

Update node without children, non-empty diff, M1.1 return values

| Variable | M1.1 In | M1.1.2 Return | M1.1 ΔA | M1.1 ΔB | M1.1 Return |
|---|---|---|---|---|---|
| Index | 0 | 1 | | 1 | 1 |
| Dataset | [["b"]] | ["z"] | [["z"]] | | [["z"]] |
| Edit script | (retain (insert "z") (delete)) | NA | | | NA |
| Moves | { } | { } | { } | | { } |
| State | { } | { } | { } | | { } |

Update Node without Children, Non-Empty Diff, Materialize 1.1.1

In the update node without children example, M1.1 calls a new instance of materialize (M1.1.1) with the inputs as shown in the "M1.1.1 In" column of Table Y:

TABLE Y

Update node without children, non-empty diff, M1.1.1

| Variable | M1.1.1 In | M1.1.1 ΔA | M1.1.1 ΔB | M1.1.1 Return |
|---|---|---|---|---|
| Index | 0 | | 1 | 1 |
| Dataset | ["b"] | ["z" "b"] | | ["z" "b"] |
| Edit script | (insert "z") | | | NA |
| Moves | { } | | | { } |
| State | { } | | | { } |

At 1702 the root node of the edit script is identified as an insert node. At 2102 the property of the insert node is retrieved: property="z".

At 2104 the insert node does not have any children.

At 2106 the M1.1.1 index is 0, pointing to the position shown by the ^ character here: [^ "b"]. Accordingly, the retrieved property ("z") is inserted into the M1.1.1 dataset at this position to yield ["z" "b"]. This is shown in the "M1.1.1 ΔA" column of table X above.

At 2108 the M1.1.1 index is incremented, as shown in the "M1.1.1 ΔB" column of table X above.

At 1704 M1.1.1 returns with the values shown in the "M1.1.1 Return" column of Table X above.

Update Node without Children, Non-Empty Diff, Materialize 1.1.2

In the update node without children example, M1.1 calls a new instance of materialize (M1.1.2) with the inputs as shown in Table Z:

TABLE Z

| Update node without children, non-empty diff, M1.1.2 | | | |
|---|---|---|---|
| Variable | M1.1.2 In | M1.1.2 ΔA | M1.1.2 Return |
| Index | 1 | | 1 |
| Dataset | [“z” “b”] | [“z”] | [“z”] |
| Edit script | (delete) | | NA |
| Moves | { } | | { } |
| State | { } | | { } |

At 1702 the root node of the edit script is identified as a delete node. At 1902 the root node does not have any children.

At 1904 elements are deleted from the dataset. The M1.1.2 index is 1, pointing to the position indicated by the ^ character here: [“z” ^“b”]. As the delete node does not specify a length a single element at the position indicated by the index is deleted—i.e. element “b”. The resulting dataset is shown in the “M1.1.2 ΔA” column of Table Z above.

At 1704, M1.1.2 returns with the values shown in the “M1.1.2 Return” column of Table Z above.

4.3.6 Materialize Example: Update Node with Children (Pass 1)

Update Node with Children—Materialize 1

To illustrate processing of an update node that does have children, consider a call to materialize with inputs shown in the “M1 In” column of Table AA:

TABLE AA

| Update node with children, M1 inputs | |
|---|---|
| Variable | M1 In |
| Index | 0 |
| Dataset | [(:p {“a” “b”} [:div])] |
| Edit script | (update {“a” [(insert “z”) (delete)]} (delete)) |
| Moves | { } |
| State | { } |

At 1702 the root node of the input edit script is identified as an update node. At 2002 the node has children. At 2030 the M1 child marker is set to point to the first child: (delete).

At 2032 inputs for a new materialize instance (M1.1) are generated. The M1.1 index input is initialized to 0. The M1.1 dataset input is [:div] (the body of the input dataset, in this case an empty div child). The M1.1 edit script input is the child indicated by the M1 child marker: (delete). The M1.1 moves and state inputs are the M1 moves and state values. At 2034 a new materialize instance (M1.1) is called on the inputs generated at 2032.

At 1702 the root node of the M1.1 edit script is identified to be a delete node, and at 1902 no children are identified. Examples of processing a delete node without children are provided in sections 4.3.3 (M1) and 4.3.5 (M1.1.2) above. Columns “M1.1 In” and “M1.1 Return” of Table BB below show the input and return values of the M1.1 instance:

TABLE BB

| Update node with children, M1.1 inputs and return values | | |
|---|---|---|
| Variable | M1.1 In | M1.1 Return |
| Index | 0 | 0 |
| Dataset | [:div] | [ ] |
| Edit script | (delete) | NA |
| Moves | { } | { } |
| State | { } | { } |

At 2036 there are no further children of the M1 root node to process.

At 2042 the diff operation is processed. This processing is described in section 4.3.5 above and results in the materialized diff of {“a” “z”} being generated at 2024. The materialized diff replaces the attributes of the dataset element indicated by the index at 2026, as shown in the “M1 ΔA” column of Table CC below.

At 2044 the dataset returned by last materialize instance called at 2034 is empty. At 2006 the index is incremented (as shown in the “M1 ΔB” column of Table CC). At 1704 M1 returns with the values shown in the “M1.1 Return” column of Table CC.

TABLE CC

| Update node with children, M1 return values | | |
|---|---|---|
| Variable | M1 In | M1 Return |
| Index | 0 | 1 |
| Dataset | [(:p {“a” “b”} [:div])] | [[:p {“a” “z”}]] |
| Edit script | (update {“a” [(insert “z”) (delete)]} (delete)) | NA |
| Moves | { } | { } |
| State | { } | { } |

4.3.7 Materialize Example: Insert Node without Children (Pass 1)

To illustrate processing of an insert node without children, consider a call to materialize (M1) with inputs as shown in the “M1 In” column of Table DD:

TABLE DD

| Insert node without children, M1 | | | | |
|---|---|---|---|---|
| Variable | M1 In | M1 ΔA | M1 ΔB | M1 Return |
| Index | 0 | | 1 | 1 |
| Dataset | [[“a” “b” “c”]] | [“y” [“a” “b” “c”]] | | [“y” [“a” “b” “c”]] |
| Edit script | (insert “y”) | | | NA |
| Moves | { } | | | { } |
| State | { } | | | { } |

At 1702 the root node of the edit script is identified as an insert node. At 2102 the property of the insert node is retrieved: property=“y”.

At 2104 the insert node does not have any children.

At 2106 the M1 index is 0, pointing to the position before the inner array of the dataset as shown by the ^ character here: [^ [“a” “b” “c”]]. Accordingly, the retrieved property (“y”) is inserted into the M1 dataset at this position to yield [“y” [“a” “b” “c”]]. This is shown in the “M1 ΔA” column of table DD above.

At 2108 the M1 index is incremented, as shown in the “M1 ΔB” column of table DD above.

At 1704 M1 returns with the values shown in the “M1 Return” column of Table DD above.

Other examples of processing an insert node without children are provided in section 4.3.2 above (materialize 1.2 of the retain node with children example), 4.3.4 above (materialize 1.2 of the delete node with children example), and 4.3.8 below (materialize 1.1 of the insert node with children example).

4.3.8 Materialize Example: Insert Node with Children (Pass 1)

Insert Node with Children—Materialize 1

To illustrate processing of an insert node that does have children, consider a call to materialize with inputs shown in the "M1 In" column of Table EE:

TABLE EE

Insert node with children, M1 inputs

| Variable | M1 In |
|---|---|
| Index | 0 |
| Dataset | [["a" "b" "c"]] |
| Edit script | (insert [ ] (insert "z")) |
| Moves | { } |
| State | { } |

At 1702 the root node of the input edit script is identified as an insert node.

At 2102 the property of the insert node is retrieved: property=[ ].

At 2104 the root node is identified to have children. At 2110 the M1 child marker is set to point to the first child: (insert "z").

At 2112 inputs for a new materialize instance (M1.1) are generated. The M1.1 index input is initialized to 0. The M1.1 dataset input is the property retrieved at 2102: [ ]. The M1.1 edit script input is the child indicated by the child marker: (insert "z"). The M1.1 moves and state inputs are the M1 moves and state values. At 2114 a new materialize instance (M1.1) is called on the inputs generated at 2112.

Processing of the M1.1 instance is described in detail below. Columns "M1.1 In" and "M1.1 Return" of Table FF below show the input and return values of the M1.1 instance:

TABLE FF

Insert node with children, M1.1 inputs and return values

| Variable | M1.1 In | M1.1 Return |
|---|---|---|
| Index | 0 | 1 |
| Dataset | [ ] | ["z"] |
| Edit script | (insert "z") | NA |
| Moves | { } | { } |
| State | { } | { } |

At 2116 there are no further children of the M1 root node to process.

At 2122 the M1 variables are updated based on the return values of M1.1. This update is shown in the "M1 ΔA" column of Table GG below. The position indicated by the M1 index is as shown by the ^ character here: [^ ["a" "b" "c"]]). Accordingly, the dataset returned by M1.1 (["z"]) is inserted into the M1 dataset at this position yielding [["z"] ["a" "b" "c"]]. The M1 state and moves are replaced by the state and moves returned by M1.1 (in this case both are empty: { }).

At 2124 the M1 index is incremented (from 0 to 1) as shown in the "M1 ΔB" column of Table GG. At 1704 M1 returns with the values shown in the "M1 Return" column of Table GG.

TABLE GG

Insert node with children, M1 return values

| Variable | M1 In | M1.1 Return | M1 ΔA | M1 ΔB | M1 Return |
|---|---|---|---|---|---|
| Index | 0 | 1 | | 1 | 1 |
| Dataset | [["a" "b" "c"]] | ["z"] | [["z"]["a" "b" "c"]] | | [["z"]["a" "b" "c"]] |
| Edit script | (insert [ ] (insert "z")) | NA | | | NA |
| Moves | { } | { } | { } | | { } |
| State | { } | { } | { } | | { } |

Insert Node with Children—Materialize 1.1

In the insert node with children example, M1 calls a new instance of materialize (M1.1) with the inputs as shown in Table HH:

TABLE HH

Insert node with children, M1.1

| Variable | M1.1 In | M1.1 ΔA | M1.1 ΔB | M1.1 Return |
|---|---|---|---|---|
| Index | 0 | | 1 | 1 |
| Dataset | [ ] | ["z"] | | ["z"] |
| Edit script | (insert "z") | | | NA |
| Moves | { } | | | { } |
| State | { } | | | { } |

At 1702 the root node of the edit script is identified as an insert node. At 2102 the property of the insert node is retrieved: property="z".

At 2104 the insert node does not have any children.

At 2106 the M1.1 index is 0, pointing to the position in the dataset shown by the ^ character here: [^ ]. Accordingly, the retrieved property ("z") is inserted into the M1.1 dataset at this position to yield ["z"]. This is shown in the "M1.1 ΔA" column of table HH above.

At 2108 the M1.1 index is incremented, as shown in the "M1.1 ΔB" column of table HH above.

At 1704 M1.1 returns with the values shown in the "M1.1 Return" column of Table HH above.

4.3.9 Materialize Example: Source Node (Pass 1)

Source Node—Materialize 1

To illustrate processing of a source node in pass 1 of the algorithm, consider a call to materialize with inputs shown in the "M1 In" column of Table II:

TABLE II

| Source node pass 1, M1 inputs | |
|---|---|
| Variable | M1 In |
| Index | 0 |
| Dataset | [["a" "b" "c"]] |
| Edit script | (source 1 (retain (retain) (delete 2))) |
| Moves | { } |
| State | { } |

At 1702 the root node of the edit script is a source node.

At 2202 a new entry is added to the M1 state map: state={1: (source 1 (retain (retain) (delete 2)))}.

At 2204 an M1 child marker is initialized to point to the first child of the edit script root node: (retain (retain) (delete 2)).

At 2206 inputs to a new materialize instance (M1.1) are generated. The M1.1 index input is the M1 index value: 0. The M1.1 dataset input is the M1 dataset. The M1.1 edit script input is the child indicated by the M1 child marker: (retain (retain) (delete 2)). The M1.1 moves and state inputs are the M1 moves and state values. At 2208 the new materialize instance (M1.1) is called on the inputs generated at 2206.

Processing of the M1.1 instance (which includes further recursion) is described in detail below. The M1.1 inputs and outputs are shown in columns "M1.1 In" and "M1.1 Return" columns of Table JJ:

TABLE JJ

| Source node pass 1, M1.1 inputs and return values | | |
|---|---|---|
| Variable | M1.1 In | M1.1 Return |
| Index | 0 | 1 |
| Dataset | [["a" "b" "c"]] | [["a"]] |
| Edit script | (retain (retain) (delete 2)) | NA |
| Moves | { } | { } |
| State | {1: (source 1 (retain (retain) (delete 2)))} | {1: (source 1 (retain (retain) (delete 2)))} |

TABLE JJ-continued

At 2210 no further children of the M1 root node exist.

At 2216 the move source value is identified as ["a"]. This is the element of the dataset returned by M1.1 between 0 (the value of the M1 index) and 1 (the value of the index returned by M1.1).

At 2218 the source value is added to the M1 moves map, indexed by the identifier of the source node being processed: Moves={1: ["a"]}. This is shown in the "M1 ΔA" column of Table KK below.

At 2220 the source value is removed from the M1 dataset (i.e. by removing the element between index 0 (the M1 index) and index 1 (the index returned by M1.1)). This is shown in the "M1 SB" column of Table KK. At 1704 M1 returns with the values shown in the "M1 return" column of Table KK.

TABLE KK

| Source node pass 1, M1 return values | | | | | |
|---|---|---|---|---|---|
| Variable | M1 In | M1.1 Return | M1 ΔA | M1 ΔB | M1 Return |
| Index | 0 | 1 | | | 0 |
| Dataset | [["a" "b" "c"]] | [["a"]] | | [ ] | [ ] |
| Edit script | (source 1 (retain (retain) (delete 2))) | NA | | | NA |
| Moves | { } | { } | {1: ["a"]} | | {1: ["a"]} |
| State | { } | {1: (source 1 (retain (retain) (delete 2)))} | | | {1: (source 1 (retain (retain) (delete 2)))} |

Source Node Pass 1—Materialize 1.1

In the source node pass 1 example, M1 calls a new instance of materialize (M1.1) with the inputs as shown in Table LL:

TABLE LL

| Source node pass 1, M1.1 inputs | |
|---|---|
| Variable | M1.1 In |
| Index | 0 |
| Dataset | [["a" "b" "c"]] |
| Edit script | (retain (retain) (delete 2)) |
| Moves | { } |
| State | {1: (source 1 (retain (retain) (delete 2)))} |

At 1702 the root node of the M1.1 edit script is identified as a retain node. At 1802 the root node is identified to have children. At 1806 an M1.1 child marker is initialized to point to the first child node of the edit script: (retain).

At 1808 inputs for a new materialize instance (M1.1.1) are generated and at 1810 materialize is called on those inputs. At 1702 the root node of the M1.1.1 edit script is identified to be a retain node, and at 1802 no children are identified. Examples of processing a retain node without children are provided in sections 4.3.1 (M1) and 4.3.2 (M1.1) above. The M1.1.1 inputs and outputs are shown in columns "M1.1.1 In" and "M1.1.1 Return" columns of Table MM below.

TABLE MM

Source node pass 1, M1.1.1 inputs and return values

| Variable | M1.1.1 In | M1.1.1 Return |
|---|---|---|
| Index | 0 | 1 |
| Dataset | ["a" "b" "c"] | ["a" "b" "c"] |
| Edit script | (retain) | NA |
| Moves | { } | { } |
| State | {1: (source 1 (retain (retain) (delete 2)))} | {1: (source 1 (retain (retain) (delete 2)))} |

At 1812 further children of the M1.1 root node exist. At 1814 the M1.1 child marker is updated to point to the next child of the edit script root node: (delete 2).

At 1816 inputs to a new materialize instance (M1.1.2) are generated and at 1810 materialize is called on those inputs. At 1702 the root node of the M1.1 edit script is identified to be a delete node, and at 1902 no children are identified. Examples of processing a delete node without children are provided in sections 4.3.3 (M1) and 4.3.5 (M1.1.2) above. As the delete node has a length (2), two nodes from the edit script input into M1.1.2 are deleted at 1904 (from position 1 of the M1.1.2 dataset as per the M1.1.2 index). The M1.1.2 inputs and outputs are shown in columns "M1.1.2 In" and "M1.1.2 Return" columns of Table NN below.

TABLE NN

Source node pass 1, M1.1.2 inputs and return values

| Variable | M1.1.2 In | M1.1.2 Return |
|---|---|---|
| Index | 1 | 1 |
| Dataset | ["a" "b" "c"] | ["a"] |
| Edit script | (delete 2) | NA |
| Moves | { } | { } |
| State | {1: (source 1 (retain (retain) (delete 2)))} | {1: (source 1 (retain (retain) (delete 2)))} |

At 1812 there are no further children of the M1.1 root node to process.

At 1818 the M1.1 variables are updated based on the return values of M1.1.2 as shown in the "M1.1 ΔA" column of Table OO below. The M1.1 index remains unchanged: 0. The M1.1 edit script remains unchanged: (retain (retain) (delete 2)).

The position indicated by the M1.1 index is as shown by the ^ character here: [^ ["a" "b" "c"]]. Accordingly, the M1.1 dataset is updated by replacing the element indicated by the M1.1 index (i.e. element ["a" "b" "c"]) with the dataset returned by M1.1.2 (i.e. ["a"]). The M1.1 state and moves are replaced by the state and moves returned by M1.1.2.

At 1820 the M1.1 index is incremented (from 0 to 1) as shown in the "M1.1 ΔB" column of Table OO. At 1704 M1.1 returns with the values shown in the "M1.1 return" column of Table OO.

TABLE OO

Source node pass 1, M1.1 return values

| Variable | M1.1 In | M1.1.2 Return | M1.1 ΔA | M1 ΔB | M1 Return |
|---|---|---|---|---|---|
| Index | 0 | 1 | | 1 | 1 |
| Dataset | [["a" "b" "c"]] | ["a"] | [["a"]] | | [["a"]] |
| Edit script | (retain (retain) (delete 2)) | NA | | | NA |
| Moves | { } | { } | { } | | { } |
| State | {1: (source 1 (retain (retain) (delete 2)))} | {1: (source 1 (retain (retain) (delete 2)))} | {1: (source 1 (retain (retain) (delete 2)))} | | {1: (source 1 (retain (retain) (delete 2)))} |

4.3.10 Materialize Example: Target Node (Pass 2)

To illustrate processing of an edit script with a target root node in pass 2, consider a call to materialize with inputs shown in the "M2 In" column of Table PP:

TABLE PP

Target node pass 2, M2 inputs

| Variable | M2 In |
|---|---|
| Index | 0 |
| Dataset | [["b" "c"]] |
| Edit script | (target 1) |
| Moves | {1: [["a"]]} |
| State | {1: (source 1 (retain (retain) (delete 2)))} |

At 2302, the root node of the edit script is a target node.

At 2402 the moves value is retrieved from the moves map using the identifier of the target node: Moves=["a"].

At 2404 the source edit script is retrieved from the state map using the identifier of the target node: source edit script=(source 1 (retain (retain) (delete 2))).

At 2406, the move value retrieved is added to the M2 dataset at the M2 indexed position. The updated M2 dataset becomes: [["a"] ["b" "c"]] as shown in the "M2 ΔA" column of table RR below.

Following the update of the dataset at 2406, the edit script associated with the source node (as stored in the state variable) is processed in case there are nested move operations that need to be performed. In this case the edit script does not have any nested move operations so no changes need to be made. The steps performed in processing the source node edit script will, however, still be described for illustrative purposes.

At 2408 a child marker is initialized to point to the first child of the source edit script: (retain (retain) (delete 2)).

At 2410 inputs for a new materialize instance (M2.1) are generated. The index to be input to M2.1 is 0. The dataset input for M2.1 is the moves value: [[“a”]]. The edit script input for M2.1 is the child of the source edit script: (retain (retain) (delete 2)). The moves and state inputs to M2.1 are the M2 moves and state values At 2410 the new materialize instance (M2.1) is called on the inputs generated at 2408.

Processing of the M2.1 instance is described in detail below. The M2.1 inputs and outputs are shown in columns “M2.1 In” and “M2.1 Return” columns of Table QQ:

TABLE QQ

Target node pass 2, M2.1 inputs and return values

| Variable | M2.1 In | M2.1 Return |
|---|---|---|
| Index | 0 | 1 |
| Dataset | [[“a”]] | [[“a”]] |
| Edit script | (retain (retain) (delete 2)) | NA |
| Moves | {1: [[“a”]]} | {1: [[“a”]]} |
| State | {1: (source 1 (retain (retain) (delete 2)))} | {1: (source 1 (retain (retain) (delete 2)))} |

At 2414 there are no further children nodes of the source edit script.

At 2304 M2 returns with the values shown in the “M2 Return” column of Table RR.

TABLE RR

Target node pass 2, M2 return

| Variable | M2 In | M2 ΔA | M2 Return |
|---|---|---|---|
| Index | 0 | | 1 |
| Dataset | [[“b” “c”]] | [[“a”] [“b” “c”]] | [[“a”] [“b” “c”]] |
| Edit script | (target 1) | | NA |
| Moves | {1: [[“a”]]} | | {1: [[“a”]]} |
| State | {1: (source 1 (retain (retain) (delete 2)))} | | {1: (source 1 (retain (retain) (delete 2)))} |

Target Node Pass 2—Materialize 2.1

In the target node pass 2 example, M2 calls a new instance of materialize (M2.1) with the inputs as shown in Table SS:

TABLE SS

Target node pass 2, M2.1 inputs and return values

| Variable | M2.1 In |
|---|---|
| Index | 0 |
| Dataset | [[“a”]] |
| Edit script | (retain (retain) (delete 2)) |
| Moves | {1: [[“a”]]} |
| State | {1: (source 1 (retain (retain) (delete 2)))} |

At 2302 the root node of the M2.1 edit script is identified as a retain node. At 1802 the root node is identified to have children. At 1806 an M2.1 child marker is initialized to point to the first child node of the edit script: (retain).

At 1808 inputs for a new materialize instance (M2.1.1) are generated. The M2.1.1 index input is initialized to 0. The M2.1.1 dataset input is the element of the M2.1 dataset indicated by the M2.1 index: [“a”]. The M2.1.1 edit script input is the child indicated by the child marker: (retain). The M2.1.1 moves and state inputs are the M2.1 moves and state values.

At 1810 a new materialize instance (M2.1.1) is called on the inputs generated at 1808. At 2303 the edit script input to the M2.1.1 instance is identified as a retain node, which is processed is as per the first pass and has been described above. The M2.1.1 inputs and outputs are shown in columns “M2.1.1 In” and “M2.1.1 Return” columns of Table TT:

TABLE TT

Target node pass 2, M2.1.1 inputs and return values

| Variable | M2.1.1 In | M2.1.1 Return |
|---|---|---|
| Index | 0 | 1 |
| Dataset | [“a”] | [“a”] |
| Edit script | (retain) | NA |
| Moves | {1: [[“a”]]} | {1: [[“a”]]} |
| State | {1: (source 1 (retain (retain) (delete 2)))} | {1: (source 1 (retain (retain) (delete 2)))} |

At 1812 further children of the M2.1 root node exist. At 1814 the M2.1 child marker is updated to point to the next child of the M2.1 root node: (delete 2).

At 1816 inputs to a new materialize instance (M2.1.2) are generated. The index, dataset, moves and state inputs to materialize 2.1.2 are the corresponding values as returned by M2.1.1. The edit script input to M2.1.2 is the M2.1 child indicated by the M2.1 child marker: (delete 2). At 1810 a new materialize instance (M2.1.2) is called on the inputs generated at 1816.

At 2302 of the M2.1.2 instance the edit script node is a delete node. Accordingly the relevant inputs are simply returned at 2304. The M1.2 inputs and outputs are shown in columns “M1.2 In” and “M1.2 Return” columns of Table UU:

TABLE UU

Target node pass 2, M2.1.2 inputs and return values

| Variable | M2.1.2 In | M2.1.2 Return |
|---|---|---|
| Index | 1 | 1 |
| Dataset | [“a”] | [“a”] |
| Edit script | (delete 2) | NA |
| Moves | {1: [[“a”]]} | {1: [[“a”]]} |
| State | {1: (source 1 (retain (retain) (delete 2)))} | {1: (source 1 (retain (retain) (delete 2)))} |

At 1812 there are no further children of the M1 root node to process.

At 1818 the M2.1 variables are updated based on the return values of M2.1.2. The M2.1 dataset is updated by replacing the element indicated by the M2.1 index (i.e. element [“a”]) with the dataset returned by M2.1.2 (i.e. [“a”]). The M2.1 state and moves are replaced by the state and moves returned by M2.1.2. These updates are shown in the “M2.1 ΔA” column of Table VV below.

At 1820 the M2.1 index is incremented (from 0 to 1). This update is shown in the "M2.1 ΔB" column of Table VV.

At 2304 M2.1 returns with the values shown in the "M2.1 return" column of Table VV.

TABLE VV

| Target node pass 2, M2.1 return values | | | | | |
|---|---|---|---|---|---|
| Variable | M2.1 In | M2.1.2 Return | M2.1 ΔA | M2.1 ΔB | M2.1 Return |
| Index | 0 | 1 | | 1 | 1 |
| Dataset | [["a"]] | ["a"] | [["a"]] | | [["a"]] |
| Edit script | (retain (retain) (delete 2)) | NA | | | NA |
| Moves | {1: [["a"]]} | {1: [["a"]]} | {1: [["a"]]} | | {1: [["a"]]} |
| State | {1: (source 1 (retain (retain) (delete 2)))} | {1: (source 1 (retain (retain) (delete 2)))} | {1: (source 1 (retain (retain) (delete 2)))} | | {1: (source 1 (retain (retain) (delete 2)))} |

At 1812 further children of the M1 root node exist. At 1814 the M1 child marker is updated to point to the next child of the root node: (retain).

4.3.11 Materialize Example: Complete Example (Pass 1 and Pass 2)

To illustrate a complete worked example including both passes of the materialize algorithm consider the inputs to the first materialize call of the first pass (M1) shown in Table WW:

TABLE WW

| Complete example, M1 inputs | |
|---|---|
| Variable | M1 In |
| Index | 0 |
| Dataset | [["a" "b" "c"]] |
| Edit script | [(retain (source 1 (retain)) (retain) (target 1))] |
| Moves | { } |
| State | { } |

Complete Example: Materialize 1

At 1702 the root node is a retain node. At 1802 the root node has children. At 1806 the M1 child marker is initialized to point to the first child node: (source 1 (retain)).

At 1808 inputs for a new materialize instance (M1.1) are generated. The M1.1 index input is initialized to 0. The M1.1 dataset input is the element of the M1 dataset indicated by the M1 index: ["a" "b" "c"]. The M1.1 edit script input is the child indicated by the child marker: (source 1 (retain)). The M1.1 moves and state inputs are the M1 moves and state values. At 1810 a new materialize instance (M1.1) is called on these inputs.

Processing of the M1.1 instance is described below. The M1.1 inputs and outputs are shown in columns "M1.1 In" and "M1.1 Return" columns of Table XX:

TABLE XX

| Complete example, M1.1 inputs and return values | | |
|---|---|---|
| Variable | M1.1 In | M1.1 Return |
| Index | 0 | 0 |
| Dataset | ["a" "b" "c"] | ["b" "c"] |
| Edit script | (source 1 (retain)) | NA |
| Moves | { } | {1: ["a"]} |
| State | { } | {1: (source 1 (retain))} |

At 1816 inputs to a new materialize instance (M1.2) are generated. The index, dataset, moves and state inputs to materialize 1.2 are the corresponding values as returned by M1.1. The edit script input to M1.2 is the M1 child indicated by the M1 child marker: (retain). At 1810 a new materialize instance (M1.2) is called on the inputs generated at 1816.

The root node of the edit script input to M1.2 is a retain node without children. Examples of processing such a node are provided above. The M1.2 inputs and outputs are shown in columns "M1.2 In" and "M1.2 Return" columns of Table YY:

TABLE YY

| Complete example, M1.2 inputs and return values | | |
|---|---|---|
| Variable | M1.2 In | M1.2 Return |
| Index | 0 | 1 |
| Dataset | ["b" "c"] | ["b" "c"] |
| Edit script | (retain) | NA |
| Moves | {1: ["a"]} | {1: ["a"]} |
| State | {1: (source 1 (retain))} | {1: (source 1 (retain))} |

At 1812 further children of the M1 root node exist. At 1814 the M1 child marker is updated to point to the next child of the root node: (target 1).

At 1816 inputs to a new materialize instance (M1.3) are generated. The index, dataset, moves and state inputs to materialize 1.3 are the corresponding values as returned by M1.2. The edit script input to M1.3 is the M1 child indicated by the M1 child marker: (target 1). At 1810 a new materialize instance (M1.3) is called on the inputs generated at 1816.

As the root node of the edit script input to M1.3 is a target node (and the first processing pass is being performed), the M1.3 inputs are returned at 1704. The M1.3 inputs and outputs are shown in columns "M1.3 In" and "M1.3 Return" columns of Table ZZ:

TABLE ZZ

| Complete example, M1.3 inputs and return values | | |
|---|---|---|
| Variable | M1.3 In | M1.3 Return |
| Index | 1 | 1 |
| Dataset | ["b" "c"] | ["b" "c"] |
| Edit script | (target 1) | NA |
| Moves | {1: ["a"]} | {1: ["a"]} |

TABLE ZZ-continued

| Complete example, M1.3 inputs and return values | | |
|---|---|---|
| Variable | M1.3 In | M1.3 Return |
| State | {1: (source 1 (retain))} | {1: (source 1 (retain))} |

At 1812 there are no further children of the M1 root node to process.

At 1818 the M1 variables are updated based on the return values of M1.3 as shown in the "M1 ΔA" column of Table AAA below. The M1 dataset is updated by replacing the element indicated by the M1 index (i.e. element ["a" "b" "c"]) with the dataset returned by M1.3 (i.e. ["b" "c"]). The M1 moves is replaced by the moves returned by M1.3: {1: ["a"]}. The M1 state is replaced by the state returned by M1.3: {1: (source 1 (retain))}.

At 1820 the M1 index is incremented (from 0 to 1) as shown in the "M1 ΔB" column of Table AAA. At 1704 M1 returns with the values shown in the "M1 return" column of Table AAA. This ends the first pass of the algorithm.

TABLE AAA

| Complete example, M1 return | | | | | |
|---|---|---|---|---|---|
| Variable | M1 In | M1.3 Return | M1 ΔA | M1 ΔB | M1 Return |
| Index | 0 | 1 | | 1 | 1 |
| Dataset | [["a" "b" "c"]] | ["b" "c"] | [["b" "c"]] | | [["b" "c"]] |
| Edit script | [(retain (source 1 (retain)) (retain) (target 1))] | NA | | | NA |
| Moves | { } | {1: ["a"]} | {1: ["a"]} | | {1: ["a"]} |
| State | { } | {1: (source 1 (retain))} | {1: (source 1 (retain))} | | {1: (source 1 (retain))} |

Complete Example: Materialize 1.1

In the complete example, M1 calls a new instance of materialize (M1.1) with the inputs as shown in Table BBB:

TABLE BBB

| Complete example, M1.1 | |
|---|---|
| Variable | M1.1 In |
| Index | 0 |
| Dataset | ["a" "b" "c"] |
| Edit script | (source 1 (retain)) |
| Moves | { } |
| State | { } |

At 1702 the root node of the edit script is a source node.

At 2202 a new entry is added to the M1.1 state map: state={1: (source 1 (retain))}.

At 2204 an M1.1 child marker is initialized to point to the first child of the edit script root node: (retain).

At 2206 inputs to a new materialize instance (M1.1.1) are generated. The M1.1.1 index input is the M1.1 index: 0. The M1.1.1 dataset input is the M1.1 dataset. The M1.1.1 edit script input is the child indicated by the M1.1 child marker: (retain). The M1.1.1 moves and state inputs are the M1.1 moves and state values. At 2208 the new materialize instance (M1.1.1) is called on the inputs generated at 2206.

At 1702 the root node of the edit script input to M1.1.1 is identified to be a retain node. Examples of processing a retain node without children are provided above. The M1.1.1 inputs and outputs are shown in columns "M1.1.1 In" and "M1.1.1 Return" columns of Table CCC:

TABLE CCC

| Complete example, M1.1.1 inputs and return values | | |
|---|---|---|
| Variable | M1.1.1 In | M1.1.1 Return |
| Index | 0 | 1 |
| Dataset | ["a" "b" "c"] | ["a" "b" "c"] |
| Edit script | (retain) | NA |
| Moves | { } | { } |
| State | {1: (source 1 (retain))} | {1: (source 1 (retain))} |

At 2210 no further children of the M1.1 root node exist.

At 2216 the move source value is identified to be "a" (the element of the dataset returned by M1.1.1 between the M1.1 index (0) and the index returned by M1.1.1 (1)).

At 2218 the source value is added to the M1.1 moves map, indexed by the identifier of the source node being processed: Moves={1: ["a"]}. This is shown in the "M1.1 ΔA" column of Table DDD below.

At 2220 the source value is removed from the M1.1 dataset. This is shown in the "M1.1 ΔB" column of Table DDD. At 1704 M1.1 returns with the values shown in the "M1.1 return" column of Table DDD.

TABLE DDD

| Complete example, M1.1 return values | | | | | |
|---|---|---|---|---|---|
| Variable | M1.1 In | M1.1.1 Return | M1.1 ΔA | M1.1 ΔB | M1.1 Return |
| Index | 0 | 1 | | | 0 |
| Dataset | ["a" "b" "c"] | ["a" "b" "c"] | | ["b" "c"] | ["b" "c"] |
| Edit | (source 1 | NA | | | NA |

TABLE DDD-continued

| Complete example, M1.1 return values | | | | | |
|---|---|---|---|---|---|
| Variable | M1.1 In | M1.1.1 Return | M1.1 ΔA | M1.1 ΔB | M1.1 Return |
| script | (retain)) | | | | |
| Moves | { } | { } | {1: ["a"]} | | {1: ["a"]} |
| State | { } | {1: (source 1 (retain))} | | | {1: (source 1 (retain))} |

Complete Example: Materialize 2

Once the first processing pass is complete the main processing function initiates the second processing pass. The inputs to the second pass of the materialize algorithm are: index=0; dataset=dataset returned by M1; edit script=original edit script; moves=moves returned by M1; state=state returned by M1. These are shown in Table EEE:

TABLE EEE

| Complete example, M2 inputs | |
|---|---|
| Variable | M2 In |
| Index | 0 |
| Dataset | [["b" "c"]] |
| Edit script | (retain (source 1 (retain)) (retain) (target 1)) |
| Moves | {1: ["a"]} |
| State | {1: (source 1 (retain))} |

At 2302 the root node is a retain node. At 1802 the root node has children. At 1806 the M2 child marker is initialized to point to the first child node: (source 1 (retain)).

At 1808 inputs for a new materialize instance (M2.1) are generated. The M2.1 index input is initialized to 0. The M2.1 dataset input is the element of the M2 dataset indicated by the M2 index: ["b" "c"]. The M2.1 edit script input is the child indicated by the child marker: (source 1 (retain)). The M2.1 moves and state inputs are the M2 moves and state values. At 1810 a new materialize instance (M2.1) is called on these inputs.

At 2302 the root node of the edit script input to M2.1 is identified as a source node. Accordingly, the M2.1 inputs are simply returned at 2304. The M2.1 inputs and outputs are shown in columns "M2.1 In" and "M2.1 Return" columns of Table FFF:

TABLE FFF

| Complete example, M2.1 inputs and return values | | |
|---|---|---|
| Variable | M2.1 In | M2.1 Return |
| Index | 0 | 0 |
| Dataset | ["b" "c"] | ["b" "c"] |
| Edit script | (source 1 (retain)) | NA |
| Moves | {1: ["a"]} | {1: ["a"]} |
| State | {1: (source 1 (retain))} | {1: (source 1 (retain))} |

At 1812 further children of the M2 root node exist. At 1814 the M2 child marker is updated to point to the next child of the M2 root node: (retain).

At 1816 inputs to a new materialize instance (M2.2) are generated. The index, dataset, moves and state inputs to materialize 2.2 are the corresponding values as returned by M2.1. The edit script input to M2.2 is the M2 child indicated by the M2 child marker: (retain). At 1810 a new materialize instance (M2.2) is called on the inputs generated at 1816.

At 2302 the root node of the edit script input to M2.2 is identified as a retain node without children. Examples of processing such a node are provided above (noting the processing in the second pass is the same as the processing in the first pass). The M2.2 inputs and outputs are shown in columns "M2.2 In" and "M2.2 Return" columns of Table GGG:

TABLE GGG

| Complete example, M2.2 inputs and return values | | |
|---|---|---|
| Variable | M2.2 In | M2.2 Return |
| Index | 0 | 1 |
| Dataset | ["b" "c"] | ["b" "c"] |
| Edit script | (retain) | NA |
| Moves | {1: ["a"]} | {1: ["a"]} |
| State | {1: (source 1 (retain))} | {1: (source 1 (retain))} |

At 1812 further children of the M2 root node exist. At 1814 the M2 child marker is updated to point to the next child of the M2 root node: (target 1).

At 1814 inputs to a new materialize instance (M2.3) are generated. The index, dataset, moves and state inputs to materialize 2.3 are the corresponding values as returned by M2.2. The edit script input to M2.3 is the M2 child indicated by the M2 child marker: (target 1). At 1810 a new materialize instance (M2.3) is called on the inputs generated at 1816.

Processing of the M2.3 instance is described below. The M2.3 inputs and outputs are shown in the "M2.3 In" and "M2.3 Return" columns of Table HHH:

TABLE HHH

| Complete example, M2.3 inputs and return values | | |
|---|---|---|
| Variable | M2.3 In | M2.3 Return |
| Index | 1 | 1 |
| Dataset | ["b" "c"] | ["b" "a" "c"] |
| Edit script | (target 1) | NA |
| Moves | {1: ["a"]} | {1: ["a"]} |
| State | {1: (source 1 (retain))} | {1: (source 1 (retain))} |

At 1812 there are no further children of the M2 root node to process.

At 1818 the M2 variables are updated based on the return values of M2.3 as shown in the "M2 ΔA" column of Table III below. The M2 dataset is updated by replacing the element indicated by the M2 index (i.e. element ["b" "c"]) with the dataset returned by M2.3 (i.e. ["b" "a" "c"]). The M2 moves is replaced by the moves returned by M2.3: {1: ["a"]}. The M2 state is replaced by the state returned by M2.3: {1: (source 1 (retain))}.

At 1820 the M2 index is incremented (from 0 to 1) as shown in the "M2 ΔB" column of Table III. At 2304 M1 returns with the values shown in the "M2 return" column of Table III.

TABLE III

Complete example, M2 return

| Variable | M2 In | M2.3 Return | M2 ΔA | M2 ΔB | M2 Return |
|---|---|---|---|---|---|
| Index | 0 | 1 | | 1 | 1 |
| Dataset | [["b" "c"]] | ["b" "a" "c"] | [["b" "a" "c"]] | | [["b" "a" "c"]] |
| Edit script | [(retain (source 1 (retain)) (retain) (target 1))] | NA | | | NA |
| Moves | {1: ["a"]} | {1: ["a"]} | | | {1: ["a"]} |
| State | {1: (source 1 (retain))} | {1: (source 1 (retain))} | | | {1: (source 1 (retain))} |

This ends the second pass of the algorithm, with the returned dataset (dataset B) being the original dataset (dataset A) with the edits defined by the edit script performed.

Complete Example: Materialize 2.3

In the complete example, M2 calls a new instance of materialize (M2.3) with the inputs as shown in Table JJJ:

TABLE JJJ

Complete example, M2.3

| Variable | M2.3 In | M2.3 ΔA |
|---|---|---|
| Index | 1 | |
| Dataset | ["b" "c"] | ["b" "a" "c"] |
| Edit script | (target 1) | |
| Moves | {1: ["a"]} | |
| State | {1: (source 1 (retain))} | |

At 2302, the root node of the edit script is a target node.

At 2402 the moves value is retrieved from the moves map using the identifier of the target node: Moves=["a"].

At 2404 the source edit script is retrieved from the state map using the identifier of the target node: source edit script=(source 1 (retain)).

At 2406, the move value retrieved is added to the M2.3 dataset at the M2.3 indexed position. The updated M2.3 dataset becomes: ["b" "a" "c"]. This is shown in the "M2.3 ΔA" column of table JJJ above.

At 2408 a child marker is initialized to point to the first child node of the source edit script: (retain).

At 2410 inputs for a new materialize instance (M2.3.1) are generated. The index to be input to M2.3.1 is 0. The dataset input for M2.3.1 is the moves value: ["a"]. The edit script input for M2.3.1 is the child of the source edit script: (retain). The moves and state inputs to M2.3.1 are the M2.3 moves and state values At 2410 the new materialize instance (M2.3.1) is called on the inputs generated at 2408.

At 2302 the root node of the edit script input to M2.3.1 is identified to be a retain node. Examples of processing a retain node are provided above. The M2.3.1 inputs and outputs are shown in columns "M2.3.1 In" and "M2.3.1 Return" columns of Table KKK:

TABLE KKK

Complete example, M2.3.1 inputs and return values

| Variable | M2.3.1 In | M2.3.1 Return |
|---|---|---|
| Index | 0 | 1 |
| Dataset | ["a"] | ["a"] |
| Edit script | (retain) | NA |
| Moves | {1: ["a"]} | {1: ["a"]} |
| State | {1: (source 1 (retain))} | {1: (source 1 (retain))} |

At 2414 there are no further children of the source edit script to process.

At 2304 M2.3 returns with the values shown in the "M2.3 Return" column of Table LLL

TABLE LLL

Complete example, M2.3 return

| Variable | M2.3 In | M2.3 ΔA | M2.3.1 Return | M2.3 Return |
|---|---|---|---|---|
| Index | 1 | | 1 | 1 |
| Dataset | ["a"] | ["b" "a" "c"] | ["a"] | ["b" "a" "c"] |
| Edit script | (target 1) | | NA | NA |
| Moves | {1: ["a"]} | | {1: ["a"]} | {1: ["a"]} |
| State | {1: (source 1 (retain))} | | {1: (source 1 (retain))} | {1: (source 1 (retain))} |

4.4 Materialize: Alternative Embodiments

In the detailed embodiment described above the materialization of a hierarchical edit script the first pass operates to perform non-move based operations (e.g. retain, insert, delete, update) and gather information on move based operations, and the second pass operates to perform the move operations based on the information gathered in the first pass. In this implementation both passes involve making changes (i.e. writing) to the dataset that is to be output.

In an alternative embodiment the materialization algorithm is designed and implemented so the first processing pass is a read-only pass and all writes to the dataset are performed in the second processing pass. This may provide processing efficiencies in certain circumstances.

In this alternative embodiment the first processing pass operates solely to accumulate information on dataset edit operations that need to be performed—e.g. move operations, delete operations, update operations, and insert operations. This involves processing the edit script and input dataset to populate the move and state maps and, if necessary, other data structures which record information regarding required edits. This is achieved in a similar manner to the first pass described above, except actual dataset edits are not performed. As a result of this the dataset is not changed in the first pass, but the move and state maps are populated.

In the second processing pass all edits to the dataset are made. This is achieved by processing retain, delete, update and insert nodes in a similar manner to the way they are processed in the first pass of the algorithm described in detail above. The second processing pass in this embodiment also performs the move operations by processing target nodes in a similar manner to that described above. In addition, in the second processing pass of this embodiment the nodes that are moved (e.g. per the moves map) are deleted from the dataset.

Further alternative implementations are also possible. For example, in one embodiment where multiple edit operations are to be performed on the same dataset these are accumulated and performed in a single operation. For example, if multiple delete/insert operations are identified that modify to the same dataset, these are accumulated as the dataset and edit script are traversed. Once all operations on the dataset have been identified (i.e. the traversal is complete) the accumulated edits are made. This allows for the dataset to be modified once rather than being modified a number of separate times (i.e. once for each individual insert/delete operation performed on the dataset).

4.5 Edit Script Materialization Clauses

Described herein is a computer implemented method for updating a hierarchical dataset using a hierarchical edit script. The dataset comprises a plurality of dataset nodes. The edit script comprises a plurality of edit script nodes, each edit script node being one of: a non-move operation node defining a non-move operation to be performed in respect of one or more of the dataset nodes; a source node indicating a source of a move operation in which one or more dataset nodes are to be moved from an original location in the dataset to a target location; a target node indicating a target location to which one or more dataset nodes are to be moved to in a move operation.

The method may comprise processing each edit script source node by: determining a move identifier identifying the move operation to which the source node relates; determining one or more dataset nodes which are to be moved in the identified move operation; and generating a move record in respect of the move operation, the move record comprising the move identifier and the one or more dataset nodes which are to be moved in the move operation.

The method may comprise, for each move operation, processing the dataset to delete the one or more dataset nodes which are involved in that move operation from their original location in the dataset.

The method may comprise processing each edit script non-move operation node by: determining an operation type of the non-move operation mode; and updating zero or more dataset nodes related to the non-move operation in accordance with the operation type determined.

The method may comprise processing each edit script target node by: determining a move identifier identifying the move operation to which the target node relates; using the move identifier to access the move record in respect of the move operation; retrieving the one or more dataset nodes which are to be moved from the identified move record; and inserting the one or more dataset nodes retrieved from the move record at a location in the dataset indicated by the target node.

The method may comprise performing a first processing pass of the edit script and dataset in which source nodes are processed in order to generate, in respect of each source node, a move record; and performing a second processing pass of the edit script and dataset in which target nodes are identified in order to, for each target node, insert the one or more dataset nodes retrieved from the move record for that target node into the dataset.

Edit script non-move operation nodes may be processed to update the dataset in the first processing pass. Alternatively, edit script non-move operation nodes may be processed to update the dataset in the second processing pass.

Processing the dataset to, for each move operation, delete the one or more dataset nodes involved in that move operation may be performed in the first processing pass. Alternatively, processing the dataset to, for each move operation, delete the one or more dataset nodes involved in that move operation may be performed in the second processing pass.

The first processing pass may be a read-only processing pass.

Processing an edit script source node may further comprise: identifying one or more children of the source node, the or each child being one of a non-move operation node, a source node, or a target node, and wherein determining the one or more dataset nodes which are to be moved in the move operation identified for the source node comprises recursively processing the or each child of the source node, each child being processed against a subset of the dataset to which the child relates.

Processing an edit script non-move operation node may further comprise identifying one or more children of the non-move operation node, the or each child being one of a non-move operation node, a source node, or a target node, and recursively processing the or each child of the non-move operation node, each child being processed against a subset of the dataset to which the child relates.

In response to determining a non-move operation node has a retain operation type, the method may comprise updating zero dataset nodes.

In response to determining a non-move operation node has a delete operation type, the method may comprise deleting one or more nodes from the dataset, the number of nodes to be deleted being defined by the edit script node.

In response to determining a non-move operation node has an insert operation type, the method may comprise inserting one or more nodes into the dataset, the one or more nodes to be inserted being defined by the edit script node.

In response to determining a non-move operation node has an update operation type, the method may comprise updating one or more nodes in the dataset, the one or more nodes to be updated and the update to be performed being defined by the edit script node.

Also described herein is a system for updating a hierarchical dataset, the system comprising one or more processors and one or more non-transitory computer readable storage media storing sequences of instructions which, when executed by the one or more processors, cause the one or more processors to perform a method for updating a hierarchical dataset using a hierarchical edit script as described above.

5. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 25:
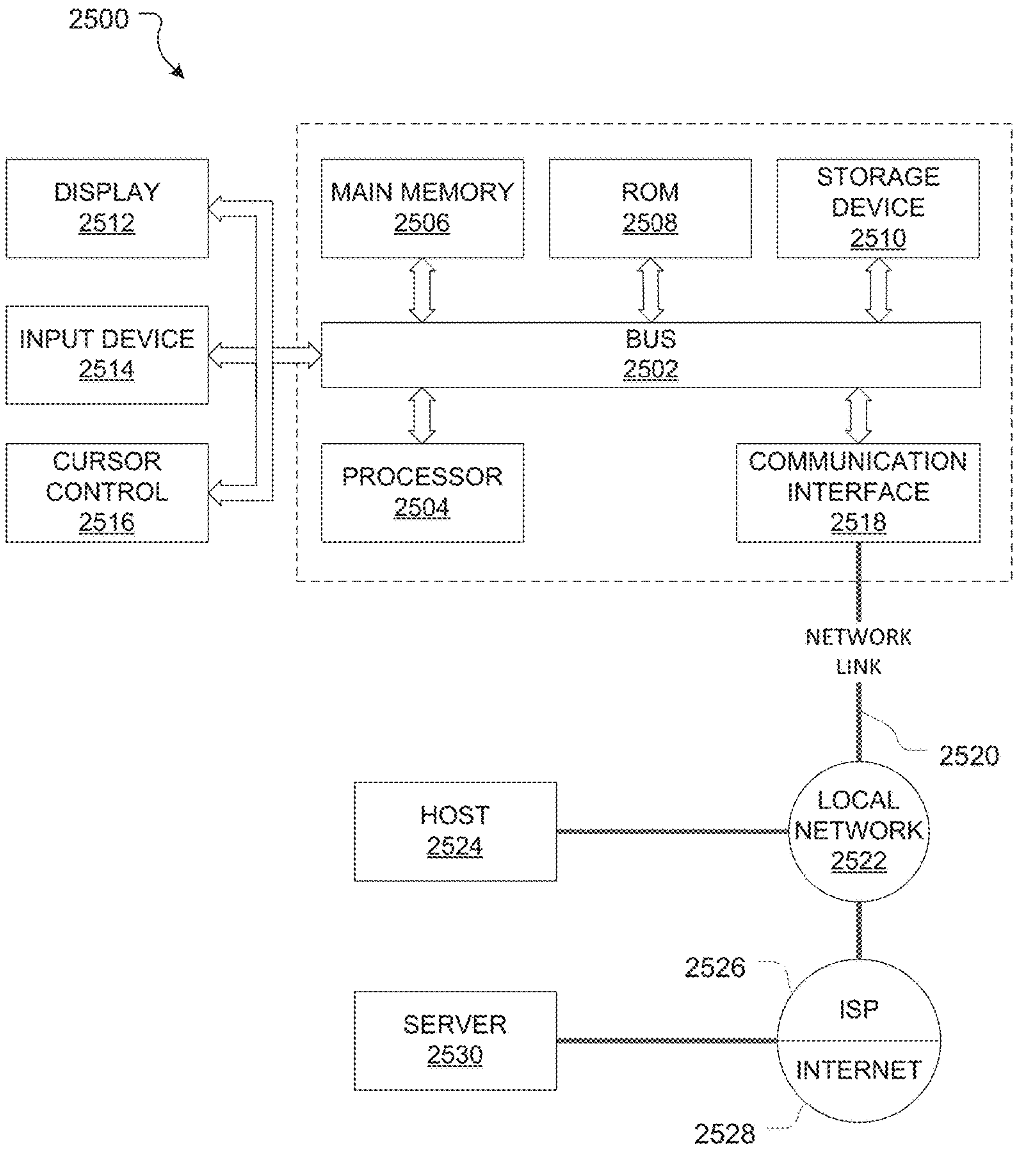
FIG. 25 is a block diagram illustrating a computer system.

For example, FIG. 25 is a block diagram that illustrates a computer system 2500 upon which an embodiment of the invention may be implemented. Computer system 2500 includes a bus 2502 or other communication mechanism for communicating information, and a hardware processor 104 coupled with bus 2502 for processing information. Hardware processor 2504 may be, for example, a general purpose microprocessor.

Computer system 2500 also includes a main memory 2506, such as a random access memory (RAM) or other dynamic storage device, coupled to bus 2502 for storing information and instructions to be executed by processor 2504. Main memory 2506 also may be used for storing temporary variables or other intermediate information during execution of instructions to be executed by processor 2504. Such instructions, when stored in non-transitory storage media accessible to processor 2504, render computer system 2500 into a special-purpose machine that is customized to perform the operations specified in the instructions.

Computer system 2500 further includes a read only memory (ROM) 2508 or other static storage device coupled to bus 2502 for storing static information and instructions for processor 2504. A storage device 2510, such as a magnetic disk or optical disk, is provided and coupled to bus 2502 for storing information and instructions.

Computer system 2500 may be coupled via bus 2502 to one more output devices such as a display 2512 for displaying information to a computer user. Display 2512 may, for example, be a cathode ray tube (CRT), a liquid crystal display (LCD), a light emitting diode (LED display), or a touch screen display. An input device 2514, including alphanumeric and other keys, may be coupled to bus 2502 for communicating information and command selections to processor 2504. Another type of user input device is cursor control 2516, such as a mouse, a trackball, or cursor direction keys for communicating direction information and command selections to processor 2504 and for controlling cursor movement on display 2512. This input device typically has two degrees of freedom in two axes, a first axis (e.g., x) and a second axis (e.g., y), that allows the device to specify positions in a plane. Additional and/or alternative input devices are possible, for example touch screen displays.

Computer system 2500 may implement the techniques described herein using customized hard-wired logic, one or more ASICs or FPGAs, firmware and/or program logic which in combination with the computer system causes or programs computer system 2500 to be a special-purpose machine. According to one embodiment, the techniques herein are performed by computer system 2500 in response to processor 2504 executing one or more sequences of one or more instructions contained in main memory 2506. Such instructions may be read into main memory 2506 from another storage medium, such as storage device 2510. Execution of the sequences of instructions contained in main memory 2506 causes processor 2504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2510. Volatile media includes dynamic memory, such as main memory 2506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2502. Transmission media can also take the form of acoustic or light waves, such as those generated during radio-wave and infra-red data communications.

Various forms of media may be involved in carrying one or more sequences of one or more instructions to processor 2504 for execution. For example, the instructions may initially be carried on a magnetic disk or solid state drive of a remote computer. The remote computer can load the instructions into its dynamic memory and send the instructions over a telephone line using a modem. A modem local to computer system 2500 can receive the data on the telephone line and use an infra-red transmitter to convert the data to an infra-red signal. An infra-red detector can receive the data carried in the infra-red signal and appropriate circuitry can place the data on bus 2502. Bus 2502 carries the data to main memory 2506, from which processor 2504 retrieves and executes the instructions. The instructions received by main memory 2506 may optionally be stored on storage device 2510 either before or after execution by processor 2504.

Computer system 2500 also includes a communication interface 2518 coupled to bus 2502. Communication interface 2518 provides a two-way data communication coupling to a network link 2520 that is connected to a local network 2522. For example, communication interface 2518 may be an integrated services digital network (ISDN) card, cable modem, satellite modem, or a modem to provide a data communication connection to a corresponding type of telephone line. As another example, communication interface 2518 may be a local area network (LAN) card to provide a data communication connection to a compatible LAN. Wireless links may also be implemented. In any such implementation, communication interface 2518 sends and receives electrical, electromagnetic or optical signals that carry digital data streams representing various types of information.

Network link 2520 typically provides data communication through one or more networks to other data devices. For example, network link 2520 may provide a connection through local network 2522 to a host computer 2524 or to data equipment operated by an Internet Service Provider (ISP) 2526. ISP 2526 in turn provides data communication services through the world wide packet data communication network now commonly referred to as the "Internet" 2528. Local network 2522 and Internet 2528 both use electrical, electromagnetic or optical signals that carry digital data streams. The signals through the various networks and the signals on network link 2520 and through communication interface 2518, which carry the digital data to and from computer system 2500, are example forms of transmission media.

Computer system 2500 can send messages and receive data, including program code, through the network(s), network link 2520 and communication interface 2518. In the Internet example, a server 2530 might transmit a requested code for an application program through Internet 2528, ISP 2526, local network 2522 and communication interface 2518.

The received code may be executed by processor 2504 as it is received, and/or stored in storage device 2510, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

A computer system may take a variety of forms. For example, a client computer 106 may be a desktop computer, a laptop computer, a notebook computer, a tablet computer, a smart phone, or other computer.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The various flowcharts illustrated in the figures and described above define steps in particular orders to explain various features. In some cases the steps may be able to be performed in a different order, one or more steps may be combined into a single step, a single step may be divided into multiple separate steps, and/or the function(s) achieved by one or more described/illustrated steps may be achieved by one or more alternative steps.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method for updating a hierarchical dataset using a hierarchical edit script, wherein the dataset comprises a plurality of dataset nodes, the edit script comprises at least a plurality of edit script nodes, and each edit script node of the plurality of edit script nodes is one of: a source node indicating a source of a move operation in which one or more dataset nodes are to be moved from an original location in the dataset to a target location or a target node indicating a target location to which one or more dataset nodes are to be moved to in a move operation; and wherein the method comprises:

processing each edit script source node by:

determining a move identifier identifying the move operation to which the source node relates, determining one or more dataset nodes which are to be moved in the identified move operation, and generating a move record in respect of the move operation, the move record comprising the move identifier and the one or more dataset nodes which are to be moved in the move operation;

for each move operation, processing the dataset to delete the one or more dataset nodes which are involved in that move operation from their original location in the dataset; and processing each edit script target node by:

determining a move identifier identifying the move operation to which the target node relates, using the move identifier to access the move record in respect of the move operation, retrieving the one or more dataset nodes which are to be moved from the identified move record, and inserting the one or more dataset nodes retrieved from the move record at a location in the dataset indicated by the target node.

2. The computer implemented method according to claim 1, wherein the method comprises:

performing a first processing pass of the edit script and dataset in which source nodes are processed in order to generate, in respect of each source node, a move record; and performing a second processing pass of the edit script and dataset in which target nodes are identified in order to, for each target node, insert the one or more dataset nodes retrieved from the move record for that target node into the dataset.

3. The computer implemented method according to claim 2, wherein processing the dataset to, for each move operation, delete the one or more dataset nodes involved in that move operation is performed in the first processing pass.

4. The computer implemented method according to claim 2, wherein processing the dataset to, for each move operation, delete the one or more dataset nodes involved in that move operation is performed in the second processing pass.

5. The computer implemented method according to claim 2, wherein the first processing pass is a read-only processing pass.

6. The computer implemented method according to claim 1, wherein processing an edit script source node further comprises:

identifying one or more children of the source node, the or each child being one of a non-move operation node, a source node, or a target node, and wherein determining the one or more dataset nodes which are to be moved in the move operation identified for the source node comprises recursively processing the or each child of the source node, each child being processed against a subset of the dataset to which the child relates.

7. The computer implemented method according to claim 1, wherein the edit script comprises a second plurality of edit script nodes which each represent a non-move operation node defining a non-move operation to be performed in respect of the one or more dataset nodes.

8. The computer implemented method according to claim 7, wherein in response to determining a non-move operation node of the second plurality of edit script nodes has a retain operation type, the method comprises updating zero of the dataset nodes.

9. The computer implemented method according to claim 7, wherein in response to determining a non-move operation node of the second plurality of edit script nodes has a delete operation type, the method comprises deleting one or more nodes from the dataset, a number of nodes to be deleted being defined by the non-move operation node.

10. The computer implemented method according to claim 7, wherein in response to determining a non-move operation node of the second plurality of edit script nodes has an insert operation type, the method comprises inserting one or more nodes into the dataset, the one or more nodes to be inserted being defined by the non-move operation node.

11. A system for updating a hierarchical dataset using a hierarchical edit script, wherein the dataset comprises a plurality of dataset nodes; the edit script comprises a plurality of edit script nodes, each edit script node of the plurality of edit script nodes is one of: a source node indicating a source of a move operation in which one or more dataset nodes are to be moved from an original location in the dataset to a target location or a target node indicating a target location to which one or more dataset nodes are to be moved to in a move operation;

wherein the system comprises one or more processors and one or more non-transitory computer readable storage media storing sequences of instructions which, when executed by the one or more processors, cause the one or more processors to:

process each edit script source node by:

determining a move identifier identifying the move operation to which the source node relates, determining one or more dataset nodes which are to be moved in the identified move operation, and generating a move record in respect of the move operation, the move record comprising the move identifier and the one or more dataset nodes which are to be moved in the move operation;

for each move operation, process the dataset to delete the one or more dataset nodes which are involved in that move operation from their original location in the dataset;

process each edit script target node by:

determining a move identifier identifying the move operation to which the target node relates, using the move identifier to access the move record in respect of the move operation, retrieving the one or more dataset nodes which are to be moved from the identified move record, and inserting the one or more dataset nodes retrieved from the move record at a location in the dataset indicated by the target node.

12. The system according to claim 11, wherein when executed, the sequences of instructions cause the one or more processors to:

perform a first processing pass of the edit script and dataset in which source nodes are processed in order to generate, in respect of each source node, a move record; and perform a second processing pass of the edit script and dataset in which target nodes are identified in order to, for each target node, insert the one or more dataset nodes retrieved from the move record for that target node into the dataset.

13. The system according to claim 12, wherein processing the dataset to, for each move operation, delete the one or more dataset nodes involved in that move operation is performed in the first processing pass.

14. The system according to claim 12, wherein processing the dataset to, for each move operation, delete the one or more dataset nodes involved in that move operation is performed in the second processing pass.

15. The system according to claim 12, wherein the first processing pass is a read-only processing pass.

16. The system according to claim 11, wherein processing an edit script source node further comprises:

identifying one or more children of the source node, the or each child being one of a non-move operation node, a source node, or a target node, and wherein determining the one or more dataset nodes which are to be moved in the move operation identified for the source node comprises recursively processing the or each child of the source node, each child being processed against a subset of the dataset to which the child relates.

17. The system according to claim 11, wherein the edit script comprises a second plurality of edit script nodes which each represent a non-move operation node defining a non-move operation to be performed in respect of the one or more dataset nodes.

18. The system according to claim 17, wherein in response to determining a non-move operation node of the second plurality of edit script nodes has a retain operation type, the sequences of instructions further cause the one or more processors to update zero of the dataset nodes.

19. The system according to claim 17, wherein in response to determining a non-move operation node of the second plurality of edit script nodes has a delete operation type, the sequences of instructions further cause the one or more processors to delete one or more nodes from the dataset, a number of nodes to be deleted being defined by the non-move operation node.

20. The system according to claim 17, wherein in response to determining a non-move operation node of the second plurality of edit script nodes has an insert operation type, the sequences of instructions further cause the one or more processors to insert one or more nodes into the dataset, the one or more nodes to be inserted being defined by the non-move operation node.

* * * * *